United States Patent
Nix

(10) Patent No.: US 12,470,924 B2
(45) Date of Patent: Nov. 11, 2025

(54) DEVICE DEFAULT WiFi CREDENTIALS FOR SIMPLIFIED AND SECURE CONFIGURATION OF NETWORKED TRANSDUCERS

(71) Applicant: Network-1 Technologies, Inc., New Canaan, CT (US)

(72) Inventor: John A. Nix, Evanston, IL (US)

(73) Assignee: Network-1 Technologies, Inc., New Canaan, CT (US)

( * ) Notice: Subject to any disclaimer, the term of this patent is extended or adjusted under 35 U.S.C. 154(b) by 0 days.

(21) Appl. No.: 18/444,596

(22) Filed: Feb. 16, 2024

(65) Prior Publication Data

US 2024/0276214 A1    Aug. 15, 2024

Related U.S. Application Data

(63) Continuation of application No. 16/376,998, filed on Apr. 5, 2019, now abandoned.
(Continued)

(51) Int. Cl.
*H04W 12/06* (2021.01)
*H04L 9/32* (2006.01)
(Continued)

(52) U.S. Cl.
CPC ........... *H04W 12/06* (2013.01); *H04L 9/3213* (2013.01); *H04L 9/3247* (2013.01); *H04W 4/80* (2018.02);
(Continued)

(58) Field of Classification Search
CPC ....... H04W 12/06; H04W 4/80; H04W 12/03; H04W 12/0433; H04W 12/30;
(Continued)

(56) References Cited

U.S. PATENT DOCUMENTS 8,813,198 B2    8/2014 Louboutin et al.
8,818,261 B1    8/2014 Chen et al.
(Continued)

OTHER PUBLICATIONS

Marktscheffel T, Gottschlich W, Popp W, Werli P, Fink SD, Bilzhause A, de Meer H. QR code based mutual authentication protocol for Internet of Things. In2016 IEEE 17th international symposium on a world of wireless, mobile and multimedia networks (WoWMoM) Jun. 21, 2016 (pp. 1-6). IEEE. (Year: 2016).*
(Continued)

*Primary Examiner* — James R Turchen
(74) *Attorney, Agent, or Firm* — Amster, Rothstein & Ebenstein LLP

(57) ABSTRACT

A wireless device with transducers can support remote monitoring and include an 802.11 compatible radio and a set of device default credentials. The device can be installed at a physical location with service from a fixed access point operating with a different set of owner credentials. A mobile phone can (i) scan a tag for the device and download a set of configuration parameters for the device, and (ii) authenticate with a configuration system. The mobile phone can receive the set of device default credentials from the configuration system. The mobile phone can activate a mobile access point using the set of device default credentials. The device can connect with the mobile phone's access point and receive a ciphertext with the owner credentials and a configuration package. The device can apply the configuration package and load the owner credentials in order to connect with the fixed access point.

10 Claims, 10 Drawing Sheets

Related U.S. Application Data

(60) Provisional application No. 62/653,785, filed on Apr. 6, 2018.

(51) Int. Cl.

| | | |
|---|---|---|
| *H04W 4/80* | (2018.01) | |
| *H04W 12/03* | (2021.01) | |
| *H04W 12/0433* | (2021.01) | |
| *H04W 12/30* | (2021.01) | |
| *H04W 80/10* | (2009.01) | |

(52) U.S. Cl.
CPC ....... *H04W 12/03* (2021.01); *H04W 12/0433* (2021.01); *H04W 12/30* (2021.01); *H04W 80/10* (2013.01); *H04L 2209/80* (2013.01)

(58) Field of Classification Search
CPC .............. H04W 80/10; H04W 12/069; H04W 12/0431; H04W 12/47; H04W 84/12; H04W 12/50; H04W 4/50; H04W 4/70; H04L 9/3213; H04L 9/3247; H04L 2209/80; H04L 9/3263
See application file for complete search history.

(56) References Cited

U.S. PATENT DOCUMENTS

| | | | |
|---|---|---|---|
| 8,966,601 B2 | 2/2015 | Green et al. | |
| 8,995,413 B2 | 3/2015 | Chu | |
| 9,173,115 B2 | 10/2015 | Sundareswaran et al. | |
| 9,401,901 B2 | 7/2016 | Huang et al. | |
| 9,414,232 B2 | 8/2016 | Louboutin et al. | |
| 9,560,617 B2 | 1/2017 | Liu et al. | |
| 9,967,149 B1 | 5/2018 | Fiennes | |
| 9,985,931 B2 | 5/2018 | Chechani et al. | |
| 10,091,650 B2 | 10/2018 | Li et al. | |
| 10,148,495 B1* | 12/2018 | Oczkowski | H04W 8/20 |
| 10,694,374 B2* | 6/2020 | Yang | H04L 9/0819 |
| 11,082,430 B1* | 8/2021 | Kuo | H04L 63/20 |
| 11,469,941 B2* | 10/2022 | Hiller | H04W 8/183 |
| 11,652,823 B1* | 5/2023 | Gurinaviciūtė | H04L 63/108 726/27 |
| 2007/0147318 A1* | 6/2007 | Ross | H04W 48/16 370/338 |
| 2010/0309815 A1 | 12/2010 | Yepez et al. | |
| 2012/0317619 A1 | 12/2012 | Dattagupta et al. | |
| 2013/0019298 A1 | 1/2013 | Jover Segura et al. | |
| 2013/0039213 A1 | 2/2013 | Averbuch et al. | |
| 2013/0347073 A1* | 12/2013 | Bryksa | H04L 63/083 726/4 |
| 2014/0071970 A1 | 3/2014 | Velasco | |
| 2014/0073288 A1 | 3/2014 | Velasco | |
| 2014/0073289 A1 | 3/2014 | Velasco | |
| 2014/0281478 A1 | 9/2014 | Huang et al. | |
| 2015/0095648 A1 | 4/2015 | Nix | |
| 2015/0113172 A1 | 4/2015 | Johnson et al. | |
| 2015/0121066 A1 | 4/2015 | Nix | |
| 2015/0130957 A1* | 5/2015 | Berelejis | H04L 12/2807 348/211.1 |
| 2015/0143125 A1 | 5/2015 | Nix | |
| 2015/0172925 A1 | 6/2015 | Leppanen et al. | |
| 2015/0229475 A1 | 8/2015 | Benoit et al. | |
| 2015/0312945 A1 | 10/2015 | Park et al. | |
| 2016/0019475 A1 | 1/2016 | Bryksa et al. | |
| 2016/0037337 A1 | 2/2016 | Elliott et al. | |
| 2016/0050566 A1 | 2/2016 | Li et al. | |
| 2016/0219050 A1* | 7/2016 | Zou | H04W 12/04 |
| 2016/0226732 A1 | 8/2016 | Kim et al. | |
| 2016/0285628 A1 | 9/2016 | Carrer et al. | |
| 2016/0337354 A1 | 11/2016 | Smadja et al. | |
| 2017/0034703 A1 | 2/2017 | Dimatteo et al. | |
| 2017/0063940 A1 | 3/2017 | Lapidous et al. | |
| 2017/0195318 A1* | 7/2017 | Liu | H04L 67/562 |
| 2017/0257819 A1 | 9/2017 | Mccann et al. | |
| 2017/0288956 A1 | 10/2017 | Chudy et al. | |
| 2017/0324733 A1* | 11/2017 | Howry | H04W 12/50 |
| 2017/0353981 A1* | 12/2017 | Lee | H04W 12/08 |
| 2018/0020353 A1 | 1/2018 | Bhandaru et al. | |
| 2018/0077022 A1 | 3/2018 | Van Oost et al. | |
| 2018/0109418 A1 | 4/2018 | Cammarota et al. | |
| 2018/0139796 A1* | 5/2018 | Beijar | H04W 48/16 |
| 2018/0279125 A1 | 9/2018 | Bryksa et al. | |
| 2019/0253243 A1* | 8/2019 | Zimmerman | H04W 4/80 |
| 2021/0243603 A1* | 8/2021 | Yin | H04W 12/08 |

OTHER PUBLICATIONS

Internet Engineering Task Force (IETF), Request for Comments 6979, "Deterministic Usage of the Digital Signature Algorithm (DSA) and Elliptic Curve Digital Signature Algorithm (ECDSA)", Aug. 2013, pp. 1-79.

Internet Engineering Task Force (IETF), Request for Comments 8017, "PKCS #1: RSA Cryptography Specifications Version 2.2", Nov. 2016, pp. 1-78.

Wikipedia, Elgamal Encryption, Apr. 18, 2018, pp. 1-4.

* cited by examiner

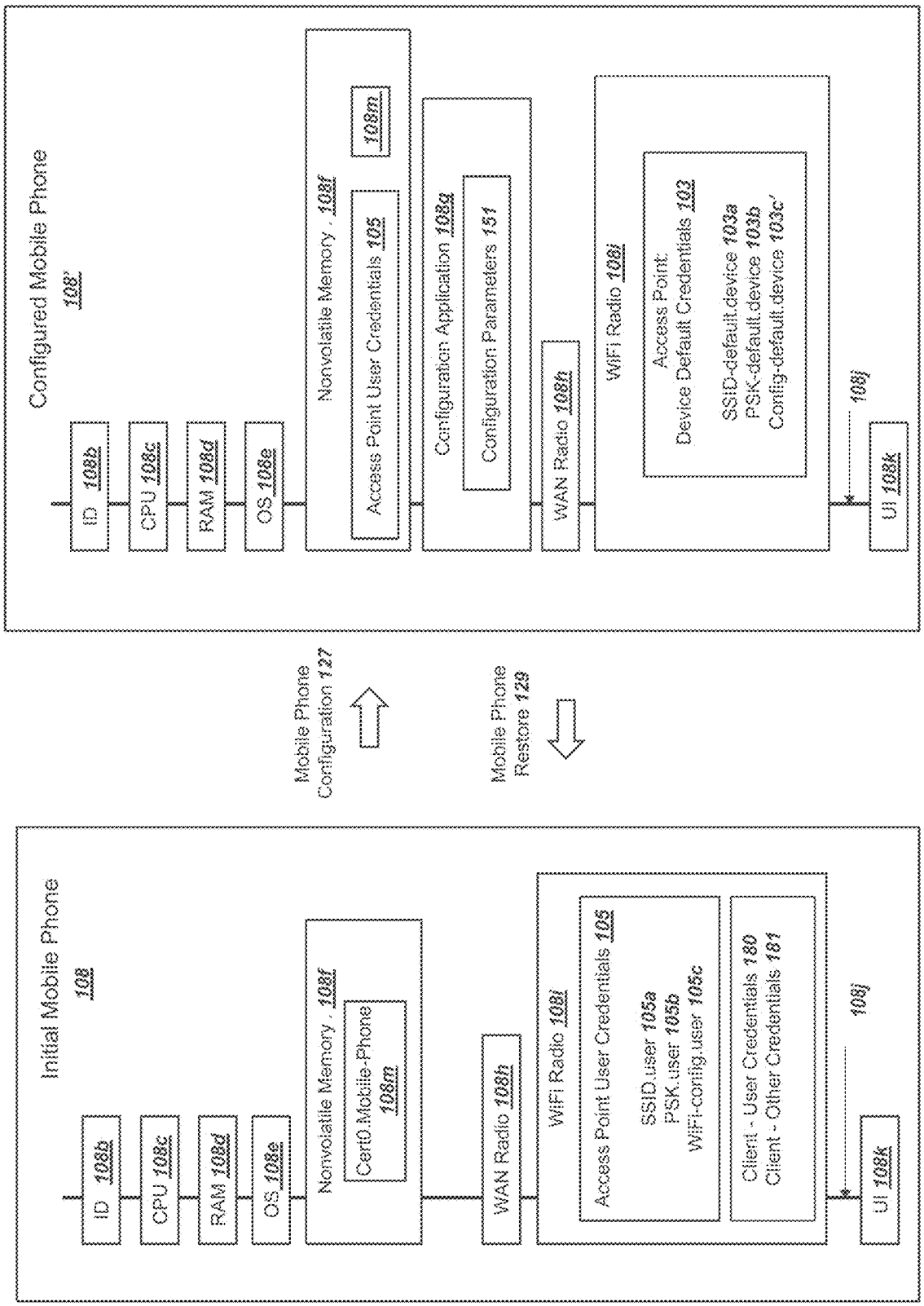

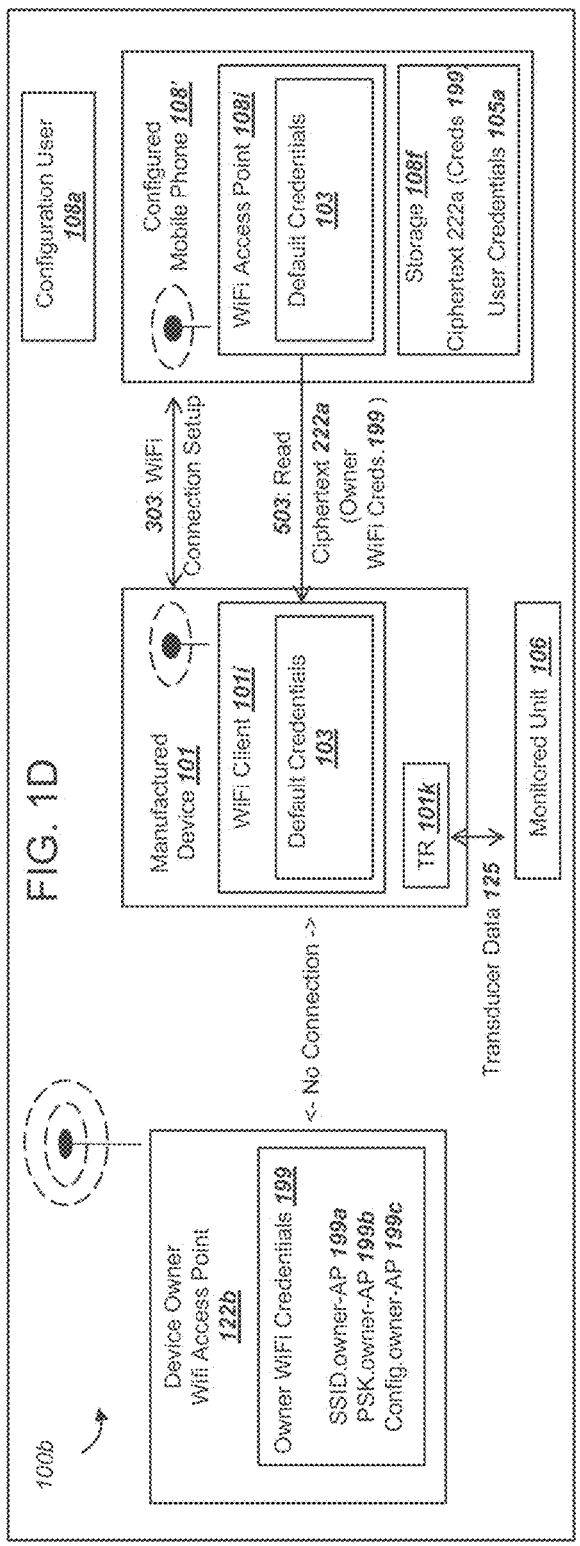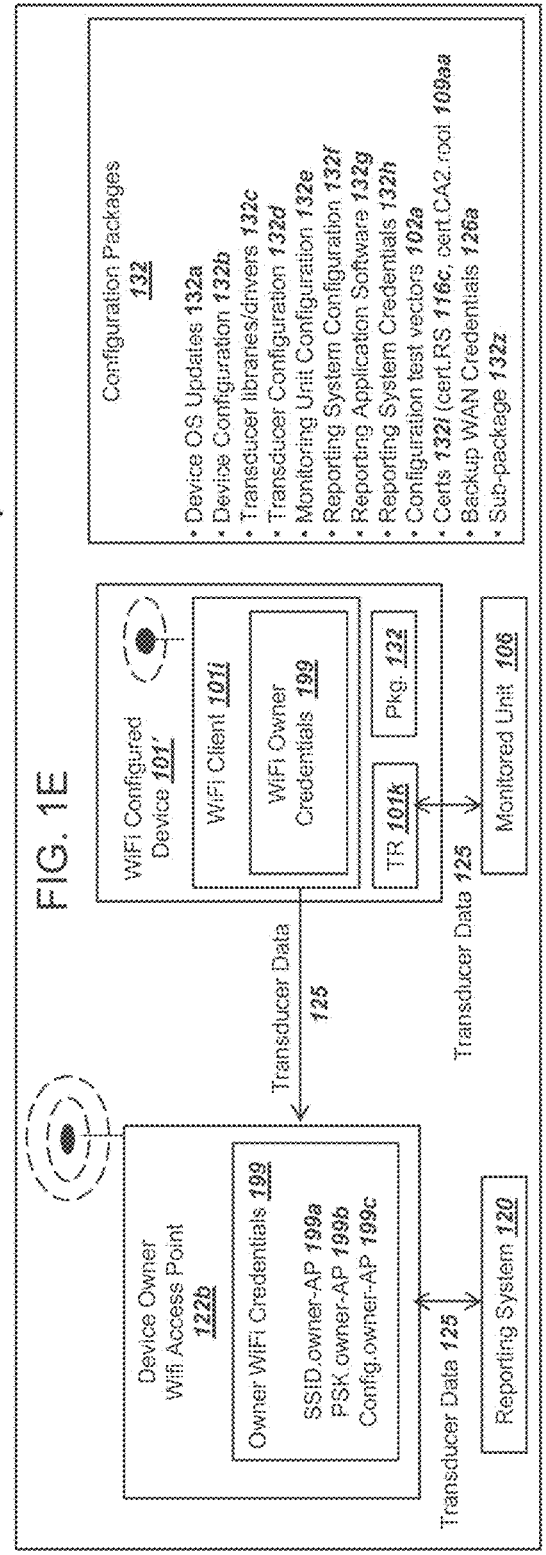

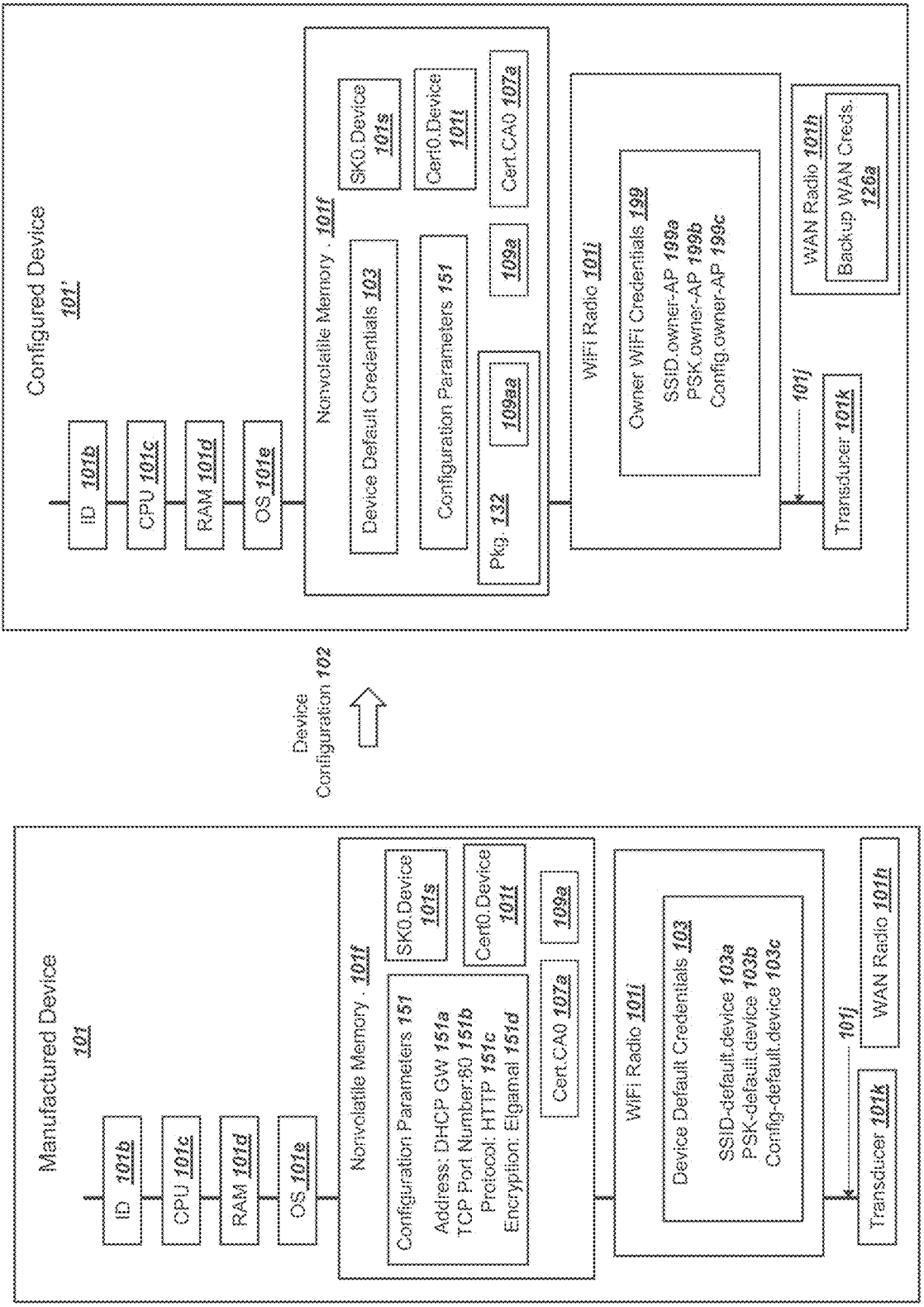

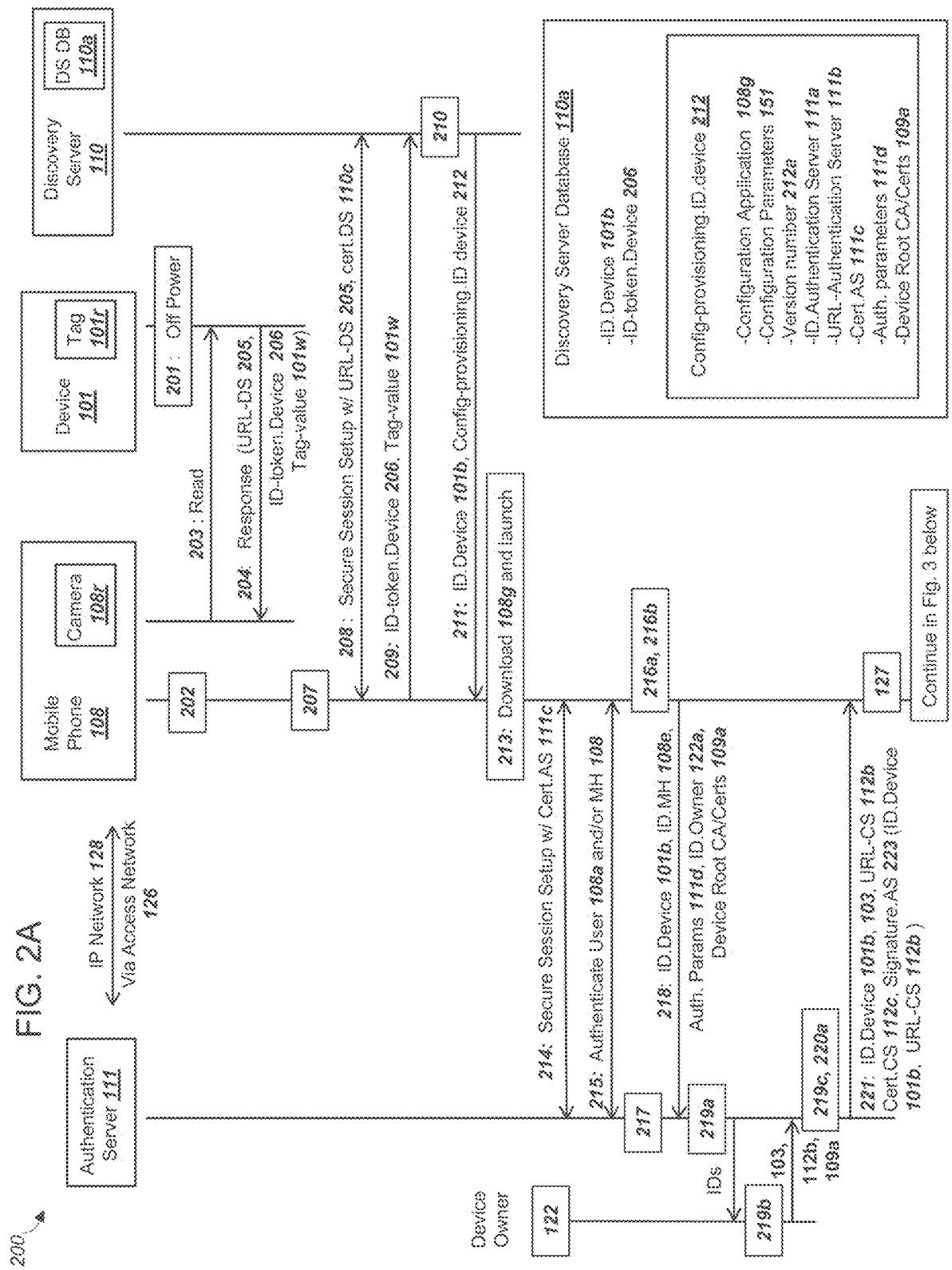

DEVICE DEFAULT WiFi CREDENTIALS FOR SIMPLIFIED AND SECURE CONFIGURATION OF NETWORKED TRANSDUCERS

CROSS-REFERENCE TO RELATED APPLICATIONS

This U.S. continuation application claims the benefit of the filing dates of U.S. Non-Provisional application Ser. No. 16/376,998, filed Apr. 5, 2019, that claims priority to U.S. Provisional Patent Application Ser. No. 62/653,785, filed Apr. 6, 2018, which are each hereby incorporated by reference in their entirety.

BACKGROUND

Technical Field

The present systems and methods relate to configuration and operation of networked transducers, and more particularly, to systems and methods for a transducer device to use preconfigured WiFi credentials, in order for the transducer device to communicate with a configuration system.

Description of Related Art

The ability to connect transducers such as sensors and actuators with a network is a growing field with many economical applications. As the costs for both electronic hardware and bandwidth continue to decrease, the use of networked transducers is expected to continue increasing over the coming decades. Connecting transducers to a network can be referred to as "machine-to-machine (M2M) communications" or "the Internet of Things (IoT)." Among many potential benefits, IoT technologies allow automated monitoring and/or control of assets, equipment, personnel, or a physical location where manual monitoring may not be economical. Many applications for the "Internet of Things" significantly reduce costs by using automated monitoring instead of manual techniques. Prominent examples of IoT applications today include monitoring and control for building heating/air-conditioning, automobiles, alarm systems, and tracking devices. Fast growing markets for IoT applications today include health applications such as the remote monitoring of a person's fitness activity, heartbeat, or glucose levels, monitoring of industrial equipment deployed remotely in the field, and also security systems.

IoT communications can provide remote control over actuators that may be connected to a device, such as turning on or off a power switch, locking or unlocking a door, adjusting a speed of a motor, or similar remote control. A decision to change or adjust an actuator associated with a connected device can utilize one or a series of sensor measurements. As one example, an IoT device for a truck can periodically report engine status to a remote server, and if the engine is operating outside specifications such as being too hot, including potentially an "alarm" condition, then temperature and an alarm code can be reported to a central server for the IoT device. The server can subsequently instruct the driver and/or a specified mechanic to investigate the engine for potential mechanical malfunctions or other causes. The previous example is just one of many possible applications for IoT technology.

Many IoT applications can leverage wireless networking technologies, in addition to wired technologies such as Ethernet. Wireless technologies such as wireless local area networks and wireless wide area networks have proliferated around the world over the past 20 years, and usage of these wireless networks is also expected to continue to grow. Wireless local area network (LAN) technologies include WiFi and wireless wide area network (WAN) technologies include $3^{rd}$ Generation Partnership Project's (3GPP) $3^{rd}$ Generation (3G) Universal Mobile Telecommunications System (UMTS) and $4^{th}$ Generation (4G) Long-term Evolution (LTE), LTE Advanced, and Narrow-band Internet of Things (NB-IoT). The many options to connect a transducer device to a network creates opportunities for new products and services, but also creates several classes of problems that need to be solved. Many of these problems or needs in the art pertain to enabling users to securely and efficiently configure the transducer devices. A need exists in the art to allow a user to securely upload to the device a set of network access credentials for the wireless network.

A need exists in the art to support the configuration of transducer devices for installation and operation, including deployment in the field by a user or a technician or with monitored units. A manufactured transducer device can record data for (i) a "root of trust" or secret key for the device as well as certificates and cryptographic parameters, and (ii) installed firmware and software. Manually configuring devices to use different keys, new network access credentials to connect with the owner's selected wireless network, and/or firmware can be time consuming and difficult for users. Entering network access credentials is also prone to errors and especially difficult for devices with limited user interfaces. A need exists in the art to allow users or device owners to efficiently change or update for a device both (i) network access credentials, certificates, and cryptographic parameters, and (ii) installed firmware and software. A need exists in the art for a configuration system and/or a reporting system to securely and efficiently record values and identities pertaining to operation of the device, such as a list of transducers attached, the identity of a monitored unit for the device, as well as the physical location of the device.

With conventional technology for configuration and installation of networked devices, a frequent challenge can be that default or manufactured configuration of a device may not match the requirements of (i) a device owner, or (ii) an associated configuration system or a reporting system. In other words, the manufactured state of a device may use credentials, certificates, and cryptographic parameters that are not compatible with an operating environment in which the device will be deployed (e.g. use of PKI-based keys instead of a shared secret key for network access, lack of installation of user ID and password for enterprise-based authentication, etc.) A need exists in the art such that device credentials, cryptographic algorithms, and cryptographic parameters for a user's application can be securely updated after device manufacturing. A need exists in the art to support the update through a highly automated configuration step.

In addition, devices designed for machine-to-machine communications, or the "Internet of Things", can frequently be shipped to an end user in a state that is not fully configured for the user. The lack of a full configuration could include incomplete information for any of the following: (i) current, running firmware or configuration files for the device, (ii) network access credentials, (iii) credentials for access to remote servers or a reporting system, and (iv) proper configuration to support transducers that are actually connected with a device. As one example, hospitals, health clinics, or doctor's offices can receive health monitoring equipment designed to be networked, but without both (i)

the networking configured for the equipment, and (ii) updated or patched firmware for the equipment. A need exists in the art to allow general users (e.g. not requiring expert IT skills) to securely configure equipment designed to be networked, including securely updating the device's firmware and credentials for both accessing a network and remote servers.

Many other examples exist as well for needs in the art to support efficient yet secure device configuration by users, and the above are examples are just a few and intended to be illustrative instead of limiting.

SUMMARY

Methods and systems are provided for configuration of networked transducers in order to support secure operation of the networked transducers. The methods and systems can support secure operation of devices for "The Internet of Things (IoT)" which is also known as "Machine to Machine (M2M)" communications. An objective of the invention is to address the challenges noted above for securing the deployment and operation of devices that have radios and transducers, where the devices connect to servers using networks based on Internet protocols.

A device can have a transducer for monitoring a monitored unit, and the device can support wirelessly connecting with an access network in order to communicate data for the transducer with a server. The device can be delivered to a user in a state where credentials for a local access point have not been loaded into the device, and thus connectivity through the available access point is not enabled for the device "out of the box". The device can be configured with a set of device default credentials for connecting with a WiFi access point, where a plurality of device default credentials for a plurality of devices can be recorded in a device database. The device can also be configured with a set of configuration parameters. The connection with the access network can be via wireless and a radio, or could be through a wired connection such as Ethernet. The device, transducer, and monitored unit can have identifiers such as bar codes, QR codes, MAC addresses, serial numbers, or other identifiers. The device can be produced by a device manufacturer and include capabilities for conducting cryptographic operations, such as (i) creating and verifying signatures, and (ii) operating encryption algorithms using public, private, and/ or symmetric keys. The device can also record a series of certificate authority certificates, such as a certificate authority certificate for the certificate of the device and a root certificate for the certificate authority, plus any intermediate certificates between the certificate authority certificate and the root certificate.

A device owner or device user may prefer the device transition from a manufactured state or delivered state to an operational state, where the transition for the device can comprise a configuration step. Or, after initial operation of the device, a device owner or device user may prefer the device transition from a first configured state to a second configured state, and the transition could also comprise a configuration step. In general, the security of a configuration step can be important because the overall security of a system can depend on the security of a configuration step. The configuration step can preferably be completed in a relatively automated manner using secure steps and hardware that is both (i) available for low cost and also (ii) readily easy to obtain or source. A mobile phone such as a smartphone could be used to connect a device in the manufactured state to an IP network, such that the device in the manufactured state could securely communicate with a reporting system after conduction a configuration step with a configuration system.

The configuration step with the configuration system can comprise a first collection of steps for the mobile phone to work in conjunction with the configuration system to prepare for authentication of the device and then configuration with the device. The first collection of steps may be depicted in FIG. 2A below. A mobile phone can be operated by a configuration user, which could also be the device user or associated with the device owner. The first collection of steps can comprise the mobile phone (i) reading an tag or code for the device, where the tag includes a URL and an identity for the device, (ii) sending data from the tag and the identity to a discovery server and (iii) receiving a response from the discovery server with configuration data for provisioning the device with service, credentials, and software/ firmware (e.g. how and where to get the configuration data as opposed to delivering the configuration data for device credentials and software/firmware). The configuration data can include a URL for an authentication server and the name or location of configuration software (or "configuration app" for the mobile phone operating system). The mobile phone can download the configuration "app" or application if not already installed on the mobile phone. The mobile phone can use the configuration software in order to establish communication between the device and a configuration system. The configuration data can also include a certificate for the authentication server and authentication parameters.

The mobile phone can conduct a first authentication with the authentication server, where the first authentication comprises the configuration user authenticating with the authentication server. The mobile phone can send device identity information to the authentication server and the authentication server can receive a certificate for the device. After authentication of the configuration user and/or mobile phone, the mobile phone can receive from the authentication server the set of device default credentials, which were previously recorded in the device before delivery to the device owner, device user, or configuration user. The authentication server can query a device owner or the device manufacturer for the set of default device credentials. The authentication server can also send the mobile phone data for the device to conduct a device configuration step. The mobile phone can conduct a mobile phone configuration step, where (i) the previous set of configuration user WiFi access point credentials for the mobile phone are backed up, and (ii) the received device default credentials are activated for the mobile phone.

The device can be powered and activate a WiFi radio within the device as a WiFi client using the device default credentials. The mobile phone operated by the configuration user can be in relatively close physical proximity of the device, such as within an exemplary several meters. The device and mobile phone can conduct a WiFi connection setup, since they both operate using the device default credentials. The mobile phone can notify the authentication server that the device successfully used the device default credentials. The authentication server can also notify the configuration server that device with a device ID is authenticated since the device successfully used the device default credentials. In other words, the use of a device default credentials by both the device and mobile phone can provide an initial level of mutual authentication, since both sides are demonstrating knowledge and recording of secured shared values.

After successful setup of the WiFi connection using the device default credentials, the device can use the set of recorded configuration parameters in order to receive data from the mobile phone for conducting a configuration step. The received data could comprise a URL for a configuration server, authentication parameters, a certificate for the authentication server, and a signature over the URL from the authentication server. The device can verify the signature using the certificate and also verify the certificate using a recorded root certificate. The device can then use the authentication parameters and URL to conduct a secure session setup with the configuration server. The secure session can pass through the access point operated by the mobile phone, where the mobile phone now provides connectivity to an IP network and the configuration server to the device. After successful setup of the secure session, the device can send the mobile phone a message of success for communication with the configuration server. A status or progress indicator for a configuration user viewing the mobile phone screen could be updated.

The mobile phone can collect a list of identities, which can include an RF sweep analysis to measure all available wireless networks as the location of the device in the form of a networks available list. The list of identities can include identities for a monitored unit, any attached transducers, a device owner, and the device as well. The mobile phone can conduct a second setup of a secure session with the configuration server (e.g. between the mobile phone and configuration server), where the first secure session above was between the device and the configuration server and routed through the mobile phone. The mobile phone can use the second secure session to send the list of identities to the configuration system pertaining to the device, transducers, networks available, and a monitored unit.

The configuration system can record the list of identities received from the mobile phone in a configuration database. The configuration server can use the identities list to collect a configuration package for the device. The configuration package can include an encrypted set of device owner WiFi access point credentials, so that the device can connect with a device owner WiFi access point. The presence or identity of the device owner WiFi access point can be included in the list of identities gathered by the mobile phone. The configuration server can send the configuration files and encrypted credentials to the device via the first secure session between the device and the configuration server.

The device can read the configuration package and apply the files and reboot. The device can decrypt the encrypted set of device owner WiFi access point credentials and apply the credentials to a WiFi radio, such that the device can start communicating through the device owner WiFi access point. The device can setup a secure session with the reporting system using credentials and parameters received in the configuration package The device can subsequently transfer encrypted transducer data and a report regarding configuration to the reporting system, thereby completing the configuration step for the device. The mobile phone can check with the reporting system that transducer data has been successfully transmitted between the reporting system and the device, and display to the end user that the configuration step is successful and completed.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1C is a graphical illustration of an exemplary system, where a mobile phone is configured to use a set of default credentials, in accordance with exemplary embodiments;

FIG. 1D is a graphical illustration of an exemplary system, where a mobile phone and a device are configured to use a set of default credentials, and the device receives a set of owner credentials and configuration packages, in accordance with exemplary embodiments;

FIG. 1E is a graphical illustration of an exemplary system, where an access point and a device are configured to use a set of WiFi credentials, and the device communicates transducer data through the access point, in accordance with exemplary embodiments;

FIG. 1F is a graphical illustration of hardware, firmware, and software components for a device, including a device configuration step, in accordance with exemplary embodiments;

FIG. 2A is a simplified message flow diagram illustrating an exemplary system with exemplary data sent and received by a mobile phone, in accordance with exemplary embodiments;

DETAILED DESCRIPTION OF EXEMPLARY EMBODIMENTS OF THE INVENTION

FIG. 1A

Figure 1A:
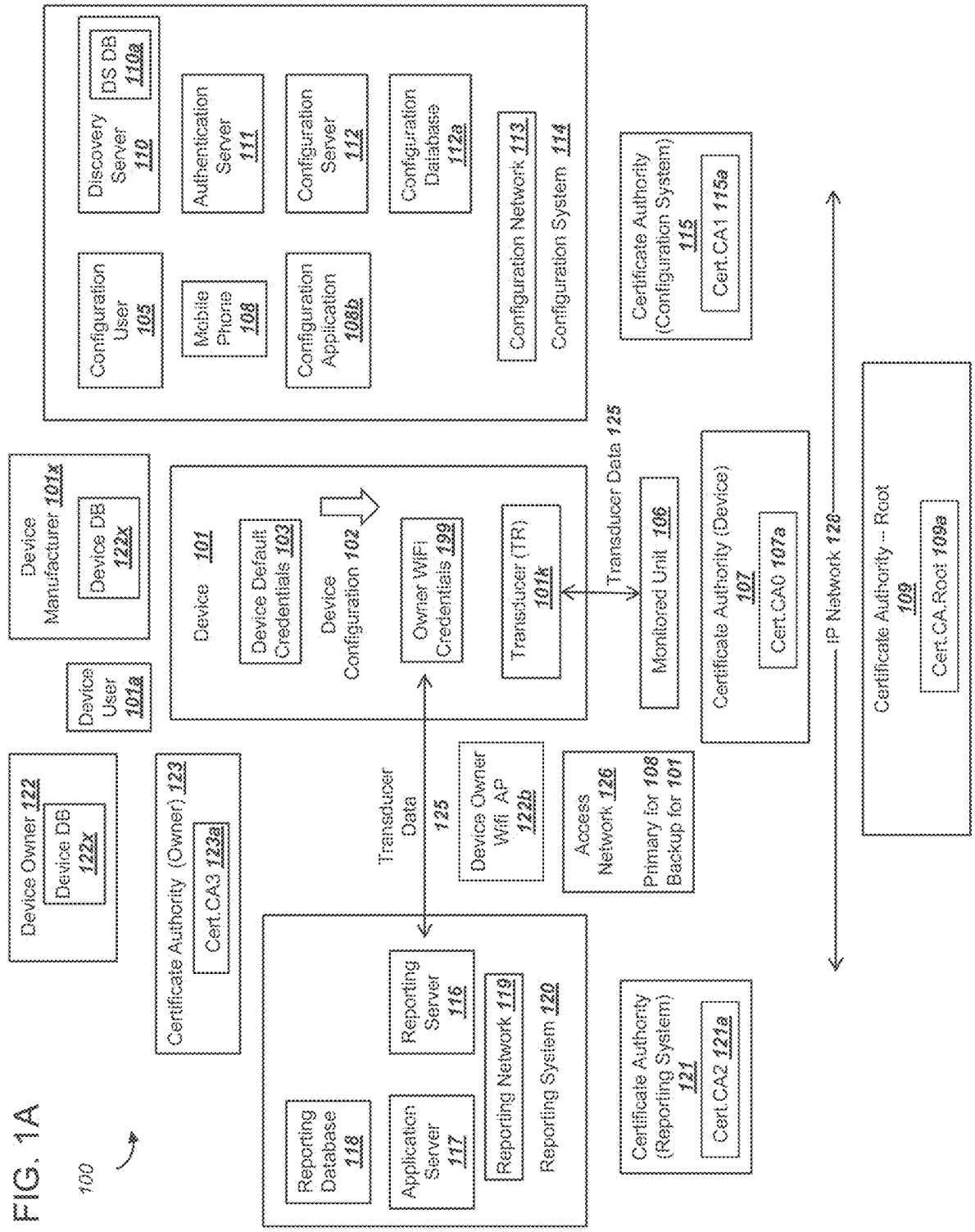
FIG. 1A is a graphical illustration of an exemplary system, where a device with a transducer communicates with a configuration system and a reporting system, in order to conduct a configuration step, in accordance with exemplary embodiments.

FIG. 1A is a graphical illustration of an exemplary system, where a device with a transducer communicates with a configuration system and a reporting system, in order to conduct a configuration step, in accordance with exemplary embodiments. The system 100 can include a device 101, a configuration system 114, and a reporting system 120. Device 101 can communicate with the configuration system 114 and reporting system 120 via Internet Protocol (IP) network 128. IP network 128 could be a public or private network supporting Internet Engineering Task Force (IETF) standards such as, but not limited to, such as, RFC 786 (User Datagram Protocol), RFC 793 (Transmission Control Protocol), and related protocols including IPV6 or IPv4. A public IP network 128 could utilize globally routable IP addresses, and a private IP network 128 could utilize private IP addresses which could also be referred to as an Intranet. Other possibilities for IP Network 128 exist as well without departing from the scope of the invention.

Device 101 could utilize an owner WiFi access point 122b in order to communicate with the reporting system 120 using the IP network 128. After a configuration step 102 described in the present invention and in multiple figures below, device 101 can communicate transducer data 125 with reporting system 120 through the owner WiFi access point 122b. Note that the security of transducer data 125 for device owner 122, device user 101a, and reporting system 120 during operation of device 101 may generally depend on the security of a configuration step 102. Further, a manufactured device 101 may not have the credentials or configuration in order to send transducer data 125 to reporting system 120 without successfully completing a configuration step 102. In addition, although device 101 is depicted in FIG. 1A as using a WiFi access point 122b, device 101 could use other wireless technologies to send data to reporting system 120 after a configuration step 102. For these embodiments, access point 122b could comprise a "g node b" for a 5G network, as one example, and other possibilities exist as well without departing from the scope of the present invention.

Access network 126 could be either a Local Area Network (LAN) or a Wide Area Network (WAN), or potentially a combination of both. For embodiments where device 101 communicates with reporting system 120 through a LAN after a configuration step 102, then one form of access network 126 could comprise a device owner WiFi access point 122b as depicted and described in connection with FIG. 1B below, and access network 126 could comprise a device supporting IEEE 802.11 (WiFi) standards. For embodiments where device 101 communicates with reporting system 120 through a WAN after a configuration step 102 (such as using access network 126 as a backup for WiFi access point 122b as depicted in FIG. 1A), then access network 126 could comprise Device 101 and access network 126 utilizing one of a variety of WAN wireless technologies to communicate, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, proposed 5G networks, and other examples exist as well. A wired device 101 can connect to the access network 126 via a wired connection such as, but not limited to, an Ethernet, a fiber optic, or a Universal Serial Bus (USB) connection (not shown). Device 101 could be powered via any of (i) traditional "wall power" potentially with an AD/DC adapter, (ii) a battery which may be periodically recharged, (iii) power over a wired LAN connection such as "power over Ethernet", and other possibilities exist as well.

Device 101 can include manufactured secure processing environment (not shown). The manufactured secure processing environment can also be referred to as a secure enclave or secure element. Device 101 can comprise functionality of a processor such as an ARM® or Intel® based processor to secure cryptographic key materials including private keys in public key infrastructure (PKI) key pairs, secret shared keys, cryptographic parameters, cryptographic algorithms, a certificate 107a for the device 101 certificate authority, a root certificate 109a, etc. In other words, although root certificate 109a is depicted as external to device 101 in FIG. 1A, in exemplary embodiments a copy of this root certificate 109a is stored within nonvolatile memory of manufactured device 101.

Additional details for components within a device 101 are provided below in FIG. 1B, FIG. 1D, and FIG. 1E. As depicted in FIG. 1A, the configuration step 102 can covert WiFi credentials used by device 101 from a set of device default credentials 103 to a set of owner WiFi credentials 199. In addition, although not depicted in FIG. 1A, a configuration step 102 can also be applied at a subsequent time on a previously configured device 101. In other words, a configuration step 102 may take place multiple times over the life of device 101, such as either (i) when device owner 122 changes or (ii) device 101 is moved to a different location where owner WiFi credentials 199 may no longer be utilized by device 101. An exemplary embodiment for a first configuration 102 of a device 101 is depicted in FIG. 1A.

Device 101 can also include a transducer 101k, and may also be referred to herein as a "transducer device 101". Transducer 101k can be a sensor or an actuator and may be either passive or active. Transducer 101k could be internal within the physical housing of device 101, such as, but not limited to, a digital image sensor inside a camera. Transducer 101k could be external to the physical housing of device 101, such as, but not limited to, a thermocouple or probe extending from device 101 to a monitored unit 106. Although device 101 is depicted in FIG. 1A with a single transducer 101k, device 101 could include multiple transducers 101k. In addition, although a single device is depicted in FIG. 1A, a system 100 can include a plurality of devices 101.

Examples of a monitored unit 106 can include an ATM or vending machine, a truck or automobile, a refrigerated or standard ("dry") shipping container, or industrial equipment such as, but not limited to, an oil field pump, a transformer connected to an electrical grid or an elevator in a building. Additional examples of a monitored unit 106 include can also include a pallet for shipping or receiving goods, an refrigerator with food, a health monitoring device attached to a person such as, but not limited to, a heart monitor, and a gate or door for opening and closing. Device 101 can utilize a sensor to measure and collect data regarding a parameter of monitored unit 106 such as, but not limited to, temperature, humidity, physical location potentially including geographical coordinates from a Global Positioning System (GPS) receiver, surrounding light levels, surrounding RF signals, vibration and/or shock, voltage, current, and/or similar measurements. Monitored unit 106 could also be equipment in the house or home of device user 101a.

Monitored unit 106 could also be controlled by device 101 via a transducer 101k that is an actuator, where device 101 can change the actuator in order to change a state for monitored unit 106. For example, if monitored unit 106 is a door, then a transducer 101k could include a relay to activate a lock for the door. If monitored unit 106 is a lighting system in a building, then transducer 101k could comprise a switch to turn the lighting level up or down. Other examples exist for monitored unit 106 as well, and the above are intended to be illustrative instead of limiting. In the case where transducer 101k is either an actuator or a sensor, (X) device 101 could connect transducer 101k to the reporting system 120, and (Y) reporting system 120 can both (i) receive transducer data 125 input from sensors with monitored unit 106 and (ii) transmit transducer data 125 output to actuators in order to control monitored unit 106. Thus, in operation and after the configuration step 102, reporting system 120 can remotely monitor and control monitored unit 106 using device 101 and transducer 101k.

As depicted in FIG. 1A, device 101 can be associated with a device user 101a, a device manufacturer 101x, and/or a device owner 122. Device user 101a could be a person, group of people, or business entity associated with the operation of device 101. If device 101 monitors a building, then device user 101a could be a building engineer or building manager. If device 101 monitors a home, then device user 101a could be a home owner or resident. Device manufacturer 101x can be the manufacturer or supplier of device 101 to device user 101a or device owner 122. Device manufacturer 101x could purchase components within device 101 depicted in FIG. 1E below and integrate them into a housing plus other components in order to produce device 101. Device manufacturer 101x or device owner 122 could also operate a device database 122x, which can contain a plurality of device default credentials for a plurality of devices 101, as depicted and described in connection with FIG. 1B below. In exemplary embodiments, device owner 122 is the owner of device 101. Device owner 122 may be the same as device user 101a in some embodiments, but device owner 122 also may be different than device user 101a in other embodiments. For exemplary health care applications in a hospital where device 101 is a medical device to monitor patient health, device owner 122 could be the hospital and device user could be a nurse, doctor, or medical technician. Device owner 122 may have a certificate 123a from a certificate authority 123 associated with the device owner 122.

Each of the different entities depicted for system 100 of device owner, device user, and device manufacturer may control or operate device 101 at different times for the life cycle of device 101. In addition, a device owner or device user may change during the life of device 101 after manufacture and may use some initial configuration steps that could be different than a configuration step 102. This change in control and operation over time, plus potential prior operation in an insecure manner, can create challenges for ensuring secure operation of device 101. A prior party in control of device 101 may not have supported the security procedures or requirements for device owner 122. For example, device owner 122 may require that device 101 is configured after delivery from device manufacturer 101x or possibly after delivery from a previous device owner 122. A configuration step 102 with configuration system 114 can ensure that device 101 is configured to the standards or requirements of device owner 122, without depending on previous security procedures or steps of device manufacturer 101x or device user 101a.

In order to conduct a configuration step 102, system 100 can utilize a configuration system 114. As depicted in FIG. 1A, configuration system 114 can include a configuration user 108a, a mobile phone 108, a configuration application 108b, a discovery server 110, an authentication server 111, a configuration server 112, and a configuration database 112a. Discovery server 110 can include a discovery server database 110a. A configuration database 112a can record data pertaining to a device 101 and reporting system 120 before and after a configuration step 102. The elements within a configuration system 114 can be connected via a configuration network 113. Configuration network 113 could be similar to IP network 128 described above, and could comprise an Intranet or private network in exemplary embodiments. Configuration system 114 can utilize a certificate 115a for a certificate authority 115 associated with configuration system 114. The certificate authority 115 associated with configuration system 114 may or may not be the same as the certificate authority 107 associated with device 101, or certificate authority 123 for owner 122, or certificate authority 121 for reporting system 120. Although a certificate authority is not depicted for certificate 115a in FIG. 1A, each of the certificates 107a, 115a, 121a, and 123a preferably have a "parent" certificate or signed public key associated with the certificates. Certificates 107a, 115a, 121a, and 123a can be formatted according to an X.509 certificate, with different values appropriate for each certificate depicted in FIG. 1A. Root certificate 109a may be a self-signed by the public key in root certificate 109a. In exemplary embodiments, any of the certificates 107a, 115a, 121a, and 123a, or any parent certificates can be verified by a root certificate 109a. In addition, although a single root certificate 109a is depicted in FIG. 1A, a system 100 can utilize multiple root certificates 109a and a system 100 may have multiple certificate authorities 109 for each root certificate 109a.

A configuration system 114 can use a mobile phone 108 operated by a configuration user 108a. Details and components for a mobile phone 108 are depicted and described below in connection with FIG. 1B, FIG. 1C, and FIG. 1D. In some exemplary embodiments, a mobile phone 108 can comprise a smart phone, such as based on the Android or IOS operating systems. In other embodiments, instead of using a "mobile phone 108", a configuration user 108a can operate a "configuration unit 108", or simply "unit 108", which can provide the same or equivalent functionality as a "mobile phone 108" as depicted herein. In these other exemplary embodiments, a unit 108 could comprise a portable device, such as laptop, tablet, wearable device such as a smart watch, a USB device, etc. For embodiments where device 101 conducts a configuration step 102 in a manufacturing facility or potentially a location away from monitored unit 106, including the location where a nonvolatile memory 101f (in FIG. 1E below) is initially configured for device 101, then the element or node depicted as "mobile phone 108" in the present invention could comprise the unit 108 where the unit 108 could operate normally in a fixed location instead of being mobile. For example, unit 108 could be a configuration server to conduct a configuration step 102 for a plurality of devices 101 in sequence at a manufacturing facility or at a facility for device owner 122. Other possibilities exist as well for a unit 108 that is not a mobile phone to provide the functionality of a "mobile phone 108" herein and below, without departing from the scope of the present invention.

The servers shown for configuration system 114 can be co-located within the same data center or geographically dispersed. A configuration system 114 can also include a plurality of the elements depicted in FIG. 1B. Further, some elements of a configuration system 114 could be combined, such (i) as the discovery server 110 could be combined with the authentication server 111 or configuration server 112, or (ii) the configuration server 112 could be combined with the authentication server 111. Other possibilities exist for the arrangement of elements within a configuration system 114 without departing from the scope of the invention. For an alternative exemplary embodiment to that depicted in FIG. 1A, discovery server 110 could be operated external to configuration system 114, such as discovery server being associated with device manufacturer 101x, device owner 122, or reporting system 120. Additional details regarding the components and operation of a configuration system 114 will be described below. In some exemplary embodiments, reporting system 120 and configuration system 114 can be combined.

A reporting system 120 in system 100 can include a reporting server 116, an application server 117, and a reporting database 118. Although not depicted in FIG. 1A, a reporting system 120 and a configuration system 114 can include a firewall to filter packets received through an IP network 128. The elements within a reporting system 120 can be connected via reporting network 119, which could comprise a network similar to IP network 128. Similar to configuration system 114, the servers for reporting system 120 can be co-located within the same data center or geographically dispersed. The servers and databases shown for both reporting system 120 and configuration system 114 can be either different physical computers such as rack-mounted servers, or different logical or virtual servers or instances operating in a "cloud" configuration. The elements within reporting system 120 can operate in conjunction to collect data from a plurality of devices 101 through access network 126 and present data or reports to device owner 122, device user 101a, or potentially another user or manager of system 100.

Reporting system 120 could also take input from device owner 122 or device user 101a to send control transducer data 125 to device 101 in order to operate a transducer 101k in order to control monitored unit 106. Reporting system 120 could also send control transducer data 125 to device 101 without requiring user input, such as for automated control. Reporting system 120, or elements in reporting system 120, can have a certificate 121a signed by a certificate authority 121 associated with reporting system 120. Certificate 121a may be associated or verified using root certificate 109a, although in some exemplary embodiments the root certificate for certificate 121 may be different than root certificate 109a for a device 101. The various servers depicted in FIG. 1A could comprise multiple individual physical servers or multiple virtual servers operating in a coordinated manner to provide the functionality shown. In other words, although a single reporting server 116 is depicted in FIG. 1A, a reporting server 116 could comprise multiple different physical or virtual servers.

FIG. 1B

Figure 1B:
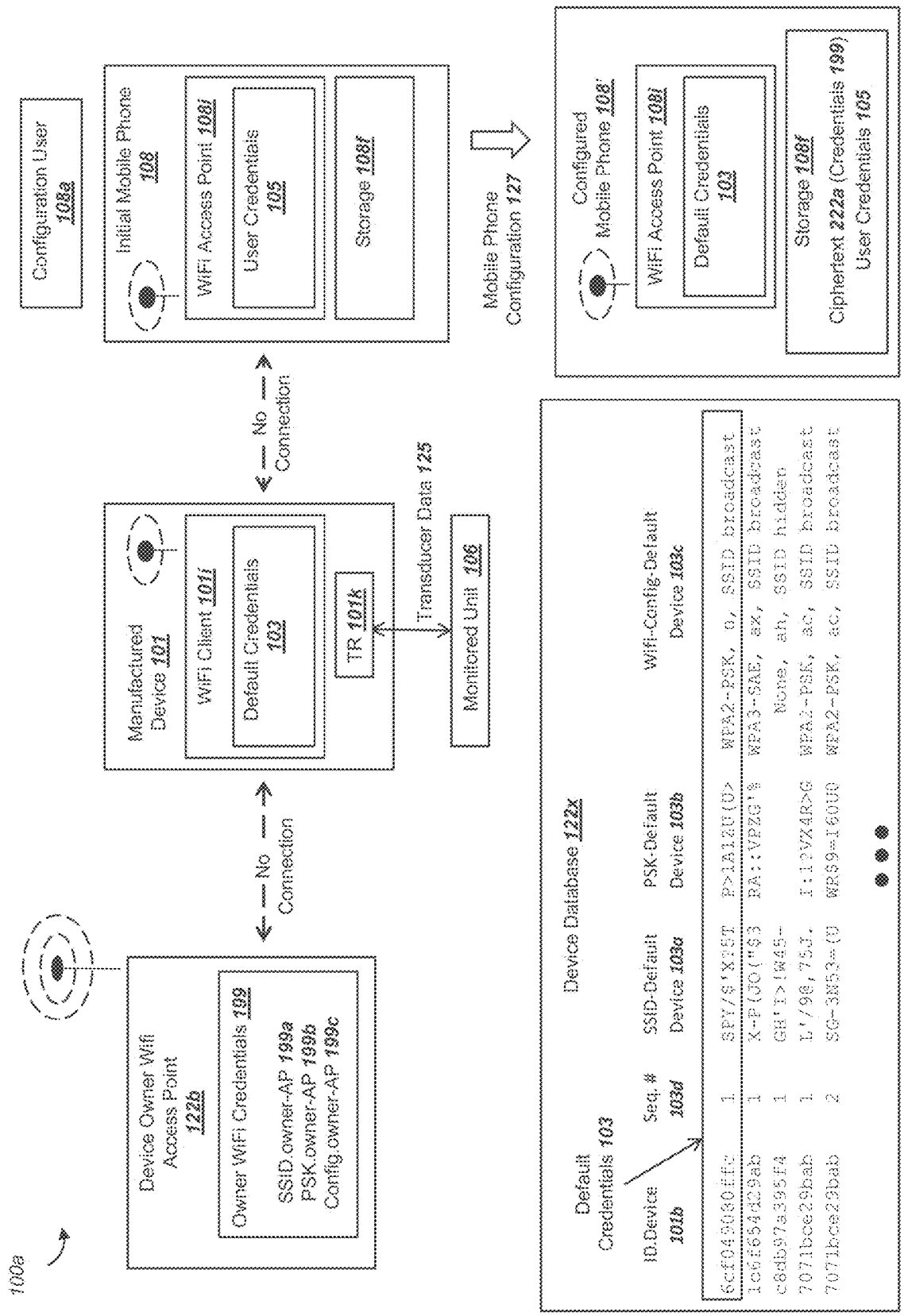
FIG. 1B is a graphical illustration of an exemplary system, where a mobile phone is configured to use a set of default credentials and the set of default credentials are recorded in a database, in accordance with exemplary embodiments.

FIG. 1B is a graphical illustration of an exemplary system, where a mobile phone is configured to use a set of default credentials and the set of default credentials are recorded in a database, in accordance with exemplary embodiments. System 100a in FIG. 1B can include a device owner WiFi access point 122b, a device 101, and a mobile phone 108. Mobile phone 108 can also be referred to as "initial mobile phone" 108. Device owner WiFi access point 122b can comprise a WiFi access point operating according to specifications within the Institute of Electrical and Electronics Engineers (IEEE) 802.11 group of standards. "Manufactured device 101" can be referred here as "device 101", and can comprise a device with a radio and a transducer for collecting and sending data regarding a monitored unit 106. Additional exemplary details for both (i) the components within and (ii) the operation of device 101 are depicted and described in connection with FIG. 1E below. Mobile phone 108 can comprise a mobile device which could include a phone, but also could be another related mobile device such as a tablet, a laptop, or another movable computing device that can provide both wireless connectivity to an access network 126 and operate a WiFi access point 108i. Additional exemplary details for both (i) the components within and (ii) the operation of mobile phone 108 are depicted and described in connection with FIG. 1C below. In exemplary embodiments, the depicted nodes for a system 100a can operate in the same approximate geographical area, such as within the same physical building or a nearby physical building or on the same address block of a street, etc.

Device owner WiFi access point 122b can have internal hardware similar to mobile phone 108 as depicted and described in connection with FIG. 1C below. Device owner WiFi access point 122b can also be referred to herein as "AP 122b". Although FIG. 1B depicts AP 122b for an exemplary embodiment where AP 122b is owned or controlled by device owner 122. In other exemplary embodiments AP 122b could be owned and operated by another entity besides device owner 122. Exemplary other or different potential owners for AP 122b are depicted in an exemplary networks available list 322 as other networks 329 in FIG. 3 below, and other possibilities exist as well for an entity to control or own AP 122b. AP 122b can contain a nonvolatile memory that can record credentials for WiFi clients to authenticate with the access point. Exemplary credentials depicted in FIG. 1B for AP 122b are owner WiFi credentials 199. The owner WiFi credentials 199 can belong to or be controlled by the owner of AP 122b, which would be either (i) owner 122, or (ii) another entity besides owner 122 that controls AP 122b.

Owner WiFi credentials 199 can comprise a set of values for SSID.owner-AP 199a, PSK.owner-AP 199b, and Config.owner-AP 199c. The value for SSID.owner-AP 199a can comprise the service set identifier or network name for access point 122b to broadcast. In exemplary embodiments, AP 122b could use SSID.owner-AP 199a in a "hidden" mode and not broadcast the SSID, but listening for messages from a client using the hidden SSID. Other devices besides device 101 can connect with AP 122b operating as an access point by using the SSID 199a that is either broadcast or hidden. The selection of access point 122b either (i) broadcasting SSID.owner-AP 199a or (ii) not broadcasting can be included in Config.owner-AP 199c. The value PSK.owner-AP 199b used by AP 122b can comprise a pre-shared secret key, passphrase, pairwise master key (PMK) required by any node or client to connect with the access point, which can also be recorded in devices connecting to AP 122b.

Note that in exemplary embodiments where AP 122b uses Extensible Authentication Protocol (EAP), then (i) PSK.owner-AP 199b could comprise both a username and a password for different devices or WiFi clients that attach to AP 122b, and (ii) PSK.owner-AP 199b could be recorded and operated with a remote server (e.g. a RADIUS server) and may not be stored within AP 122b. PSK.owner-AP 199b could also contain certificates for allowed WiFi clients and a secret key for AP 122b for exemplary embodiments where AP 122b uses PKI for authentication and encryption with WiFi clients. In addition, for embodiments with EAP authentication, then (i) key 199b for AP 122b as stored and used by device 101 can comprise a secret key for AP 122b, and (ii) key 199b for AP 122b as stored and used by AP 122b can be a corresponding certificate or public key for device 101.

The access point configuration values for Config.owner-AP 199c could specify a version of the 802.11 standards to utilize, such as, but not limited to, 802.11n, 802.11ac, 802.11ah, 802.11ax, or related and subsequent versions of these standards. As contemplated herein, a set of configuration values for either an access point such as config.owner-AP 199c or similar values such as Config-default.device 103c may contain values that are closely associated with a set of credentials such as credentials 199. In other words, although the depicted configuration values themselves may not be regular credentials such as an SSID or PSK, the configuration values may be required in order to use the credentials and thus in the present invention configuration values for a set of credentials are depicted as included with the credentials. The configuration values for Config.owner-AP 199c could also specify a frequency band to utilize such as 2.4 GHZ, 5 GHZ, and other possibilities exist as well such as channel numbers on which to operate. Further, the values for Config.owner-AP 199c could specify a preferred list of channels to operate on, such a subset of channels 1 through 11 at 2.4 GHZ, or a subset of channels 40 through 62 at 5 GHZ, and other possibilities exist as well.

In addition, the values for Config.owner-AP 199c could specify an authentication and encryption scheme for AP 122b to utilize with an SSID, such as none, WPA2-PSK, WPA3-SAE, WPA2-Enterprise EAP-PSK, etc. Config.owner-AP 199c can also specify routing, authentication, and firewall rules, such as a whitelist of allowed devices based on MAC address, allowed IP addresses, allowed TCP and/or UDP port numbers, etc. In exemplary embodiments, AP 122b can operate or transmit with multiple different SSID 199a values each associated with different Config.owner-AP 199c values. For embodiments where AP 122b comprises a "g node b" for a 5G wireless network, then the values for Config-owner-AP 199c could be associated with a 5G network and include equivalent data to that described above, such as RF frequencies or channels to use, release version of the wireless networking standard such as release 16, release 17, etc., and an authentication mechanism such as EAP-TLS or EAP-AKA', etc.

In exemplary embodiments, manufactured device 101 can operate as a WiFi client 101i or user equipment client to connect with an access point. The default configuration of a manufactured device could include a set of default credentials 103, where the default credentials 103 may not match Owner WiFi Credentials 199 since a system 100 or system 100a may not have conducted a configuration step 102. Since a system 100a depicted in FIG. 1B has not completed a configuration step 102, then AP 122b and device 101 have "no connection" as depicted. In other words, data cannot normally flow between the two nodes since they are not authenticated and operate with different sets of credentials.

A set of default credentials for device 101 may also be recorded in a device database 122x. As depicted in FIG. 1A, either device owner 122 or device manufacturer 101x could record and operate a device database 122x. A system 100 or system 101a could have a plurality of devices 101, potentially thousands or millions deployed across a wide geographical area. In exemplary embodiments, a device database 122x can be used to record a set of WiFi Default Credentials 103, which can also be referred to herein as "default credentials 103". A set of default credentials 103 in a device database 122x can include an ID.device 101b, a sequence number 103d, SSID-default.device 101a, PSK-default.device 103b, and config-default.device 103c.

The set of default credentials 103 could be written into nonvolatile memory of device 101 before device 101 is shipped for installed with monitored unit 106. The set of default credentials 103 could be recorded in device 101 by either a device manufacturer 101x or device owner 122. In exemplary embodiments, different devices 101 have different values for default credentials 103, as depicted in device database 122x. In addition, although default credentials 103 are depicted with a PSK-default.device 103b, a value for PSK-default.device 103b could comprise a public key for device 101 and device 101 could record and operate with the corresponding secret key. Further, a set of default credentials 103 can include a device certificate for device 101, such as an X.509 v3 certificate used with TLS or EAP-TLS authentication.

For a set of default credentials 103 in a device database 122x, ID.device 101b can correspond to a unique identifier for device 101, and the use of a ID.device 101b is depicted and described in connection with FIG. 1E below. In exemplary embodiments, ID.device 101b can comprise a MAC addresses used with a physical radio 101i interface. Or, ID.device 101b could comprise an international mobile equipment identifier (IEMI), and other possibilities exist as well for a unique device ID ID.device 101b for a device 101 without departing from the scope of the present invention. An SSID-default.device 103a in a device database 122x can correspond to a network name or service set identifier similar to SSID 199a and could be up to 32 characters. In exemplary embodiments, values for SSID-default.device 103a can comprise a pseudo-random string of characters as depicted in FIG. 1B. An SSID-default.device 103a also does not need to be a pseudo-random string in exemplary embodiments, and could also comprise the value ID.device 101b, or other values uniquely related to device 101. A value PSK-default.device 103b can correspond to a preshared secret key for use in WiFi protocols such as WPA, WPA2, WPA3, etc, and in exemplary embodiments the PSK-default.device 103b can also comprise a pseudo-random string of characters as depicted in FIG. 1B. An PSK-default.device 103b also does not need to be a pseudo-random string in exemplary embodiments, and could also comprise a values uniquely related to device 101. The use of pseudo-random strings or other values for a set of device default credentials 103 can be longer than that depicted in FIG. 1B.

Config-default.device 103c for a set of default credentials 103 in a device database 122x can record values similar to Config.owner-AP 199c described above, such as parameters for device 101 to use with WiFi client 101i. Exemplary possible values and fields for Config-default.device 103c are depicted in FIG. 1B, and the exemplary data is depicted to be illustrative as opposed to limiting. Note that in exemplary embodiments, a default configuration 103 for a device 101 could support an "open" WiFi access point or "hotspot" (e.g. where the PSK value is blank), such that encryption as a client could be optionally omitted. For those embodiments, security could be obtained for device 101 through other means, such as using a secure session 309 depicted below in FIG. 3 between device 101 and a configuration system 114. The value sequence number 103d can comprise a sequence number for a given set of default credentials 103. A first set of default credentials 103 could be recorded with a manufactured device 101 to initially operate with WiFi client 101i, and after a first configuration step 102 then the first set of default credentials 103 could be deprecated and device 101 could use a second set of default credentials 103 with a different sequence number 103d for a later or subsequent second configuration step 102. In other words, by recording multiple sets of default credentials 103 for a device 101 using different sequence numbers 103d, then security can be enhanced by reducing or eliminating the reuse of any given set of default credentials 103 for a device 101.

As depicted for a device database 122x in FIG. 1B, the present invention contemplates that a device 101 could use a set of device default credentials 103 where a shared secret value in a PSK or PMK field within the config-default.device 103c can comprise the value "none" or "null", etc. In these cases with a null value or equivalent, device 101 may connect with an access point such as WiFi access point 108*i* without authentication and encryption. In other words, the network could be "open" in order for device 101 to connect with an IP network 128 through the access point. Security could be obtained from other means, such as (i) operating a firewall within WiFi access point 108*i* to restrict connectivity to a "whitelist" of approved devices (possibly identified by MAC address), (ii) operating a firewall within WiFi access point 108*i* to limit connectivity to approved IP addresses and port numbers, and (iii) WiFi access point 108*i* or WiFi client 101*i* could operate at low transmit powers such that the two nodes have to be in close physical proximity, such as less than several meters.

In exemplary embodiments as depicted in FIG. 1B, a mobile phone 108 could undergo a configuration step 127. As depicted, the configuration step 127 can convert an access point 108*i* for mobile phone 108 from (a) operating with a set of user credentials 105 to (b) operating with the set of device default credentials 103. Additional details for a step 127 will be depicted and described in connection with FIG. 1C below and also FIG. 2A. A mobile phone 108 operated by a configuration user 108*a* may have an access point 108*i* that is initially configured for the configuration user 108*a* to connect the configuration user's 108*a* personal devices such as a laptop, a tablet, or other devices different than device 101. The initial configuration of access point 108*i* for mobile phone 108 could comprise the use of user credentials 105. That initial configuration for access point 108*i* by a configuration user 108*a* in a set of user credentials 105 would likely not be compatible or support the default configuration 103 for device 101, as depicted in FIG. 1B by "no connection". For example, any PSK in a set of user credentials 105 would normally be different than default credentials 103, in addition to specifying a different SSID.

The configuration step 127 can load default credentials 103 into mobile phone 108 and also temporarily backup user credentials 105, such that they can be automatically restored at a later time. A configuration step 127 could also comprise mobile phone 108 recording a ciphertext 222*a* where the plaintext inside ciphertext 222*a* can be the owner credentials 199 (also depicted and described in connection with FIG. 2A below). Or, in other exemplary embodiments the ciphertext 222*a* can be optionally omitted. Or, the owner credentials 199 can be recorded as plaintext in storage memory 108*f* in mobile handset 108 for a mobile phone configuration step 127, for embodiments where mobile phone 108 could also connect with AP 122*b*.

FIG. 1C

FIG. 1C is a graphical illustration of an exemplary system, where a mobile phone is configured to use a set of default credentials, in accordance with exemplary embodiments. FIG. 1B is illustrated to include several components that can be common within a mobile phone 108. Mobile phone 108 may consist of multiple components in order support configuration user 108*a* operating as both a mobile phone 108 as a configuration unit for device 101. In exemplary embodiments and as depicted in FIG. 1C, mobile phone 108 can include a device identity 108*b*, a processor 108*c* (depicted as "CPU 108*c*"), random access memory (RAM) 108*d*, an operating system (OS) 108*e*, storage memory 108*f*, a WAN radio 108*h*, a WiFi radio 108*i*, a system bus 108*j*, and a user interface 108*k*. FIG. 1C depicts mobile phone 108 as both an initial mobile phone 108 and a configured mobile phone 108', wherein the configuration step 127 can convert the mobile phone 108 to a configured mobile phone 108'. As depicted, both the mobile phone 108 and the configured mobile phone 108' can contain the same hardware components such as CPU 108*c*, RAM 108*d*, etc., where differences between the mobile phone 108 and a configured mobile phone 108' can be downloading and installation of a configuration application 108*g*, and changes in storage memory 108*f* and use of default device credentials 103 with a WiFi access point 108*i*

Device identity 108*b* could comprise a preferably unique alpha-numeric or hexadecimal identifier for mobile phone 108, such as a physical Ethernet or WiFi MAC address for WiFi radio 108*i*, an International Mobile Equipment Identity (IMEI), an owner interface identifier in an IPV6 network, a serial number, or other sequence of digits to uniquely identify each of the many different possible units for mobile phone 108*b* in a system 100. Note that a system 100 could include a plurality of different mobile phones 108 each using a different device identity 108*b*. Device identity 108*b* may also be depicted and referenced herein as ID.MP 108*b*. Device identity 108*b* can preferably be recorded in a non-volatile memory or written directly to hardware in mobile phone 108*b* by a manufacturer upon mobile phone manufacturing. In exemplary embodiments, a mobile phone 108 could use multiple different values for device identity 108*b*, such as a first device identity 108*b* for use with an access network 126 (e.g. IMEI or subscriber permanent identity or network access identifier) and a second device identity 108*b* for use with a configuration system 114 (e.g. a user name for configuration user 108*a*). Other possibilities exist as well for either a single device identity 108*b* or multiple device identities 108*b* without departing from the scope of the present invention.

The components of CPU 108*b*, RAM 108*d*, OS 108*e*, storage 108*f*, and system bus 108*j* can be similar to the components of CPU 101*b*, RAM 101*d*, OS 101*e*, storage 101*f*, and system bus 101*j*, respectively, depicted and described for a device 101 in FIG. 1E below. In exemplary embodiments, CPU 108*b*, RAM 108*d*, storage 108*f*, and system bus 108*j* can have greater functionality and capacity than the equivalent components for CPU 101*b*, RAM 101*d*, storage 101*f*, and system bus 101*j* below in FIG. 1E, since mobile phone 108 can support greater functionality and processing capability than a device 101, but the overall operation of the components can be similar. WAN radio 108*h* within mobile phone 108 can provide connectivity to an access network 126 through 3GPP standards such as 3G, 4G, 4G LTE, and 5G networks, or subsequent and similar standards. Note that WAN radio 108*h* can support an access network 126 from FIG. 1A that is a different access network 126 than used by a device 101, although the two access networks 126 could also be the same in exemplary embodiments. WAN radio 108*h* can provide connectivity to a configuration system 114 and WiFi radio 108*i* can provide connectivity to device 101 concurrently, such that a device 101 can communicate with configuration system 114 via both (i) WiFi radio 108*i* operating as an access point for device 101 using device default credentials 103 and (ii) WAN radio 108*h* providing connectivity to an IP network 128 and configuration system 114. System bus 108*j* can connect the WiFi radio 108*i* to WAN radio 108*h* in order for data to flow from WiFi radio 108*i* to WAN radio 108*h* (and also in the other direction).

A mobile phone 108 before a configuration step 127 could record a set of access point user credentials 105, where access point user credentials 105 were depicted and described in connection with FIG. 1B above. A mobile phone 108 operated by a configuration user 108*a* may have an access point 108*i* that is initially configured for the configuration user 108*a* to connect the configuration user's 108*a* personal devices such as a laptop, a tablet, or other devices different than device 101. The initial configuration of access point 108*i* for mobile phone 108 could comprise the use of user credentials 105. As depicted in FIG. 1C, a configuration step 127 for mobile phone 108 could backup or record any previously active credentials for operating as a WiFi access point, such as recording Access Point User Credentials 105 in a nonvolatile memory 108*f* in order to restore the credentials for configuration user 108*a* at a later time (e.g. during a step 129 below in FIG. 5).

Note that a nonvolatile memory 108*f* in a mobile phone 108 both before and after a configuration step 127 can record a certificate for the mobile phone comprising cert0.mobile-phone 108*m*. The certificate cert0.mobile-phone 108*m* can be used by a mobile phone 108 when authenticating with a configuration system 114, such as used when setting up a secure channel via transport layer security (TLS) and also similar standards that utilize public keys in certificates for authentication, key exchange, and encryption. WiFi radio 108*i* can also record a set of credentials for mobile phone 108 to utilize when mobile phone 108 operates as a WiFi client for configuration user 108*a*. The exemplary values depicted in FIG. 1C can comprise Client—User Credentials 180 and Client—Other Credentials 181. Although not depicted in FIG. 1C, Client—User Credentials 180 and Client—Other Credentials 181 can also continue to be recorded for a WiFi radio 108*i* both before and after a configuration step 127. As contemplated herein, WiFi radio 108*i* may not need to operate as a WiFi client in order to conduct a configuration step 102, but rather WiFi radio 108*i* can operate as an access point.

A configuration step 127 can include the download and activation of a configuration application 108*g* for mobile phone 108, where configuration application 108*g* can record a set of configuration parameters 151. Configuration application 108*g* can comprise a software program running in mobile phone 108 in order to support a configuration step 102 with device 101. Although depicted as a separate component for mobile phone 108 in FIG. 1C, configuration application 108*g* could be a program recorded in RAM 108*d* or storage 108*f* and also a process running within OS 108*e*. Configuration application 108*g* can be stored in nonvolatile memory 108*f* for mobile phone 109. Additional details regarding the form, originating source, and operation of a configuration application 108*g* are depicted and described in connection with FIG. 2A below. A configuration application 108*g* can be specified or identified or selected in a config-provisioning. ID.device 212 and launched in a step 213 below. Configuration parameters 151 can specify addresses and port numbers for configuration application 108*g* to operate in order to communicate with device 101. Additional details for configuration parameters 151 are depicted and described in connection with FIG. 1F-below and FIG. 2A. In summary, a configuration application 108*g* and configuration parameters 151 can be recorded and operating within a configured mobile phone 108' after a configuration step 127.

Figure 2C:
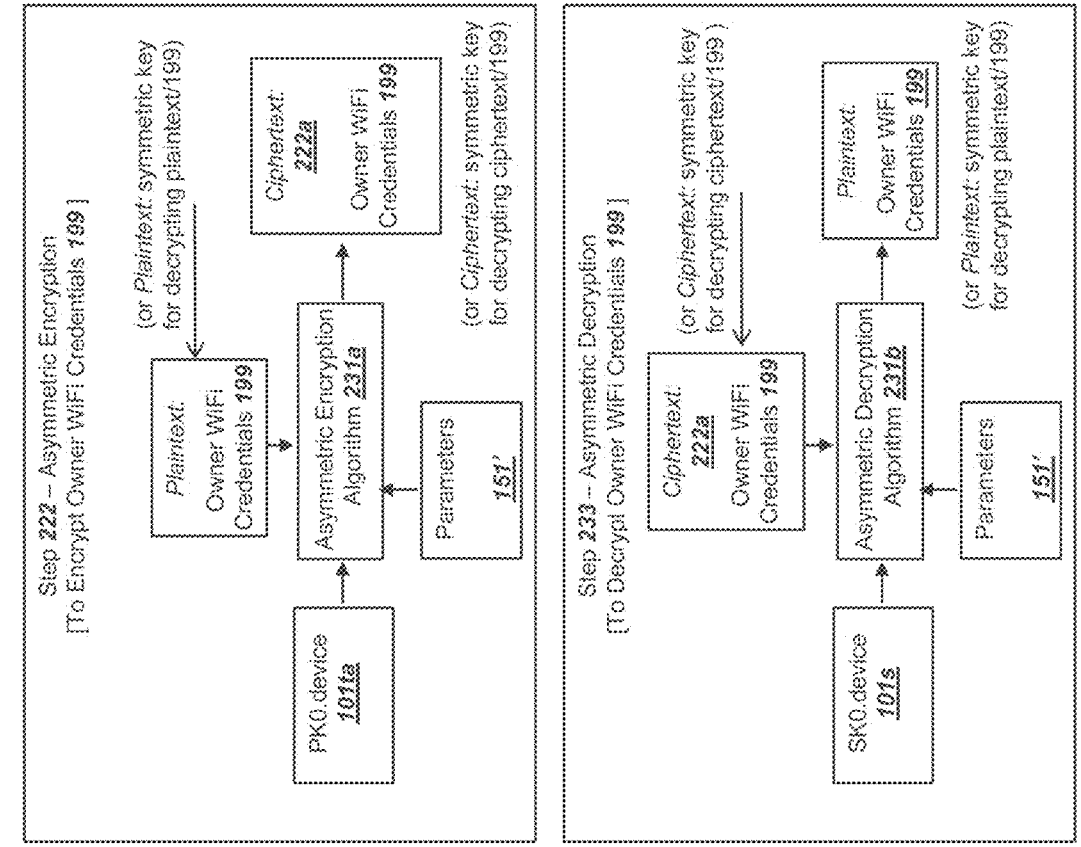
FIG. 2C is a flow chart illustrating exemplary steps for using asymmetric ciphering in order to encrypt a plaintext using a public key and decrypting a ciphertext using a secret key, in accordance with exemplary embodiments.
Figure 3:
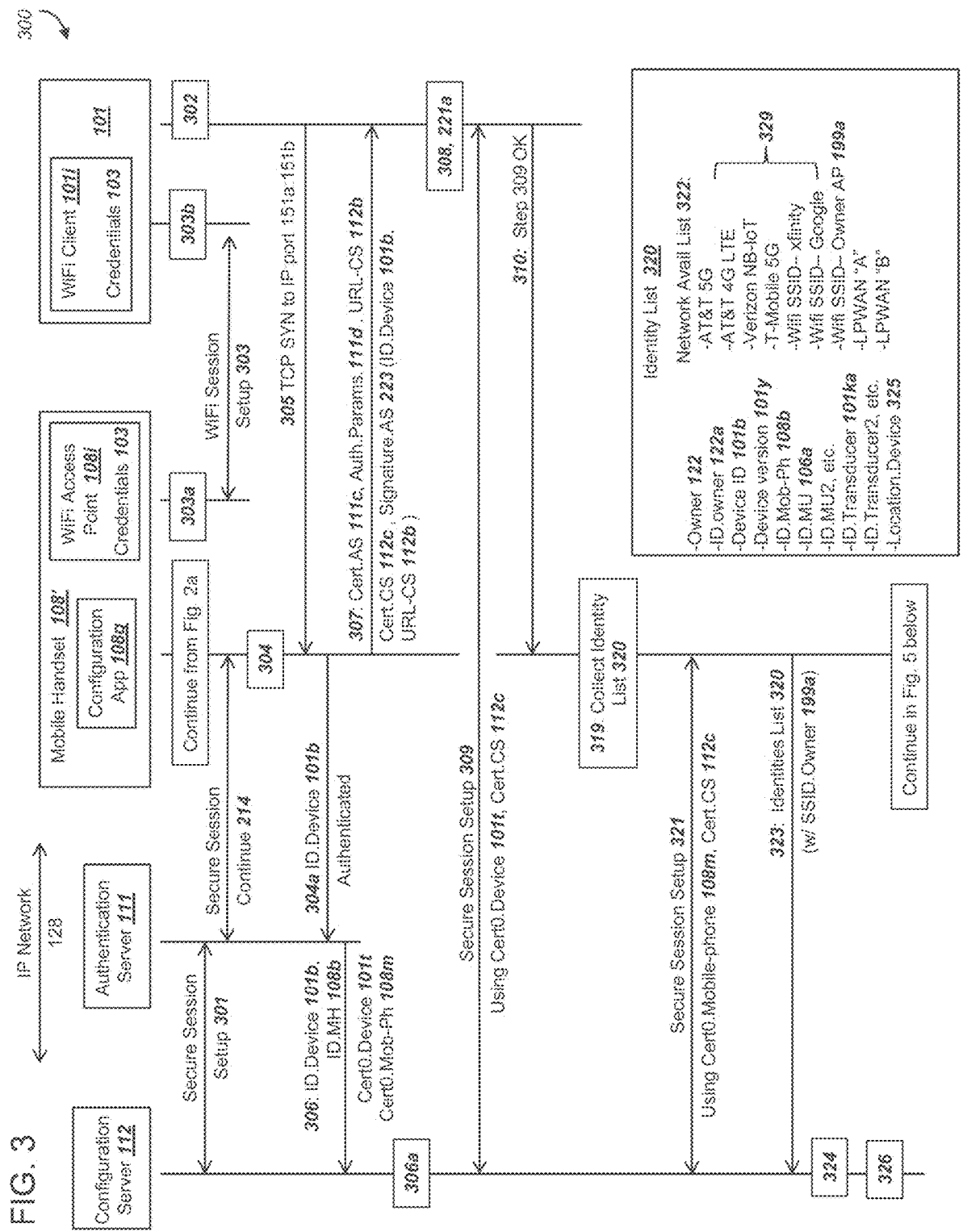
FIG. 3 is a simplified message flow diagram illustrating an exemplary system with exemplary data sent and received by a mobile phone, a device and a configuration server, in accordance with exemplary embodiments.
Figure 5:
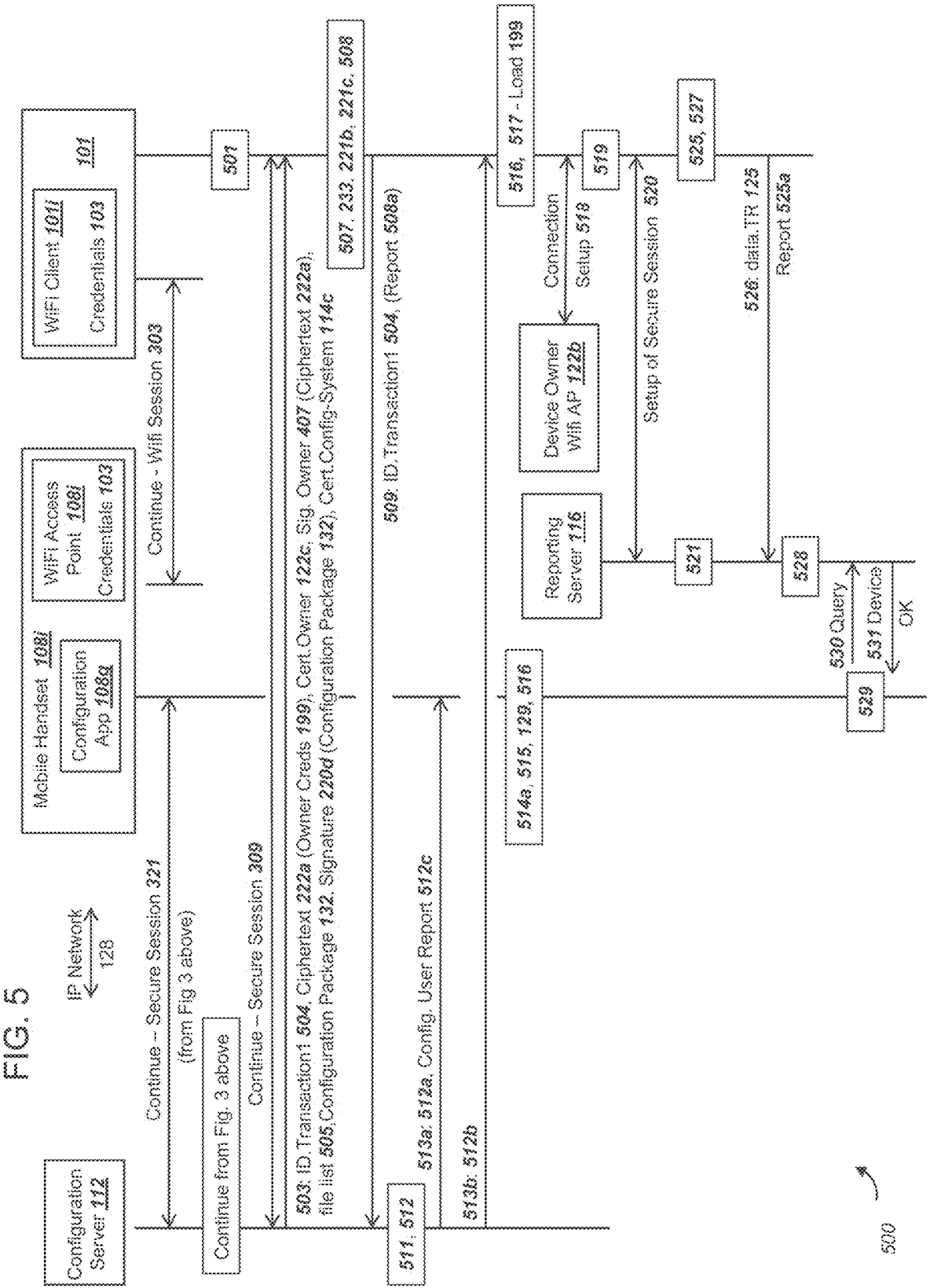
FIG. 5 is a simplified message flow diagram illustrating an exemplary system with exemplary data sent and received by a configuration server, a mobile handset and a device, in accordance with exemplary embodiments.

As depicted in FIG. 1C, a configuration step 127 can change the operation of WiFi radio 108*i*, such that WiFi radio 108*i* can begin operating as an access point with a set of device default credentials 103. The transfer of a copy of the set of device default credentials 103 to mobile phone 108 is depicted and described below in connection with FIG. 2A. Note that mobile phone 108 may not have had WiFi radio 108*i* actively turned on with user credentials 105 before a step 127, but in exemplary embodiments the set of user credentials 105 can be recorded in a mobile phone 108 before a configuration step 127. In exemplary embodiments, a user interface 108*k* can give the option for a configuration user 108*a* to activate WiFi radio 108*i* as an access point either with (i) user credentials 105, or (ii) device default credentials 103. By activating WiFi radio 108*i* with device default credentials 103 for device 101, device 101 can connect with mobile phone 108', as depicted in FIG. 3 and FIG. 5 below. In exemplary embodiments, a configuration application 108*g* can automatically apply device default credentials 103 without specific manual interfacing of configuration user 108*a* with user interface 108*k*.

In exemplary embodiments, a value for Config-default.device 103*c*' in a set of device default credentials 103 can specify a maximum power for WiFi radio 108*i* that is intentionally lower than normal operating power for WiFi radio 108*i* (and thus the use of 103*c*' instead of 103*c* for the depiction in FIG. 1C). In these exemplary embodiments, Config-default.device 103*c*' can specify that WiFi radio 108*i* operate with maximum transmit power of 0.1 to 1.0 milliwatts, as opposed to the traditional values of ~50-~200 milliwatts typical for regular WiFi operation. In this manner, the range of connectivity between mobile phone 108 and device 101 using device default credentials 103 can be intentionally reduced, since mobile phone 108 can be brought within a few meters of device 101 in exemplary embodiments. In exemplary embodiments, a value for Config-default.device 103*c* in a set of device default credentials 103 for device 101 can specify a maximum power for WiFi radio 101*i* in the range of ~50-~250 milliwatts, although other possibilities exist as well without departing from the scope of the present invention. Note that values for Config-default.device 103*c*' in mobile phone 108 can be appropriate to operate WiFi radio 108*i* as an access point, while Config-default.device 103*c* for device 101 can have compatible values for device 101 to operate WiFi radio 101*i* as a WiFi client.

After a configuration step 102 is completed for a device 101, a configuration application 108*g* or a configuration user 108*a* can conduct a mobile phone restore step 129. Mobile phone restore step 129 can restore WiFi radio 108*i* with user credentials 105, such that a configuration user 108*a* can utilize mobile phone 108 in the same manner as before a configuration step 127. In other words, without a mobile phone restore step 129, then the other devices for configuration user 108*a* may no longer connect with WiFi radio 108*i* as an access point. Although FIG. 1C depicts a mobile phone 108 before a configuration step 127 as operating without a configuration application 108*g*, a mobile phone restore step 129 can leave the configuration application 108*g* installed on mobile phone 108 instead of removing or uninstalling the application.

FIG. 1D

FIG. 1D is a graphical illustration of an exemplary system, where a mobile phone and a device are configured to use a set of default credentials, and the device receives a set of owner credentials and configuration packages, in accordance with exemplary embodiments. System 100*b* in FIG. 1D can include a device owner WiFi access point 122*b*, a device 101, and a configured mobile phone 108'. Device owner WiFi access point 122*b* and device 101 can comprise the same or equivalent elements depicted and described in connection with FIG. 1B above. Note device owner WiFi access point 122*b* and device 101 can continue to operate with "no connection" as depicted in FIG. 1B and FIG. 1D, since the two nodes may continue to record and operate with incompatible sets of credentials 199 and credentials 103. As described above, access point 122*b* could operate as a "g node b" for a 5G wireless network or as an access point for other wireless networking technologies than WiFi, and for these embodiments the access point 122*b* could operate with credentials 199 for device 101 to connect with access point 122*b*. Configured mobile phone 108' can have previously completed the configuration step 127 depicted and described above in connection with FIG. 1B and FIG. 1C. Mobile phone 108' can consequently operate WiFi radio 108*i* as an access point with set of device default credentials 103. Device 101 can be powered on or connected to an electrical source by configuration user 108*a*, and device 101 can begin using WiFi radio 101*i* as a WiFi client with device default credentials 103.

Since mobile phone 108' and device 101 operate with compatible device default credentials 103, device 101 can initiate a WiFi connection setup 303 with mobile phone 108'. Exemplary details for WiFi connection setup 303 are depicted and described in connection with FIG. 3 below. With basic networking connectivity established via WiFi connection setup 303, device 101 can receive through mobile phone 108' a message 503, where message 503 includes a ciphertext 222*a* with the set of owner WiFi credentials 199 (or credentials 199 if access point 122*b* operates with wireless technologies other than WiFi, such as access point 122*b* operating with 5G wireless technology). Exemplary details for message 503 are depicted and described in connection with FIG. 5 below. Exemplary details for ciphertext 222*a* are depicted and described in connection with FIG. 2C, FIG. 4, and FIG. 5 below. In summary, device 101 can receive and decrypt the ciphertext 222*a* in order to read the plaintext owner WiFi credentials 199. Device 101 can use a decryption step 233 as depicted in FIG. 2C below in order to decrypt ciphertext 222*a*. Device 101 can then conduct a device configuration step 102 using the owner WiFi credentials 199, where owner WiFi credentials 199 can allow connectivity through device owner WiFi access point 122*b*.

FIG. 1E

FIG. 1E is a graphical illustration of an exemplary system, where an access point and a device are configured to use a set of WiFi credentials, and the device communicates transducer data through the access point, in accordance with exemplary embodiments. System 100*c* in FIG. 1E can include a device owner WiFi access point 122*b* and a configured device 101'. Access point 122*b* could also operate with wireless technology other than WiFi, such as operating as a "g node b" with 5G wireless technology. Device owner WiFi access point 122*b* can comprise the same or equivalent element depicted and described in connection with FIG. 1B and FIG. 1D above. Configured device 101' can comprise the same hardware components as a device 101, with the difference being WiFi radio 101*i* can operate with owner WiFi credentials 199 in order to communicate with device owner WiFi access point 122*b*. Although not depicted in FIG. 1E, configured device 101' and device owner WiFi access point 122*b* could conduct a WiFi connection setup similar to WiFi connection setup 303 depicted above in FIG. 1D. By using compatible sets of owner WiFi credentials 199, the two nodes shown can communicate transducer data 125. In exemplary embodiments, device owner WiFi access point 122*b* (i) provides connectivity to an IP network 128 and in turn (ii) communicates transducer data 125 with a reporting system 120. Transducer data 125 can be encrypted in several manners, such as using TLS or DTLS, or potentially ciphering individual messages using temporal keys and elliptic curve Diffie Hellman key exchanges. Transducer data 125 as communicated between configured device 101' and device owner WiFi access point 122*b* can also be encrypted, such as using the standards within WPA2, WPA3, and subsequent or related standards.

As depicted in FIG. 1E, a configured device 101' can record a set of configuration packages 132, where data in the set of configuration packages 132 may be read, loaded, and operated on by configured device 101'. In other words, the data from a configuration package 132 can be active within a configured device 101'. In addition to the use of owner WiFi credentials 199 with radio 101*i*, a difference between device 101 and configured device 101' can be the loading and/or activation of configuration packages 132. Note that not all of the exemplary data in a set of configuration packages 132 depicted in FIG. 1E is required to conduct a configuration step 102 and operate a configured device 101', but in exemplary embodiments combinations of the depicted data for configuration packages 132 can be utilized by a configured device 101'.

The set of configuration packages 132 can also be transferred via WiFi connection 303, and will be depicted and described in FIG. 4 and FIG. 5 below. The set of configuration packages can include Device OS Updates 132*a*, Device Configuration 132*b*, Transducer libraries/drivers 132*c*, Transducer Configuration 132*d*, Monitoring Unit Configuration 132*e*, Reporting System Configuration 132*f*, Reporting Application Software 132*g*, Reporting System Credentials 132*h*, Configuration test vectors 102*a*, Certs 132*i* (cert.RS 116*c*, cert.CA2.root, 109*aa*), Backup WAN Credentials 126*a*, and Sub-package 132*z*. Certs 132*i* can comprise a collection of certificates for device 101 to utilize after a configuration step 102, and can include certificates for all certificate authorities depicted in FIG. 1A as well as their corresponding parent certificates through root certificates 109*aa*. Certificates 109*aa* can comprise a collection of root certificates to be added to device 101 for ongoing and future operation of device 101 after a configuration step. In exemplary embodiments, the set of certificates certs 131*i* can be securely received and loaded by device 101 since the set of configuration packages 132 is authoritatively signed by configuration server 112, as depicted and described in connection with FIG. 4 and FIG. 5 below.

A sub-package 132*z* can include information for device 101 not otherwise separately depicted, such as additional programs or files for device 101. In summary, a set of configuration packages 132 can comprise multiple files in a bound and signed package for device 101 to download and install. The configuration packages support device 101 changing from a manufactured device 101 state to a configured device 101' state. A set of configuration packages 132 may also be sent to device 101 via AP 122*b* instead of via the connection shown in FIG. 1E, instead of via WiFi session 303 in some exemplary embodiments.

FIG. 1F

FIG. 1F is a graphical illustration of hardware, firmware, and software components for a device, including a device configuration step, in accordance with exemplary embodiments. FIG. 1E is illustrated to include several components that can be common within a device 101. Device 101 may consist of multiple components in order to collect and transmit and receive transducer data 125 (shown in FIG. 1A) associated with a monitored unit 106. In exemplary embodiments and as depicted in FIG. 1E, device 101 can include a device identity 101*b*, a processor 101*c* (depicted as "CPU 101*c*"), random access memory (RAM) 101*d*, an operating system (OS) 101*e*, storage memory 101*f*, a WiFi radio 101*i*, a system bus 101*j*, and a transducer 101*k*. FIG. 1B depicts device 101 as both a manufactured device 101 and an owner WiFi configured device 101', wherein the manufactured device 101 can be converted into the owner WiFi configured device 101' using a configuration step 102. As depicted, both a manufactured device 101 and a WiFi configured device 101' can contain the same hardware components such as CPU 101*c*, RAM 101*d*, etc., where a difference between device 101 and 101' can be in both (i) data recorded in storage memory 101*f* and the configuration of WiFi radio 101*i*.

Device identity 101*b* could comprise a preferably unique alpha-numeric or hexadecimal identifier for device 101, such as an Ethernet MAC address, an International Mobile Equipment Identity (IMEI), an owner interface identifier in an IPV6 network, a serial number, or other sequence of digits to uniquely identify each of the many different possible units for device 101. Device identity 101*b* can preferably be recorded in a non-volatile memory or written directly to hardware in device 101 by device manufacturer 101*x* upon device manufacturing. The CPU 101*c* can comprise a general purpose processor appropriate for typically low power consumption requirements for a device 101, and may also function as a microcontroller. CPU 101*c* can comprise a processor for device 101 such as an ARM® based process or an Intel® based processor such as belonging to the Atom or MIPS family of processors, and other possibilities exist as well. CPU 101*c* can utilize bus 101*j* to fetch instructions from RAM 101*d* and operate on the instruction. CPU 101*c* can include components such as registers, accumulators, and logic elements to add, subtract, multiply, and divide numerical values and record the results in RAM 101*d* or storage memory 101*f*, and also write the values to an external interface such as WiFi radio 101*i* or transducer 101*k*.

RAM 101*d* may comprise a random access memory for device 101. RAM 101*d* can be a volatile memory providing rapid read/write memory access to CPU 101*c*. RAM 101*d* could be located on a separate integrated circuit in device 101 or located within CPU 101*c*. The RAM 101*d* can include data recorded in device 101 for the operation when collecting and communicating transducer data 125 regarding monitored unit 106. The system bus 101*j* may be any of several types of bus structures including a memory bus or memory controller, a peripheral bus, and a local bus using any of a variety of bus architectures including a data bus. System bus 101*j* connects components within device 101 as illustrated in FIG. 1E, such as transferring electrical signals between the components illustrated. Device 101 can include multiple different versions of bus 101*j* to connect different components, including a first memory bus 101*j* between CPU 101*c* and RAM 101*d*, and a second system bus 101*j* between CPU 101*c* and transducer 101*k*, which could be an I2C bus, an SPI bus, a USB, Dallas 1 wire, or similar data busses.

The operating system (OS) 101*e* can include Internet protocol stacks such as a User Datagram Protocol (UDP) stack, Transmission Control Protocol (TCP) stack, a domain name system (DNS) stack, a TLS stack, a datagram transport layer security (DTLS) stack, etc. The operating system 101*e* may include timers and schedulers for managing the access of software to hardware resources within device 101, including CPU 101*c* and transducers 101*k*. The operating system shown of 101*e* can be appropriate for a low-power device with more limited memory and CPU resources (compared to a server such as reporting server 116 and configuration server 112). Example operating systems 101*e* for a device 101 includes Linux, Android® from Google®, IOS from Apple®, Windows® 10 IoT Core, or Open AT® from Sierra Wireless®. Additional example operating systems 101*e* for a transducer device 101 include eCos, uC/OS, LiteOs, Contiki, OpenWRT, Raspbian, and other possibilities exist as well without departing from the scope of the present invention. Although depicted as a separate element within device 101 in FIG. 1E; OS 101*e* may reside in RAM 101*d* and/or storage memory 101*f* during operation of device 101.

Storage memory 101*f* (or "memory 101*f*") within device 101 can comprise a nonvolatile memory for storage of data when device 101 is powered off. Memory 101*f* may be a NAND flash memory or a NOR flash memory, and other possibilities exist as well without departing from the scope of the present invention. Memory 101*f* can record firmware for device 101. Memory 101*f* can record long-term and non-volatile storage of data or files for device 101. In an exemplary embodiment, OS 101*e* is recorded in memory 101*f* when device 101 is powered off, and portions of memory 101*f* are moved by CPU 101*c* into RAM 101*d* when device 101 powers on. Memory 101*f* (i) can be integrated with CPU 101*b* into a single integrated circuit (potentially as a "system on a chip"), or (ii) operate as a separate integrated circuit or a removable card or device, such as a removable SD card. Memory 101*f* may also be referred to as "device storage" and can include exemplary file systems of FAT16, FAT 32, NTFS, ext3, ext4, UDF, or similar file systems.

As depicted in FIG. 1F, nonvolatile memory 101*f* for a manufactured device 101 may also contain a set of configuration parameters 151, a secret key SK0.device 101*s*, a certificate cert0.device 101*t*, a certificate cert.CA0 107*a*, and a certificate cert.CA.root 109*a*. Configuration parameters 151 can comprise a set of parameters for device 101 to utilize when conducting a configuration step 102 in order for device 101 to access a remote process in order to download configuration files. As depicted in FIG. 1E, configuration parameters 151 can include an address 151*a*, a port number 151*b*, a protocol 151*c*, and an encryption algorithm 151*d*. The use of configuration parameters 151*a*, 151*b*, and 151*c* by device 101 is depicted and described in connection with message 305 in FIG. 3 below. Protocol 151*c* for configuration parameters 151 in FIG. 1E is depicted as "HTTP", but other protocols for downloading files or retrieving data from a remote process or server could be utilized as well, such as, but not limited to, HTTPS, file transfer protocol (FTP), and secure copy (SCP). Encryption algorithm 151*d* can specify the use of an asymmetric decryption algorithm 231*b*. Encryption algorithm 151*d* is depicted in FIG. 1F as ElGamal, which is described in FIG. 2C below, and other encryption algorithms discussed in FIG. 2C for a set of parameters 151 could be utilized as well.

A secret key SK0.device 101*s* in a nonvolatile memory 101*f* could comprise the private key for a PKI key pair, where the corresponding public key could be recorded in a certificate cert0.device 101*t*. The corresponding public key from a cert0.device 101*t* could comprise a PK0.device 101*ta* as depicted and described in connection with a step 223 in FIG. 2C below. A secret key SK0.device 101*s* and the corresponding public key in a certificate 101*t* could comprise values to use with asymmetric public key infrastructure (PKI) cryptography, and could utilize exemplary algorithms based on either Rivest Shamir Adleman (RSA) or elliptic curve cryptography (ECC). Secret keys and corresponding public keys as described herein could also support the use of post-quantum cryptographic algorithms, such as lattice-based, code-based, Supersingular Elliptic Curve Isogeny, or multivariate algorithms. For use of ECC algorithms, parameters within certificate 101*t* (and other certificates herein)

can specify elliptic curve names (e.g. NIST P-256, sect283k1, sect283r1, sect409k1, sect409r1, etc.). Further, elliptic curves that do not depend on parameters specified by NIST could be utilized as well, such as Curve22519 or FourQ.

For use of RSA algorithms, parameters within certificate 101$t$ can specify a modulus and other associated values for using an RSA PKI key pair. For either asymmetric algorithms RSA or ECC for a PKI key pair herein, parameters in a certificate can specify key lengths, a duration for key validity, uses of the PKI key pair such as for key derivation or signatures, encoding rules, message digest algorithms, etc. Parameters in certificate 101$t$ (and other certificates herein) may also include identifying information associated with the PKI key pair such as a sequence number, a serial number, a certificate revocation list or URL, a domain name of the server associated with the PKI key pair. In addition, a secret key such as SK0.device 101$s$ could comprise two secret keys, where the first key is used with a key exchange or key encapsulation mechanism, and the second key is used with digital signatures. Likewise, a certificate such as cert0.device 101$t$ could comprise two certificates, where (i) the first certificate is used with a key exchange or key encapsulation mechanism and corresponds with the first secret key SK0.device 101$s$, and (ii) the second certificate is used with digital signatures and corresponds with the second secret key SK0.device 101$s$.

Device 101 and 101' can include a WiFi radio 101$i$ to communicate wirelessly with networks such as AP 122$b$ and access network 126 depicted and described in FIG. 1A above. In exemplary embodiments, access network 126 can comprise all available wireless WAN and LAN networks in the range of device 101, such as the exemplary networks listed in a networks available list 322 depicted in FIG. 4 below. Device owner WiFi access point 122$b$ can comprise a member of the set of all access networks 126 for device 101. Radio 101$i$ could connect with an antenna in order to transmit and receive radio frequency signals. Although not depicted in FIG. 1F, for alternative embodiments after a configuration step 102 then device 101 could utilize a wired connection such as Ethernet for external communication instead of or in addition to a WiFi radio 101$i$.

WiFi radio 101$i$ can include standard radio components such as RF filters, RF amplifiers, a clock, and phased loop logic (PLL), and may be connected with an antenna. WiFi radio 101$i$ can support protocols and specifications according to the IEEE 802.11 family of standards. For example, if WiFi radio 101$i$ operates according to 802.11n standards, WiFi radio 101$i$ could operate at a radio frequency of 2.4 or 5 GHz. In other embodiments where WiFi radio 101$i$ supports 802.11ac standards, then WiFi radio 101$i$ could also support radio frequencies of 0.054 through 0.79 GHz in order to operate in "white space" spectrum. Other possibilities exist as well for WiFi radio to support wireless LAN standards or 802.11 standards and radio frequencies, without departing from the scope of the present invention. WiFi radio 101$i$ can access a nonvolatile memory 101$f$ in order to record the depicted configuration values of default configuration credentials 103 and/or owner WiFi credentials 199, where the nonvolatile memory could be within WiFi radio 101$i$, or WiFi radio 101$i$ could access memory 101$f$ via bus 101$j$ in order to read the values.

As depicted in FIG. 1E, a WiFi configured device 101' can include configuration data resulting from a configuration step 102, in order for device 101' to operate in a system 100 and send transducer data 125 to reporting system 120. A nonvolatile memory 101$f$ for a WiFi configured device 101' can include data recorded for a manufactured device 101, with the addition of recording device default credentials 103 and configuration packages 132 from a configuration step 102. In exemplary embodiments, device default credentials 103 were initially configured with WiFi radio 101$i$ for a manufactured device 101, allowing the data flow for message 503 depicted in FIG. 1D above, and described in detail below with FIG. 5. In exemplary embodiments and as depicted in FIG. 1F, a configured device 101' can also record a set of root certificates 109$aa$ which could be included in a configuration package 132. Root certificates 109$aa$ can comprise the list or a subset of the list of included root certificates from the Mozilla Foundation with Mozilla projects, where the aggregate list of community approved root certificates and associated parameters is in the widely distributed file certdata.txt from the Mozilla web site. For some exemplary embodiments, a first set of root certificates 109$aa$ could be recorded in device 101 during manufacturing or initial configuration, and a second set of root certificates 109$aa$ could be included in a configuration package 132.

Device 101 may also optionally include user interface 101$y$ (not shown but similar to user interface 108$k$ in FIG. 1C) which may include one or more devices for receiving inputs and/or one or more devices for conveying outputs. User interfaces are known in the art and may be simple for many devices such as a few LED lights or and LCD display, and thus user interfaces are not described in detail here. User interface 101$y$ could comprise a touch screen if device 101 as more sophisticated interaction with user 101$a$. Device 101 can optionally omit a user interface 101$y$, if no user input or display is required for operating device 101 with monitored unit 106. Although not depicted in FIG. 1F, device 101 can include other components to support operation, such as a clock, power source or connection, antennas, etc. Although transducer 101$k$ in FIG. 1F is depicted as internal to device 101, transducers 101$k$ could be external to device 101, or device 101 could utilize a mix of internal and external transducers 101$k$ connected with a transducer interface such as a universal serial bus (USB). Other possibilities exist as well without departing from the scope of the present invention.

In exemplary embodiments, device 101 can also include a wide area network radio 101$h$, which could be similar to a WAN radio 108$h$ described above for mobile phone 108 in FIG. 1C. WAN radio 108$h$ could support 4G LTE, 5G, and subsequent or related standards for use of devices with licensed radio spectrum operating potentially as public land mobile networks (PLMN). WAN radio 101$h$ could also support wide area narrow-band technologies such as NB-IoT or LPWAN such as Sigfox, and other examples exist as well. In exemplary embodiments, WAN radio 101$h$ can function as a backup or failover to provide connectivity to an IP network 128 if local WiFi via AP 122$b$ is not available, such as through a device owner WiFi access point 122$b$ as depicted in FIG. 1B. For embodiments where AP 122$b$ operates with other wireless technologies than WiFi, then WAN radio 108$h$ could connect with AP 122$b$ using credentials 199, where credentials 199 could be received during a configuration step 102, including through a message 503 depicted and described in connection with FIG. 5 below.

As one exemplary embodiment, a device 101 could (i) include a battery backup and (ii) be a security alarm system for a building and (iii) connect via access point 122$b$. The access point 122$b$ for device 101 and/or associated DSL or cable model could be powered from wall power. If the electrical power to the building goes down, then device 101 operating as a security alarm (even when operating on battery) could be disconnected from IP network 128 without the backup access network 126 depicted in FIG. 1A. However, with a WAN radio 101*h* and credentials 126*a*, device 101 could connect failover or connect with access network 126 using the credentials 126*a*, since a remote base station and BTS for access network 126 could remain powered and providing service. Thus, device 101 could use credentials 126*a* and radio 101*h* to maintain connectivity to reporting system 120 via access network 126 if AP 122*b* is not available. Many other possibilities exist as well for reasons why a device 101 would want to use credentials 126*a* with a WAN radio 101*h*, without departing from the scope of the present invention. In exemplary embodiments, WAN radio 101*h* could include an embedded universal integrated circuit card (eUICC), and credentials 126*a* could comprise an eUICC profile.

Although not depicted in FIG. 1E, the various servers shown above in FIG. 1A such as configuration server 112 and reporting server 116 and other servers as well can include equivalent internal components as device 101 in order to operate as servers. The servers in FIG. 1A could include a processor similar to CPU 101*c*, with primary differences for the processor server being increased speed, increased memory cache, an increased number and size of registers, the use of a 64 bits for datapath widths, integer sizes, and memory address widths, as opposed to an exemplary 32 or 16 bits for CPU 101*c* in device 101. Similarly, RAM in a server could be a RAM similar to RAM 101*d* in device 101, except the RAM in a server could have more memory cells such as supporting exemplary values greater than an exemplary 2 gigabytes, while RAM 101*d* in device 101 could support fewer memory cells such as less than an exemplary 1 gigabyte. Non-volatile memory for storage in a server in FIG. 1A could comprise disks, "solid state drives" (SSDs) or "storage area networks" (SAN) for a server. Instead of a radio 101*i*, in exemplary embodiments, a server in FIG. 1A could use a physical, wired LAN interface such as a high-speed Ethernet or fiber optic connection.

FIG. 2A

FIG. 2A is a simplified message flow diagram illustrating an exemplary system with exemplary data sent and received by a mobile phone, in accordance with exemplary embodiments. System 200 can include a mobile phone 108, device 101, a discovery server 110 and authentication server 111. Mobile phone 108 can communicate with discovery server 110 and authentication server 111 via IP network 128, where access to IP network 128 can be provided via access network 126 for mobile phone 108 as depicted in FIG. 1A. Mobile phone 108 can comprise a smart phone such as, but not limited to, a phone based on an Android operating system from Google® or IOS from Apple®, and other possibilities exist as well. In addition, a mobile computing device with both a wireless WAN and wireless LAN connectivity could be used instead of a mobile phone 108 in system 200, such as a tablet, laptop computer, e-reader, etc.

The present disclosure also contemplates that a fixed station configuration unit 108 could be utilized instead of a mobile phone 108 in order to conduct the configuration step 102 with device 101. In exemplary embodiments, a fixed station configuration unit 108 could comprise a server operated by a device owner 122 or device manufacturer 101*x* in order to configure a plurality of devices 101 at the same physical location before being deployed to monitored units 106. For these embodiments with a fixed station configuration unit 108, the fixed station configuration unit 108 could include components equivalent to a mobile phone 108 depicted and described in connection with FIG. 1C above.

Mobile phone 108 can include a battery, radio, and touch screen, as well as a camera 108*r*. Mobile phone 108 can connect with access network 126 in order to communicate with discovery server 110 and authentication server 111, as depicted in FIG. 1A above. The access network 126 used in a system 200 can be a different access network than access network 126 used by device 101 in FIG. 1A and FIG. 5. In exemplary embodiments, access network 126 can comprise a wireless WAN such as 4G LTE, 5G, etc, which can comprise a primary access network for mobile phone 108 and backup network for device 101 (where the primary for device 101 can comprise a wireless LAN).

Device 101 in system 200 can comprise a device 101 depicted in FIG. 1A, FIG. 1B and FIG. 1F, and device 101 can also include a tag 101*r*. Tag 101*r* can comprise a recorded image on device 101 or packaging of device 101 and could be a bar code, QR code, or a serial number for device 101. Tag 101*r* can provide a unique identifier for device 101. In exemplary embodiments, if device 101 is a medical device, then tag 101*r* can correspond to a Unique Device Identification (UDI). Although a device 101 could include a plurality of different tags 101*r* or markings for different purposes (such as shipping, inventory, a distributor code, etc.), for the purposes of conducting a configuration step 102 and a read step 203 below by a mobile phone, the tag 101*r* as contemplated herein by device 101 could include distinct markings for a configuration user 108*a* to identify as the code to read for conducting a configuration step. The distinct markings could comprise a pictogram or icon for a mobile phone next to the tag 101*r*, an outline around the tag 101*r* in a bright paint or distinguished color, and other possibilities exist as well for a device 101 to distinguish a tag 101*r* for a configuration user 108*a* from other markings, codes, serial numbers, etc. that may exist on a device 101.

Although FIG. 2A depicts a mobile phone 108, a configuration unit as described above in FIG. 1A and as a fixed station configuration unit 108 above could be utilized in system 200 instead of a mobile phone 108. The configuration unit could perform equivalent steps and conduct equivalent message flows as depicted in FIG. 2A, FIG. 3, and related figures below. In other words, a configuration unit could be a device that is different than a regular mobile phone 108 or 108', but perform similar steps and provide similar functionality. In an exemplary embodiment, mobile phone 108 could be a configuration unit customized for operation in systems 100, 200, 300, etc. Mobile phone 108 is depicted for preferred exemplary embodiments because mobile phone 108 could be a relatively ubiquitous piece of equipment for a device user 101*a* or configuration user 108*a*, but other equipment could provide equivalent functionality as mobile phone 108.

Either a configuration unit or mobile phone 108 operating in system 200 and related systems below can implement similar components to those depicted in FIG. 1C for a mobile phone 108 or 108', such as having a processor, memory, data bus, radio, storage, etc. The storage and memory of a configuration unit or mobile phone 108 could record an operating system to manage the hardware devices for mobile phone 108 or a configuration unit, and a software or configuration application 108*g* depicted in FIG. 1A and FIG. 3 could conduct the message flows for unit 108 herein. In other words, for exemplary embodiments using a configuration unit operating instead of the depicted "mobile phone" 108, the configuration unit could also include a configuration application 108*g*, and an WiFi radio 108*i*, etc. as depicted herein for mobile phone 108.

In another embodiment for FIG. 2A, tag 101r could comprise a "near field communications" NFC tag such as a tag compatible with the NFC Forum standards for type 1 through type 5 tags (and subsequent or related standards). The NFC technology could also be NFC-A, NFC-B, or NFC-V, or subsequent standards. For these exemplary embodiments where tag 101r comprises an NFC tag, then mobile phone 108 could use an NFC reader instead of camera 108r, and the NFC reader could comprise an NFC radio. Mobile handset 108 could utilize an NFC chip and antenna, where the NFC chip operates in read mode with tag 101r for device 101 as an NFC tag. In exemplary embodiments, discovery server 110 can include or be associated with a discover server database 110a. Database 110a could record information about a plurality of devices 101, such as ID.device 101b, and ID-token.device 206, and a dataset config-provisioning.ID.device 212, which will be described in further detail below for FIG. 2A.

At step 201 in FIG. 2A, device 101 can be in a powered off state. For a step 201 device 101 could be shipped from a manufacturer to a distributor and then to a device user 101a or a configuration user 108a. A device 101 could also be taken to the physical proximity of a monitored unit 106 in a step 201. In some embodiments, device 101 could be powered on at step 201, although power for device 101 is not required for embodiments with the steps and message flows outlined in FIG. 2A. At step 202, mobile phone 108 could be powered on and placed in proximity of device 101. Mobile phone 108 could be operated by a device user 101a or a configuration user 108a at step 202. At step 203, device user 101a or configuration user 108a could use mobile phone 108 to conduct a "read" step 203, where mobile phone 108 can (i) take a picture of a tag 101r for device 101, or (ii) read a bar code, QR code, printed serial number, or similar code or markings on device 101. As mentioned above, tag 101r could comprise a bar code, QR code, or other encoding of data for device 101, including a serial number. For the alternative embodiment where (i) mobile phone 108 uses an NFC reader and (i) tag 101r comprises an NFC tag, the mobile phone 108 could conduct an NFC read of tag 101r for step 203 and step 204.

At step 204, mobile phone 108 can receive data from tag 101r, such as a response, where the response can consist of a uniform resource locator (URL) for discovery server 110, URL-DS 205, an ID-token.device 206, and a tag value 101w. The response at step 204 could be recorded in the tag 101r. URL-DS 205 could include a domain name for discovery server 110 and parameters such as the use of HTTP or HTTPS and a destination TCP or UDP port number for sending packets to discovery server 110. ID-token.device 206 could be a token for ID.device 101b, or a value or unique pseudo-random number associated with device 101 and/or ID.device 101b. ID-token.device 206 could be a value that obfuscates ID.device 101b but can preferably uniquely map to ID.device 101b in a system 100 or 200 with a plurality of devices 101. Through the use of ID-token.device 206 that is readable by mobile phone 108, then the actual value for ID.device 101b can remain confidential at step 204.

Tag value 101w in response can include data associated with tag 101r and device 101, such as versions of software supported, product validity or expiration dates, a public key PK0.device 101ta, cryptographic parameters supported (e.g. RSA, ECC, or post-quantum cryptographic algorithms), a curve name utilized for an ECC cryptographic algorithm, a name or URL for Certificate Authority 107 used by manufactured device 101, a certificate for device cert0.device 101t, or a subset of config-provisioning.ID.device 212. In an exemplary embodiment, tag value 101w could comprise some values of config-provisioning.ID.device 212 upon manufacturing of device 101, which could be subsequently updated at a later date in discovery server DB 110a before installation or operation of device 101. For exemplary embodiments where tag 101r comprises a bar code or QR code or similar markings, then tag value 101w can be limited to fewer bytes such as identifying a certificate authority 107 and a serial number/identifier for cert0.device 101t (where the serial number/identifier could be used by mobile phone 108 to fetch the full cert0.device 101t from the certificate authority 107). For exemplary embodiments where tag 101r comprises an NFC tag capable of storing an exemplary few thousand bytes, then tag value 101w could include more values and data listed in the first sentence of this paragraph.

At step 207, mobile phone 108 could process the data received in response 204. For embodiments where tag 101r is an image such as a bar code or QR code, at step 207 mobile phone 108 could process the image and extract the data or values for ID-token.device 206, URL-DS 205, and tag value 101w. Continuing at step 207, mobile phone 108 could connect with an access network 126 in order to call the URL in URL-DS 205, which could be an HTTPS/TLS session in exemplary embodiments. In exemplary embodiments, URL-DS 205 is combined with ID-token.device 206, such that the HTTPS session is a unique request to discovery server 110 for each device 101. In exemplary embodiments, the value ID-token.device 206 can have enough information entropy or pseudo randomness that it cannot be easily guessed, such as (i) appearing to be a 16 or 32 byte random number, and (ii) not related to a value ID-token.device 206 for another device in any externally observable manner such as in sequence, or sharing similar common factors, etc.

By combining a URL-DS 205 with a unique and a sufficiently randomized ID-token.device 206, only a mobile phone 108 physically in the presence of device 101 could feasibly query discovery server 110 with a fully and properly formed query to fetch the subsequent data from discovery server 110. At step 207, mobile phone 108 could perform additional checks and steps in preparation for communication with device 101, such as verifying data in tag value 101w is compatible with software or settings in mobile phone 108, including configuration application 108g (if configuration application 108g is already installed).

In message flow 208, mobile phone 108 can establish a secure HTTPS session with discovery server 110 using the URL-DS 205, and the secure session could comprise a transport layer security (TLS) session such as TLS version 1.2, TLS version 1.3, or similar and subsequent standards. As part of the setup of message flow 208, mobile phone 108 can receive a certificate cert.DS 110c from discovery server 110. Cert.DS 110c could comprise an X.509 certificate and include a signed public key for discovery server 110. In exemplary embodiments, mobile phone 108 verifies the certificate cert.DS 110c using the public key in certificate cert.CA1 115a (which may require mobile phone 108 fetching certificate cert.CA1 115a from certificate authority 115). The verification of signatures using public keys in certificates is similar to the steps for verifying signatures outlined below in step 221 for FIG. 2B. Note that a secure session 208 is not required for some exemplary embodiments, and confidentiality and/or data integrity could be acquired via other means besides HTTPS and/or TLS or DTLS, including embodiments were data flow from discovery server 110 to mobile phone 108 be signed using a signature step 220 in FIG. 2B below. Other possibilities exist as well for a message flow 208 to be adequately secured.

In exemplary embodiments mobile phone 108 can also authenticate with discovery server 110, such as a configuration user 108a associated with mobile phone 108 entering user credentials in a web site for discovery server 110. Or mobile phone 108 could send discovery server 110 a certificate for mobile phone 108 Cert0.Mobile-Phone 108m, which the discovery server 110 could verify using a signature verification step 221 in FIG. 2B. As contemplated herein, a message flow 208 and all subsequent message flows depicted and described can comprise a series of parts or sub-messages, where the collection of sub-messages or parts can comprise the message. In other words, a message depicted with multiple elements for sets of data within the message does not require that all data be transferred together or in a single flow of TCP or UDP data. Transferring the message could comprise sending exemplary data within the message in parts, where upon conclusion of the message, (i) exemplary data depicted and described could be transferred in parts or portions and (ii) the collection of sending different parts or portions for the message could comprise sending the message.

In message 209 and after the secure HTTPS/TLS session setup in message flow 208, mobile phone 108 can send discovery server 110 ID-token.device 206 and data from tag value 101w. Or, the value for ID-token.device 206 could be included in the URL called by mobile phone 108 when accessing discovery server 110, and in this manner a value ID-token.device 206 does not need to be sent again in a separate message 209. Mobile handset could alternatively send discovery server 110 a subset of the data for ID-token.device 206 and/or tag value 101w.

At step 210, discovery server 110 can use data in ID-token.device 206 to query discovery server database 110a for the values or data sets ID.device 101b and config-provisioning.ID.device 212. Discovery server database 110a may comprise a database with tables to track configuration information for a plurality of devices 101. A device manufacturer 101x could send initial data for a device 101 to discovery server 110 and discovery server database 110a. In exemplary embodiments, config-provisioning.ID.device 212 contains data used by mobile phone 108 for the configuration of device 101. Exemplary data depicted for config-provisioning.ID.device 212 in FIG. 2A includes configuration application "configuration application" 108g, configuration parameters 151, version number 212a, ID.Authentication Server 111a, URL-authentication Server 111b, cert.AS 111c, auth. parameters 111d. Additional or other data for mobile phone 108 and device 101 could be included in discovery server database 110a and values for config-provisioning. ID.device 212.

The value config-provisioning.ID.device 212 can comprise a set of values or a table of data for mobile phone 108 and/or a configuration application 108g to use in order to conduct a configuration step 102 with device 101, where a specific device 101 can be identified by either ID-token.device 206 or ID.device 101b. In exemplary embodiments, the values for config-provisioning.ID.device 212 also includes the default root certificates 109a recorded by device 101 before a configuration step 102. Mobile phone 108 and configuration system 114 can use the default root certificates 109a to confirm that any subsequent certificates sent by configuration system 114 and mobile phone 108 for device 101 could be verified by device 101 using the default root certificates 109a. In other words, subsequent certificates received by device 101 such as cert.CS 112c in a message 307 in FIG. 3 could be confirmed or know by configuration system 114 as verifiable by root certificated 109a recorded in device 101 and included in a set of values for config-provisioning.ID.device 212. Config-provisioning.ID.device 212 could also be referred to herein as configuration parameters or a set of configuration parameters.

Configuration application 108g in a config-provisioning.ID.device 212 can specify the name or URL of a software application for mobile phone 108 to utilize (e.g. a field with less than a few hundred bytes), instead of comprising the full software package for configuration application 108g in exemplary embodiments (which could comprise several megabytes or more). For these exemplary embodiments, mobile phone 108 could utilize the name or URL to fetch the software for configuration application 108g. Configuration application 108g could be a public or private application for the operating system 108e of mobile phone 108. For embodiments where mobile phone 108 utilizes an Android-based operating system, configuration application 108g could be downloaded from the Google Play store or a private web site associated with configuration system 114. For embodiments where mobile phone 108 utilizes an Apple®/IOS-based operating system, configuration application 108g could be distributed through a developer enterprise program or downloaded through iTunes R. Other possibilities exist as well without departing from the scope of the present invention for a mobile phone 108 to download a configuration application 108g, where the name of configuration application 108b is received from a discovery server 110, after mobile phone 108 sends a message 209 to a discovery server 110.

As depicted in FIG. 2A, values for config-provisioning.ID.device 212 sent to mobile phone 108 may also include configuration parameters 151 and version number 212a. Configuration parameters 151 may include values and data for mobile phone 108 to utilize with configuration application 108g and communicate with device 101 using a WiFi radio 108i. Exemplary uses of parameters 151 with mobile phone 108 conducting a configuration step 102 can comprise (i) cryptographic algorithms to utilize, (ii) ECC curve names and key lengths and associated data, (iii) selection and parameters for a WiFi radio 108i in mobile phone 108 to communicate with device 101, including the selection of one of multiple possible radios in mobile phone 108, (iv) addresses, names, and port numbers to utilize with IP network 128, (v) timers and retry counts for communication with device 101 or configuration server 112 or authentication server 111, (vi) parameters for configuration system 114, (vii) parameters for communicating with device 101, etc. Version number 212a for config-provisioning.ID.device 212 may specify a version number of configuration application 108g to utilize, or a list or dataset of version numbers of standards supported, such as IP version of IP network 128, WiFi radio 101i type such as 802.11ac or 802.11ax, TLS or DLTS version supported by device 101, etc. In exemplary embodiments, not all of the values depicted for config-provisioning.ID.device 212 are sent from a discovery server 110 to a mobile phone 108, and only a subset of the depicted values are sent instead.

As depicted in FIG. 2A, config-provisioning.ID.device 212 sent to mobile phone 108 may also include ID.authentication Server 111a, URL-authentication Server 111b, cert.AS 111c, auth. parameters 111d. ID.Authentication Server 111a could comprise an identity or name for authentication server 111, such as a domain name or multiple domain names for multiple servers. URL-Authentication Server 111b could comprise a URL for configuration application 108g to call in order to authenticate with authentication server 111. In some exemplary embodiments, URL-authentication server 111b includes either ID.Device 101b or ID-token. Device 206, so that when mobile phone 108 using configuration application 108g calls URL-authentication Server 111b, the URL includes a unique string that identifies device 101.

In another exemplary embodiment, mobile phone 108 can (a) call URL-authentication server 111b without an identity for device 101, and subsequently (b) send either ID.Device 101b or ID-token. Device 206. Cert.AS 111c could comprise a certificate for authentication server 111 where cert.AS 111c could include (i) a public key for authentication server 111 and (ii) a signature of a certificate authority. In exemplary embodiments, a certificate cert.CA1 115a for a certificate authority 115 associated with cert.AS 111c is sent with cert.AS 111c in a message 211. Authentication parameters 111d can include parameters for configuration application 108g to utilize with authentication server 111, such as, but not limited to, hash or message digest algorithms, digital signature algorithms, padding schemes, key lengths, nonce or challenge lengths, timers, and retry counts, encoding rules, TLS or DTLS versions supported, cipher modes supported (e.g. AES-CBC, AES-CTR), etc. In exemplary embodiments, authentication parameters 111d can include the parameters supported by root certificates 109a recorded by device 101 before a device configuration step 102.

Figure 2B:
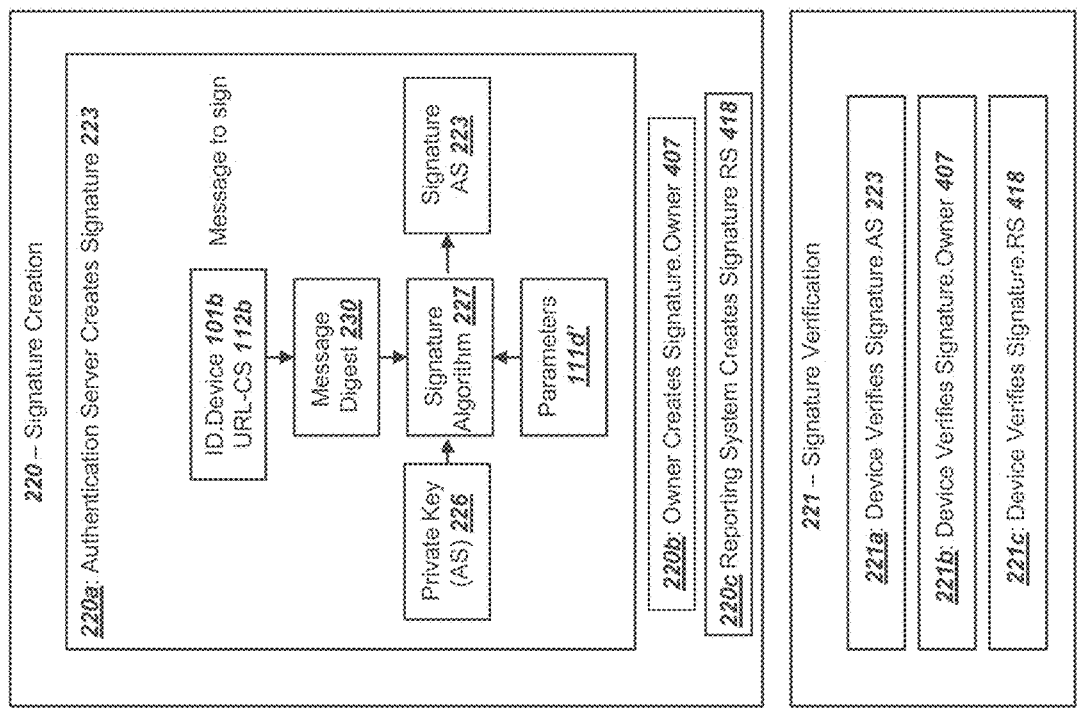
FIG. 2B is a flow chart illustrating exemplary steps for creating and verifying a digital signature using PKI keys, parameters, and data input, in accordance with exemplary embodiments.

Message 211 from discovery server 110 to mobile phone 108 can communicate the above fields and values described for config-provisioning.ID.device 212 and ID.device 101b, as depicted in FIG. 2A. In an exemplary embodiment, discovery server 110 can send mobile handset the full configuration application 108g with the response 211 (e.g. several megabytes or more) instead of a name or URL for configuration application 108g (e.g. less than a few hundred bytes), if the current, updated configuration application 108g is not already downloaded by mobile phone 108. In another exemplary embodiment, mobile phone 108 can download configuration application 108g in a step 213 as depicted in FIG. 2A, if mobile phone 108 has not already installed the software for configuration application 108g after receiving response 211. For example, response or message 211 could include a version number 212a that is higher or different than initially utilized by mobile phone 108 and/or an initial configuration application 108g, and consequently the higher version number 212a could indicate to mobile phone 108 that a different configuration application 108g would be required. In exemplary embodiments, configuration application 108g downloaded in a step 213 can include a hash signature created using a signature creation 220 step as depicted in FIG. 2B below.

Step 213 may comprise mobile phone 108 launching the configuration application 108g and applying a subset of configuration parameters 151 or tag-value 101w. If any of the steps depicted in FIG. 2A fail, error codes or messages could be displayed through mobile phone 108 to configuration user 108a. After successful launch of configuration application 108g, mobile phone 108 can connect with authentication server 111. The subsequent steps shown performed by a mobile phone 108 after a step 213 in FIG. 2A could be performed by a configuration application 108g using data within config-provisioning.ID.device 212. In exemplary embodiments, configuration application 108g could be included with the operating system 108e for mobile phone 108, and in this case a separate download of configuration application 108g may not be required.

Secure session setup 214 could comprise a secure HTTPS session with authentication server 111 using the URL-authentication server 111b, and the secure session could comprise a transport layer security (TLS) session such as TLS version 1.2, TLS version 1.3, or similar and subsequent standards. Other networking standards besides HTTPS and TLS could be utilized as well for secure session setup 214, such as an IPSec tunnel. As part of the setup of secure session setup 214, mobile phone 108 can receive a certificate cert.AS 111c from authentication server 111, if mobile phone 108 had not already received cert.AS 111c from discovery server 110. Mobile phone 108 could verify cert.AS 111c after receiving the certificate, such as verifying a signature from a certificate authority and parent certificates of cert.AS 111c as well. In other words, a secure session setup 214 can mutually authenticate both authentication server 111 and mobile phone 108, such as using certificates from both sides with TLS. An additional layer of authentication can be performed by a configuration user 108a, although authentication for all of authentication server 111, mobile phone 108, and configuration user 108a is not required for some embodiments.

In message 215, mobile phone 108 transmits authentication information to authentication server 111, and authentication server 111 verifies the authentication information in a step 217. The authentication information transmitted in a message 215 could comprise information to authenticate (i) configuration user 108a, (ii) mobile phone 108, or (iii) both configuration user 108a and mobile phone 108. The authentication information in message 215 may comprise a configuration user 108a entering identification and credential information in a touch screen of mobile phone 108, and the information is passed by mobile handset to authentication server 111 (possibly in an encrypted or hashed form). In exemplary embodiments, configuration user 108a provides biometric data such as a fingerprint, an image of the user's face, or similar data, where mobile phone 108 transmits confirmation or signatures for the data through secure session setup 214 to authentication server 111, and the authentication server 111 verifies the biometric data or signatures of the biometric data is associated to configuration user 108a.

Message 215 may also request the verification of mobile phone 108 with authentication server 111. In exemplary embodiments, mobile phone 108 records a certificate Cert0.Mobile-Phone 108m for mobile phone 108. The certificate for mobile phone 108 includes a public key and a signature by a certificate authority. In an authentication step 217, authentication server can use the information in message 215 to verify the identity of a configuration user 108a and/or mobile phone 108. In embodiments where mobile phone 108 uses a device certificate for mobile phone 108 (which could be a Cert0.Mobile-Phone 108m), authentication server 111 could verify that mobile phone 108 also records the private key, by sending a challenge/random nonce and verifying a signature from mobile phone 108 using the private key (and authentication server 111 verifies the signature using the public key for mobile phone 108 from Cert0.Mobile-Phone 108m). Message 215 and authentication 217 could be conducted using authentication parameters 111d, which could be previously included in Config-provisioning.ID.device 212.

Message 215 can also include a list of root certificates or certificate authorities 109a recorded by device 101, where the list of root certificates or certificate authorities 109a were included in provisioning configuration parameters Config-provisioning.ID.device 212. Note that root certificates or certificate authorities 109a and also include cryptographic parameters such as parameters 111d in order to use the root certificates or certificate authorities 109a. For some exemplary embodiments, root certificates or certificate authorities 109a could be optionally omitted from Config-provisioning.ID.device 212 and a configuration system 114 and authentication server 111 could obtain the root certificates or certificate authorities 109a for device 101 from a device owner 122 below from a step 219a and step 219b.

In step 216a of FIG. 2A, mobile phone 108 may also authenticate authentication server 111, using cert.AS 111c. In step 216b, configuration user 108a can enter device owner 122 information into mobile phone 108, such as an owner name, a DNS name associated with owner 122, or a code or other value to identify owner 122. Device owner 122 information could be automatically recorded for configuration application 108g or mobile phone 108 before a configuration step 102 from FIG. 1A. The value or information associated with device owner 122 may also be acquired from monitored unit 106, for embodiments where device owner 122 also owns or is responsible for monitored unit 106. The value associated with device owner 122 could be ID.owner 122a. In another exemplary embodiment, device owner 122 information could be recorded in mobile phone 108 earlier than a step 216b, and the information could be fetched from memory in a step 216b.

In some embodiments, the value of ID.owner 122a could be recorded in a tag 101r. Note that a tag 101r could also comprise a collection of different tags, such that a first tag could specify a URL-DS 205 (which could be a label or sticker applied by a manufacturer 101x), and a second tag could specify ID.owner 122a (which could be a label or sticker or mark applied by an owner 122). A step 216b can function to associate device 101 with device owner 122 for a configuration system 114 and/or reporting system 120. In exemplary embodiments, millions of devices 101 could be distributed out to thousands or more device owners 122, and configuration system 114 and reporting system 120, as well as device owner 122, may need to know which devices 101 have been configured and/or installed with monitored units 106. In an exemplary embodiment, the value ID.owner 122a could be included in a set of Config-provisioning.ID.device 212 for cases where device owner 122 can register the ID.device 101b with discovery server 110 before mobile phone 108 sends message 208 to discovery server 110.

In message 218, mobile phone 108 can send a first set of identities to authentication server 111 through the secure session setup in 214, and also send authentication parameters 111d. Note that in some embodiments the set of authentication parameters 111d can be sent from authentication server 111 to a mobile phone 108 in a response to message 218. The list of identities in a message 218 can include an ID.device 101b, ID.MH 108b, and ID.owner 122a, as depicted in FIG. 2A. In step 219a, authentication server 111 can process the first set of identities received in message 218. A step 219a could comprise authentication server 111 verifying that mobile phone 108 with configuration user 108a is authorized to configure device 101. In other words, the prior step 217 could be an initial step to verify or authenticate identities, and then the subsequent step 219a could be verifying that the authenticated identities have privileges or authorization to conduct a configuration step 102.

For a step 219a, authentication server 111 may communicate with device owner 122 in order to confirm that mobile phone 108 with configuration user 108a is authorized to conduct configuration step 102 on device 101 identified by ID.device 101b. Note that ID.device 101b could also comprise a network access identifier (NAI), where ID.device 101b includes both a device identity and a domain name, where the domain name is associated or used by a device owner 122. In other words, a value for ID.device 101b could support standards such as IETF RFC 4282 and RFC 7542, as well as subsequent or related versions of the standards. Authentication server 111 can utilize the ID.owner 122a received in message 218 (possibly as part of ID.device 101b) in order to identify and communicate with the correct device owner 122. Although not depicted in FIG. 2A, authentication server 111 could utilize a mutually authenticated secure channel such as TLS v3 with device owner 122 in a step 219a. In some exemplary embodiments, a step 219a could be optionally omitted, for example if device owner 122 is also device user 101a, such as a home owner installing a device 101 in their home. In these embodiments, an authentication step 217 may be sufficient to allow/authorize mobile phone 108 to conduct the configuration step 102. Other possibilities exist as well for an authentication server 111 use a step 219a to authorize that an authenticated mobile phone 108 and/or configuration user 108a can conduct a configuration step 102 without departing from the scope of the present invention.

After the authorization step 219a for mobile phone 108, authentication server 111 can query device owner 122 for (i) device default credentials 103 for device 101 using ID.device 101b, (ii) a configuration server URL 112b for device 101 to utilize in order to conduct a configuration step 102, and (iii) a list of root certificates or certificate authorities 109a recorded by device 101. The query could be made by authentication server 111 using ID.device 101b, which was previously received in message 218. As depicted and described in connection with FIG. 1A and FIG. 1B, device owner 122 could include a device default database 122x to record the device default credentials 103 for device 101 and also a plurality of other devices. In a step 219b. device owner 122 can query the device default database 122x in order to obtain the device default credentials 103 as well as root certificates or certificate authorities 109a. As contemplated herein, a "device default database" 122x can also be referred to as a "device database" 122x. A device database 122x could also record additional data pertaining to device 101 with ID.device 101b, such as a configuration server 112 to use with device 101, where the location or identity of configuration server 112 could be in the form of a configuration server URL 112b (depicted as URL-CS 112b). Device owner 122 can then respond to authentication server 111 with the device default credentials 103 and the URL-CS 112b, as depicted in FIG. 2A.

For a step 219b, if device owner 122 does not record or have a device database 122x with the device default credentials 103 and/or URL-CS 112b, then for step 219b device owner 122 could point authentication server 111 to another server or location for the device default credentials 103 and/or URL-CS 112b for device 101 with ID.device 101b, such as possibly device manufacturer 101x which could also record a device default database 122x as depicted in FIG. 1A. Note that a device manufacturer 101x could record the device default credentials 103 since the credentials could be written upon manufacturing, although other possibilities exist as well. Recording URL-CS 112b in a network such as configuration network 113 can provide greater flexibility for conducting a configuration step 102 with a manufactured device 101 since a device user 101a or device owner 122 may prefer that a configuration step 102 be performed by a configuration server 112 that may not be known by a device manufacturer 101x at the time of manufacturing of device 101. In other words, (a) a device manufacturer 101x cannot write a value for a URL-CS 112b to memory of device 101 if (b) the device manufacturer 101x does not know the value before the device 101 is shipped away from the device manufacturer 101x facilities.

Authentication server 111 could receive device default credentials 103 and/or URL-CS 112b and/or root certificates or certificate authorities 109a in a step 219c. In another exemplary embodiment, authentication server 111 could record a device default database 122x for a plurality of devices 101 in a system 100 and system 200 and in this embodiment then step 219c could represent querying a locally stored device default database 122x for authentication server 111 to obtain the device default credentials 103 and/or URL-CS 112b (and the separate query to device owner 122 could be omitted). A step 219c for authentication server 111 can also comprise authentication server 111 reading both (i) a value for a URL for configuration server 112, which can be a URL-CS 112b, and (ii) the certificate 112c for a configuration server 112. Authentication server 111 could use root certificates or certificate authorities 109a for device 101 in order to select certificate 112c, such that device 101 could verify certificate 112c. In other words, authentication server 111 could confirm that device 101 can fully verify certificate 112c using a root certificate 109a recorded by device 101. Root certificates or certificate authorities 109a for device 101 could be received by authentication server 111 from device owner 122 or mobile phone 108, and other possibilities exist as well for authentication server to receive root certificates or certificate authorities 109a for device 101 without departing from the scope of the present invention.

The value URL-CS 112b can be subsequently utilized by device 101 in order to obtain configuration packages 132, but device 101 will need to receive URL-CS 112b in a secure and authenticated manner in exemplary embodiments. The use of URL-CS 112b is depicted and described in connection with FIG. 3 below. Certificate 112c can be used by device 101 in order to authenticate configuration server 112 or a signature from configuration server 112, using a root certificate 109a. In step 220a, authentication server 111 can create a digital signature.AS 223 over ID.device 101b and URL-CS 112b. The sub-steps for creating a digital signature.AS 223 are depicted in FIG. 2B below by conducting a signature creation step 220. Exemplary details for authentication server 111 to create digital signature 223 in a step 220a are depicted and described in connection with FIG. 2B below.

As depicted in FIG. 2A, authentication server 111 can send mobile phone 108 a message 221 through secure connection 214, where message 221 can include ID.Device 101b, the device default credentials 103, certificate 112c for configuration server 112, and signature.AS (ID.Device 101b, URL-CS 112b) 223. In exemplary embodiments, message 221 is sent within secure session 214, but a signature.AS 223 is still utilized, because that signature can be subsequently forwarded to device 101 by mobile handset 108 in a message 307 below as shown in FIG. 3. In other words, even though message 221 can be secure and authenticated using secure session 214, the digital signature.AS 223 can be used by device 101 since device 101 may not necessarily rely upon the secure session 214 (since device 101 cannot otherwise verify secure session 214 was actually set up). Authentication server 111 could utilize authentication parameters 111d in the creation of data for message 221. Authentication parameters 111d can support the root certificated 109a recorded by a device 101 before a device configuration step 102. Although not depicted in FIG. 2A, in exemplary embodiments, authentication server 111 could also include authentication parameters 111d for the data in signature.AS 223, and in this manner authentication parameters 111d would be signed by authentication server 111.

Mobile phone 108 could receive message 221 and read and record the data received. ID.device 101b can be useful in a message 221 for mobile phone 108, because mobile phone 108 could communicate with a plurality of devices 101 over time and thus keep track of which message 221 is for which device 101. Mobile phone 108 could then conduct configuration step 127, which was depicted and described in connection with FIG. 1B and FIG. 1C above. In summary, mobile phone 108 could backup or record any previously active credentials for operating as a WiFi access point by a WiFi radio 108i in mobile phone 108, such as (a) recording Access Point User Credentials 105 in a nonvolatile memory 101f in order to (b) restore the credentials for configuration user 108a at a later time. In exemplary embodiments, a step 127 comprises mobile phone 108 reading the device default credentials 103 and activating them with WiFi radio 108i in order to operate as an access point. In this manner, device 101 can utilize the same device default credentials 103 as a WiFi client in order to establish connectivity with mobile phone 108, as depicted and described in FIG. 1D above and FIG. 3 below.

In an alternative exemplary embodiment to that depicted in FIG. 2A, discovery server 110 could be optionally omitted, and data within tag 101r or tag value 101w could specify authentication server 111 as well as data for Config-provisioning.ID.device 212. However, the use of a discovery server 110 can be preferred for some exemplary embodiments since a discovery server 110 could provide increased flexibility over the lifetime of device 101, which could be a decade or longer, since parameters Config-provisioning.ID.device 212 and related data could change over time. Including all data for Config-provisioning.ID.device 212 in tag value 101w or tag 101r may reduce flexibility for changing or updating the data over time, such as specifying an updated configuration application 108g, or other updated data for configuration system 114 over time. Further, the use of a discovery server 110 can support potentially millions of devices communicating potentially with many different authentication servers 111 and configuration servers 112.

For another alternative exemplary embodiment to that depicted in FIG. 2A, although device default credentials 103 are depicted as flowing from device owner 122 to authentication server 111, other possibilities exist as well for a mobile phone 108 to receive the device default credentials 103 without departing from the scope of the present invention. In some embodiments, device default credentials 103 could be obtained by mobile phone 108 from a device manufacturer 101x directly, and for these embodiments, a mutually authenticated secure session similar to secure session 214 could be set up between mobile phone 108 and device manufacturer 101x.

FIG. 2B

FIG. 2B is a flow chart illustrating exemplary steps for creating and verifying a digital signature using PKI keys, parameters, and data input, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of device 101, mobile handset 108, and servers herein.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts.

However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

In FIG. 2B, signature creation 220 can comprise a step using the sub-steps of obtaining a message to sign, calculating a message digest 230, using a private key 226, using a signature algorithm 227, inputting parameters 111*d*, and calculating a resulting signature 223. The steps and sub-steps depicted for authentication server creating signature 223 in FIG. 2B can also be applied for the subsequent signatures depicted, including signature creation 220*b*, where specific values for signature creation 220*b* can be different. In other words, for a signature creation step 220*b*, a different private key and "message to sign" can be input into signature algorithm 227, but the overall process remains the same.

Signature algorithm 227 and a corresponding signature verification algorithm for a signature verification step 221 below could comprise an RSA-based digital signature algorithm (DSA) or an ECC based elliptic curve digital signature algorithm (ECDSA), and other possibilities exist as well for signature algorithm 227 and the corresponding signature verification algorithm without departing from the scope of the present invention. For some exemplary embodiments, digital signature algorithms could support post-quantum cryptography, where the digital signature algorithms could be based on lattice-based algorithms, hash-based algorithms, multivariate-based algorithms, or zero-knowledge proofs. When using a DSA or ECDSA algorithm in non-deterministic mode for a signature creation 220, a value of "k" or "r", which could comprise a random number can be associated with the digital signature 223. When using a DSA or ECDSA in deterministic mode for preferred exemplary embodiments, such as specified in IETF RFC 6979 and titled "Deterministic Usage of the Digital Signature Algorithm (DSA) and Elliptic Curve Digital Signature Algorithm (ECDSA)", which are hereby incorporated by reference, then the requirement for a separately transmitted random number with digital signature 223 (such as value "k" or "r") can be optionally omitted, such that "r" can be deterministically calculated based on the message to sign.

In exemplary embodiments, device 101 and servers such as authentication sever 111 can utilize deterministic ECDSA without also sending a random number along with a digital signature, although the value "r" from the deterministic mode could be sent with the digital signature 223. In other words, a value can be sent with the digital signature 223 that is deterministically derived and associated with the message to sign. In other exemplary embodiments, a random number can be generated a derived value for the random number such as "r" sent with digital signature 223.

For a signature creation 220*a* step, the exemplary message to sign comprises ID.device 101*b* and URL-CS 112*b* (e.g. the URL for the configuration server 112). The message to sign values can be transmitted to the verifying party, such as shown for message 221 in FIG. 2A. The message to sign values can be input into a message digest algorithm 230, which could comprise a standard algorithm such as SHA-256, SHA-3, or similar algorithms. The output of message digest algorithm 230 can be input along with parameters 111*d* and private key 226 into signature algorithm 227.

Parameters 111*d'* can specify encoding rules, padding, key lengths, selected algorithms, curve names, and other values or fields necessary to utilize a signature algorithm 227. Parameters 111*d'* in FIG. 2C can be a subset of authentication parameters 111*d* from FIG. 1A (e.g. the parameters related to operating a signature algorithm 227). Both a signature creation step 220 and a signature verification step 221 use the same or equivalent values for parameters 111*d'*. Private key 226 comprises a private key for authentication server 111, where the corresponding public key is recorded in a certificate cert.AS 111*c*.

For the additional signature creation 220 instances depicted in FIG. 2B, such as signature creation 220*b*, the element or node creating the equivalent signature as signature 223 would utilize the private key of the element or node, such as owner 122 using a private key corresponding to public key in cert.owner 122*c* depicted and described in connection with FIG. 4 below. Although not depicted in FIG. 2B, a random number for values such as "k" and "r" for ECDSA and related signatures could be input as well into a signature algorithm 227 and also transmitted along with signature 223. In other words, the use of a deterministic signature with as DSA or ECDSA algorithms is not required for a signature creation step 220, and in that case the associated pseudo-random values used to create the signatures in non-deterministic mode could be sent along with the signature. The output of a signature algorithm 227 can be a signature 223, which can be transmitted to another node for verification.

Signature verification 221 can comprise a step using the sub-steps of (i) obtaining a message to verify, (ii) calculating a message digest 230 for the message to sign, (iii) using a public key corresponding to the private key 226, (iv) using a signature verification algorithm corresponding to signature creation algorithm 227, (v) inputting parameters 111*d'* and received signature 223 into the signature verification algorithm, and (vi) determining a pass/fail. If the signature 223 received matches a calculated signature with the public key and message to sign, then the received signature 223 passes or is validated or verified. If the signature 223 does not match the calculated signature in a step 221, then the signature 223 is considered to fail or not be verified. The above sub-steps (i) through (vi) described for device 101 verifying signature 223 for a verification 221*a* in FIG. 2B can also be applied for the subsequent signature verifications depicted, including signature verification 221*b*.

FIG. 2C

FIG. 2C is a flow chart illustrating exemplary steps for using asymmetric ciphering in order to encrypt a plaintext using a public key and decrypting a ciphertext using a secret key, in accordance with exemplary embodiments. An encryption 222 step could be performed by a device owner server 122*b* as depicted and described in connection with FIG. 4 below in order to create a ciphertext 222*a*. The purpose of an encryption 222*a* step can be to convert a plaintext set of owner WiFi credentials 199 into the ciphertext 222*a*. An encryption step 222 can use an asymmetric encryption algorithm 231*a*, where asymmetric encryption algorithm 231*a* can be based on either RSA or ECC algorithms. The use of an asymmetric encryption algorithm 231*a* and an asymmetric decryption algorithm 231*b* with RSA based keys is described in Internet Engineering Task Force Request for Comments (RFC) 8017, which is titled "PKCS #1: RSA Cryptography Specifications Version 2.2", which is hereby incorporated by reference. The use of asymmetric encryption algorithm 231*a* and an asymmetric decryption algorithm 231*b* with elliptic curve cryptography can be accomplished with ElGamal encryption, as summarized in the Wikipedia article for ElGamal encryption from Apr. 3, 2018, which is herein incorporated by reference. Other possibilities exist as well for the use of ECC algorithms for asymmetric encryption, including IEEE 1363a standards and ISO/IEC standard 18033-2.

Other possibilities exist as well for the use of an asymmetric encryption algorithm 231*a* and asymmetric decryption algorithm 231*b* without departing from the scope of the present invention. In exemplary embodiments, algorithms 231*a* and 231*b* can support a post-quantum cryptography key exchange mechanism (KEM). Device public key PK0.device 101*ta* and device private key or secret key SK0.device 101*s* could support lattice-based algorithms, code-based algorithms, or Supersingular Elliptic Curve Isogeny algorithms.

For an encryption step 222, the public key PK0.device 101*ta* recorded in a certificate 101*t* can be input into an asymmetric encryption algorithm 231*a*. As depicted, the plaintext values can be input as well, along with a set of parameters 151'. Parameters 151' can be a subset of parameters 151 depicted and described in connection with FIG. 1E above, and can comprise a set of asymmetric encryption parameters 151*d*. Parameters 151' can specify key lengths, encoding rules, ECC curve name, byte orders, use of point compression, and other values necessary to operate an asymmetric ciphering algorithm. In exemplary embodiments, the values for parameters 151' can be included in a certificate cert0.device 101*t*. The output of an asymmetric encryption algorithm 231*a* can be ciphertext 222*a*. As depicted in FIG. 2C, and encryption 222 step could also comprise an embodiment of encrypting a plaintext symmetric key, such that the symmetric key could be used with a symmetric ciphering algorithm such as AES or Triple Data Encryption Standard (3DES) or Blowfish, or related algorithms. In this embodiment, (i) the symmetric key could comprise a random number derived by owner 122 or owner server 122*b*, and (ii) ciphertext 222*a* could comprise two parts, where the first part is the encrypted symmetric key and the second part is a symmetric encryption of owner WiFi credentials 199. Note that credentials 199 could also support wireless network connectivity to wireless networks other than WiFi, such as 4G networks, 5G networks, etc.

For a decryption step 233, the private key SK0.device 101*s* recorded in nonvolatile memory for device 101 can be input into an asymmetric decryption algorithm 231*b*. Private key SK0.device 101*s* can be the secret key corresponding to the public key PK0.device 101*ta* used with the asymmetric encryption algorithms 231*a*. Asymmetric decryption algorithm 231*b* can correspond to asymmetric encryption algorithm 231*a*, such that if an ECC curve with a given set of parameters 151' or parameters 151*d* is used with asymmetric encryption algorithm 231*a*, then the same ECC curve with the same or equivalent set of parameters 151' can be used with asymmetric decryption algorithm 231*b*. The output of an asymmetric decryption algorithm 231*b* can be the plaintext, as depicted in FIG. 2C. Further, although credentials 199 are depicted as decrypted in a decryption step 233, an asymmetric decryption algorithm 231*b* could be used to read a plaintext symmetric key for a symmetric ciphering algorithm, where the plaintext credentials 199 could be read by inputting the plaintext symmetric key and encrypted credentials 199 into the symmetric ciphering algorithm. Standards such as IEEE 1363a standards and ISO/IEC standard 18033-2 contemplate using asymmetric algorithms and public keys to encrypt symmetric keys, and asymmetric decryption algorithms and private keys to decrypt symmetric keys, where (i) the plaintext and ciphertext can be converted using the symmetric key, and then (ii) a second plaintext comprising credentials 199 could be read using the symmetric key and a symmetric ciphering algorithm. Note that encryption step 222 and decryption step 233 can be used with other plaintext values and ciphertext values as contemplated herein, such as (i) an access network 126 encrypting a set of access network credentials 126a, and (ii) a reporting system 120 encrypting a set of reporting system credentials 132h, as depicted and described in connection with FIG. 4 below.

FIG. 3 FIG. 3 is a simplified message flow diagram illustrating an exemplary system with exemplary data sent and received by a mobile phone, a device, and a configuration server, in accordance with exemplary embodiments. Before initiating steps and message flows depicted in FIG. 3, mobile phone 108, device 101, and the other elements depicted for system 300 in FIG. 3 may previously complete exemplary message flows and steps depicted in FIG. 2A above. System 300 can include a configuration server 112, authentication server 111, mobile phone 108, and device 101. Mobile phone 108 can communicate with authentication server 111 and configuration server 112 via IP network 128, as depicted in FIG. 2A. Mobile phone 108 may also be referred to herein as a mobile handset or a mobile computing device. For system 300, configuration server 112 and authentication server 111 may establish a secure session setup 301, which could comprise establishing a secure communications link between the two servers using protocols such as TLS, IPSec, a virtual private network (VPN), a secure shell (SSH), or similar networking, transport, or application layer technologies in order to establish secure communications between configuration server 112 and authentication server 111. Secure session setup 301 can be (i) equivalent or similar to secure session setup 214 depicted in FIG. 2A above, and (ii) utilize certificates cert.CS 112c for configuration server 112 and cert.AS 111c for authentication server 111 in order to provide mutual authentication.

Mobile phone 108 in system 300 can operate a running configuration application 108g and WiFi radio 101i operating as an access point with device default credentials 103. Configuration application 108g may previously be downloaded in a step 213 as depicted in FIG. 2A and subsequently launched or activated for operation in a system 300. In exemplary embodiments, configuration application 108g may be (i) included or distributed along with an operating system 101e running on mobile phone 108 or (ii) acquired at a different time than a step 213, and thus a separate download of configuration application 108g. As depicted in FIG. 3, device 101 can include a WiFi radio 101i operating as a WiFi client for the access point 108i operating in mobile phone 108, thereby enabling communication via a wireless LAN connecting mobile phone 108 and device 101. In some exemplary embodiments, device 101 may have WiFi radio 101i external to device 101, but in preferred exemplary embodiments WiFi radio 101i is inside device 101. In exemplary embodiments, WiFi radio 108i operating as an access point can support both dynamic host configuration protocol (DHCP) and network address translation (NAT) routing in order to connect device 101 with WiFi client 101i to IP network 128.

Configuration server 112 and authentication server 111 can establish a secure session 301, where secure session 301 could comprise a session using TLS, IPSec, a VPN, and other possibilities exist as well. At step 302 in FIG. 3, device 101 may power on from an unpowered or "deep sleep" state. Power could be provided from a battery or converted "wall power". Device 101 could (i) load portions of OS 101e from storage 101f into RAM 101d using a bootloader program and (ii) power on WiFi radio 101i and load device default credentials 103. As depicted above in FIG. 1E, device default credentials 103 could be written to a nonvolatile memory 101f in device 101 before device 101 is provided to a device user 101a, possibly during manufacturing of device 101 by device manufacturer 101x. In exemplary embodiments, before mobile phone 108 has conducted a step 127 to load device default credentials 103, a device 101 can periodically power up and attempt to connect to a WiFi access point using device default credentials 103 even though mobile phone 108 may not be present or configured in a configuration step 127. In other words, device 101 can use device default credentials 103 as the default state or condition, even without mobile phone 108 being present or configured, since device 101 may not know the time or place where mobile phone 108 with credentials 103 may be present.

At step 303a in FIG. 3, WiFi radio 108i in mobile phone 108 can begin operating as an access point using device default credentials 103. Device default credentials 103 could be received by mobile phone 108 in a message 221 depicted in FIG. 2A, and activated by mobile phone 108 using a configuration step 127 depicted in FIG. 2A and also in FIG. 1B and FIG. 1C. Device default credentials 103, as depicted and described in connection with FIG. 1E can comprise a SSID-default.device 101a, PSK-default.device 103b, and a config-default.device 103c, as depicted and described in connection with FIG. 1C and FIG. 1E above. Note that the depicted value PSK-default.device 103b for both radio 108i and radio 101i can also support other standard WiFi-supported authentication schemes in addition to the use of a preshared secret key, such as (i) the used of PKI (ii) a pairwise master key (PMK), (iii) a passphrase, or (iv) credentials for authentication with extensible authentication protocol (EAP). For some exemplary embodiments, such as those supporting EAP-TLS based authentication device default credentials 103b could include a certificate for device 101, where (i) the device default credentials 103b stored by mobile phone 108 could include the certificate for device 101 (such as cert0.device 101t) and (ii) the device default credentials 103b stored or recorded by device 101 could use the corresponding device private key SK0.device 101s.

Since device default credentials 103 received by mobile phone 108 in message 221 can match or be compatible with device default credentials 103 recorded in device 101, communication between mobile phone 108 and device 101 can be established. The values for config-default.device 103c could specify a version of the 802.11 standards to utilize, such as, but not limited to, 802.11n, 802.11ac, 802.11ah, 802.11ax, or related and subsequent versions of these standards. The values for config-default.device 103c could also specify a frequency band to utilize such as 2.4 GHZ, 5 GHZ, and other possibilities exist as well. Further, the values for config-default.device 103c could specify a preferred list of channels to operate on, such a subset of channels 1 through 11 at 2.4 GHZ, or a subset of channels 40 through 62 at 5 GHZ, and other possibilities exist as well. Continuing with a step 303a in FIG. 3, the value for SSID-default.device 103a can comprise the service set identifier or network name for access point 108i to broadcast. In exemplary embodiments, WiFi radio 108i could use SSID-default.device 103a in a "hidden" mode and not broadcast the SSID, but listening for messages from a client using the hidden SSID. Device 101 can connect with WiFi radio 108i operating as an access point by transmitting with the SSID in a SSID-default.device 103a that is not broadcast. The selection of access point 108i broadcasting SSID-default-.device 103a or not broadcasting can be included in config-default.device 103c, as depicted in a device database 122x in FIG. 1B. The value PSK-default.device 103b used by WiFi radio 108i can comprise a pre-shared secret key (or similar such as PMK) required by any node or client to connect with the access point, which can also be recorded by device 101 as depicted in FIG. 1D and FIG. 1E above. Both WiFi radio 108i as the access point and WiFi radio 101i as the client can use the value PSK-default.device 103b and a key derivation function with shared nonces to mutually derive temporary encryption keys. With EAP-TLS authentication for step 303a and connection 303, the value 103b used by mobile handset 108 could comprise the certificate cert0.device 101t and the value 103b used by device 101 could comprise the corresponding private key SK0.device 101s. The mutually derived temporary encryption keys can be used with an AES symmetric ciphering algorithm depicted and described in connection with FIG. 2C in order to encrypt and decrypt data transmitted and received via wireless connection 303 in FIG. 3. In some exemplary embodiments, encryption for a WiFi session 303 could also be optionally disabled or omitted.

A step 303b in FIG. 3 can comprise device 101 with WiFi radio 101i using the same device default credentials 103 in a client mode, corresponding to a step 303a for WiFi radio 108i using the default credentials 103 in an access point mode, where the use of device default credentials 103 were described above. Device 101 could use the value SSID-default.device 103a in order to search or scan for radio 108i as an access point. If the access point operates with a hidden SSID, then client 101i could attempt to periodically connect with the SSID even if it's not broadcast. In exemplary embodiments, device 101 can attempt to connect with an access point with the SSID from SSID-default.device 103a before mobile phone 108 is present with device 101 (such as each time device 101 is powered or periodically whenever device 101 is powered). In this manner, device 101 can connect with mobile phone 108 after mobile phone 108 begins operating access point 108i with credentials 103. Both radio 108i and radio 101i can support a 4-way handshake supporting WPA2 where radio 108i sends a nonce and radio 101i derives a pairwise transient key (PTK) using the nonce and the PSK. Radio 101i can then send a client nonce to the access point 108i and receive a group temporal key (GTK). Message authentication code (MAC) keys can be exchanged as well. Similarly, if WPA3 is used, a handshake can be conducted such that encryption keys can be derived using (i) the shared PSK-default.device 103b (or PK0.device 101ta at mobile phone 108 and SK0.device 101s at device 101) and (ii) transmitted nonces and (iii) a key derivation function using the PSK/PMK and a nonce.

Other possibilities exist as well without departing from the scope of the present invention for radio 108i to use a step 303a and radio 101i to use a step 303b in order to setup a secure WiFi connection 303 without departing from the scope of the present invention. In another exemplary embodiment, the requirement for a PSK could be optionally omitted and the WiFi access point 108i could operate in an "open" configuration such that any client could connect, so long as the client selects the SSID-default.device 103a, which could include device 101 since it would search for SSID-default.device 103a. In this embodiment, the time where WiFi access point 108i could remain limited, such as only the time required to complete a configuration step 102. In exemplary embodiments, mobile phone 108 could operate an access list to "whitelist" only certain devices, such as devices 101 with a specific MAC address, which could comprise ID.device 101b as depicted in device database 122x in FIG. 1B above. An ID.device 101b could comprise a set of values, where one value is the MAC address for device 101 and another value is a different identifier for device 101, such as a manufacturer serial number, an IMEI, or a similar identifying number or string.

In some exemplary embodiments, radio 108i could use a step 303a and radio 101i could use a step 303b with configuration parameters in Config-default.device 103c in order to setup WiFi connection 303 through any of a WiFi Direct connection, a WiFi connection established using the device provisioning protocol, or a WiFi peer-to-peer connection. In addition, connection 303 could use other local wireless technologies besides WiFi as well, such as Bluetooth and Near-Field Communications (NFC). For embodiments where connection 303 supports Bluetooth, then radios 101i and radio 108i can comprise Bluetooth radios. For embodiments where connection 303 supports Near-Field Communications, then radios 101i and radio 108i can comprise NFC radios. In general, the values for Config-default-.device 103c within device default credentials 103 can specify settings for radios 101i and 108i to use with the local wireless connection between mobile phone 108 and device 101. In general, the values for PSK-default.device 103b can specify optional keys for securely encrypting and/or authenticating the local wireless connection for a connection 303 between mobile phone 108 and device 101.

At step 304 in FIG. 3, after successful setup of WiFi session setup 303, configuration application 108g in mobile phone 108 could display to configuration user 108a that a communication link with device 101 has been established. The display could be notification that authentication or configuration data can be transferred with device 101, such as the data through the physical layer and networking layer of WiFi radio 108i is enabled. Step 304 could also display error conditions or codes to configuration user 108a, for cases where WiFi session setup 303 fails for exemplary reasons such as no client WiFi 101i detected, incompatible radio protocols, too many collisions, too weak an RF signal or RSSI, a bad PSK, etc.

Note that in an exemplary embodiment, secure session setup 214 may be temporarily disabled or unavailable (such as mobile phone 108 moves outside of range of a mobile network or access network 126 providing connectivity to authentication server 111). In this case, the values from message 221 from FIG. 2A could be stored in mobile phone 108 in a step 304 until they can be transmitted from mobile phone 108 until they are subsequently transmitted in a message 305. In this manner, if device 101 is located in a place without the access network 126 used by mobile phone 108, such as in a basement of a building where nearby land mobile networks cannot reach, then mobile phone 108 can take subsequent steps such as step 305 while mobile phone 108 is in an offline mode for access network 126. A step 304 can also comprise mobile phone 108 using DHCP to assign a private IP address to device 101, where mobile phone 108 can comprise the gateway for routing packets from the LAN (e.g. session 303) with device 101 to the IP network 128, using standard network address translation (NAT) routing. Or, WiFi session 303 could use IPv6 routing and NAT routing within session 303 could be omitted and device 101 could obtain access to IP network 128 via IPV6 and without NAT.

In order to send message 305, device 101 can use configuration parameters 151 in order to know what remote process or server to contact in order to receive initial configuration data. Note that device 101 as received from device manufacturer 101x by device user 101 may not be configured with a destination configuration server 112 for several reasons. First, device manufacturer 101x may not know the configuration system 114 preferred for use by device owner 122, such as the configuration system 114 that could have a business or contractual relationship with device owner 122, and thus a URL for configuration server 112 may not be programmed or written to memory 101f before a configuration step 102. Second, device manufacturer 101x may ship device 101 in a state with an incomplete configuration, since many different configurations might be possible, such as the need to support different requirements from different owners 122 or device users 101a. Configuration parameters 151 and device default credentials 103 could be included in a minimal "pre-configured" state of device 101 from device manufacturer 101x, such that device 101 could be subsequently configured by a configuration user 108a using a mobile phone 108. For exemplary embodiments where a configuration server 112 is known by device 101 in a set of configuration parameters 151 before a mobile phone 108 configuration step 127 (e.g. configuration parameters 151 records URL-CS 112b), then (i) message 305 could be transmitted directly to configuration server 112 and (ii) the subsequent message 307 could be omitted or transmitted by configuration server 112.

Further regarding device 101 sending message 305, device 101 could use configuration parameters 151 to specify an address, port number, and protocol for initially downloading files. In an exemplary embodiment depicted in FIG. 1E above, the address 151a can comprise the default gateway for IP networking received via DCHP in a step 304. In this manner, device 101 can receive data from mobile phone 108 even if (i) mobile phone 108 is offline and not connected to an access network 126, or (ii) mobile phone 108 or access network 126 operate a firewall that restricts traffic from device 101 to IP network 128 or configuration server 112. As mentioned above, exemplary embodiments may need to support mobile phone 108 configuring device 101 even when mobile phone 108 is offline. The port number 151b could specify a TCP port number to use with address 151a in order to reach a process or server function operating in mobile phone 108, which could be configuration application 108g. Although the use of TCP is depicted for a message 305, UDP could be utilized instead. Protocol 151c could specify the transport layer and application layer for device to utilize, such as HTTP, and other standard protocols could be utilized as well, such as FTP.

Device 101 can then send message 305 to mobile phone 108, where the initial message could comprise a TCP SYN to the gateway IP address 151a in the LAN for WiFi connection 303, which would be the mobile phone 108, and port number 151b, which could be assigned to and listened by the configuration application 108g. Device 101 and configuration application 108g could then use the protocol 151c in order to transfer files or data. For exemplary embodiments where configuration parameters 151 record an address or URL of configuration server 112 (e.g. for address 151a in a manufactured device 101 in FIG. 1F), then device 101 could send message 305 to configuration server 112 through WiFi access point 108i operated by mobile phone 108. After a step 304 and also possibly after receiving a message 305, mobile phone 108 can then send authentication server 111 a message 314. Message 314 can include ID.device 101b and also a signal or data that device 101 is authenticated. The authentication could be confirmed by mobile phone 108 and authentication server 111 since device 101 has successfully used device default credentials 103 in order to setup a WiFi session 303. In other words, WiFi session 303 could not normally be established unless device 101 using ID.device 101b had previously recorded device default credentials 103. In exemplary embodiments as depicted in FIG. 1B, device default credentials 103 can be preferably unique for each device 101, and thus only the specific device 101 identified by ID.device 101b could feasibly use device default credentials for a WiFi session 303. A message 304a can depend on the security or integrity of mobile phone 108, and thus in exemplary embodiments configuration application 108g operates within a Trusted Execution Environment (TEE) of mobile phone 108. Further, a device 101 can be separately authenticated in a secure session 309 below in exemplary embodiments. Message 304a could be transmitted in secure session 301.

After receipt of message 304a by authentication server 111, authentication server 111 can transmit a message 306 to configuration server 112, where message 306 could include ID.device 101b, ID.mobile-phone 108b, and certificate for mobile phone cert0.mobile-phone 108m. Authentication server 111 could obtain the certificate for mobile phone cert0.mobile-phone 108m during establishment of secure session 214, and certificate for mobile phone cert0.mobile-phone 108m is depicted and described in connection with FIG. 1C. In exemplary embodiments where device 101 utilizes a certificate cert0.device 101t, the certificate could also be sent in a message 306, and authentication server 111 could use ID.device 101b to query a device owner 122 or device manufacturer 101x in order to obtain the certificate cert.device 101t. In other exemplary embodiments where device 101 does not include a certificate cert0.device (or the certificate is invalid or not supported by configuration system 114), then the value cert0.device 101t could optionally be omitted from a message 306.

Configuration server 112 could receive message 306 and conduct a step 306a to validate the certificates received in message 306 and record data from the certificates in a configuration database 112a, including the identities received and the public keys as well. For processing message 306 in a step 306a, data in message 306 could also serve as (x) a signal or contain data that device 101 using ID.device 101b is authenticated, as well as (y) a configuration user 108a for mobile phone 108 has successfully conducted an authentication step 215, such that subsequent data can be securely received from (b) mobile phone 108 using mobile phone identity ID.mobile-phone 108b by (b) configuration server 112.

For embodiments where message 305 is received by mobile phone 108 and not configuration server 112, configuration application 108g in mobile phone 108 can then send a message 307, where message 307 can include Cert.AS 111c, Authentication Parameters 111d, a URL for configuration server URL-CS 112b, a certificate for configuration server Cert.CS 112c, and the signature from authentication server signature.AS 223. The signature.AS 223 can be over (ID.Device 101b, URL-CS 112b), as depicted and described in connection with FIG. 2B. These values could be previously received and recorded by mobile phone 108 during the prior communication depicted and described in connection with FIG. 2A above. Although not depicted in FIG. 3, mobile phone 108 could also send other exemplary data in a message 307 than that depicted, including parent certificates for cert.AS 111c, version number 212a, ID.device 101b, and/or ID.mobile-phone 108b. In exemplary embodiments, only message 305 and message 307 are transmitted at the network, transport, or application layer between mobile phone 108 and device 101, and both sides otherwise remain "quiet" and drop all other packets and messages on the wireless LAN 303, except messages to control wireless LAN 303. In other words, although mobile phone 108 and device 101 may communicate at the data-link layer, such as transmitting values related to polling the status of the WiFi link, security of WiFi link can be increased since no other messages or clients may be allowed on WiFi connection 303.

Although not depicted in FIG. 3, in an exemplary embodiment a signature.AS 223 could also be over an initial random number for device 101. The initial random number for device 101 could be (i) recorded in the tag-value 101w depicted and described in FIG. 2A, or (ii) recorded by owner 122 in a device database 122x such that authentication server 111 could query owner 122 in a step 219a as depicted in FIG. 2A above, or (iii) recorded with data in Config-provisioning.ID.device 212. The initial random number for device 101 could also be recorded in memory 101f for device 101 and created by a device manufacturer 101x. In this manner, the initial random number for device 101 can be generated outside authentication server 111 and included in a signature.AS 223. Security can be increased since authentication server 111 can be required to sign a number that was both (i) not generated by authentication server 111 and (ii) recorded in device 101 before a configuration step 102. In other words, a signatureAS 233 received by a device 101 in a message 307 could be over a pseudo-random number recorded in any of tag-value 101w, device database 122x, or Config-provisioning.ID.device 212, providing additional security or confidence for device 101 that signature.AS 223 was processed by an authentication server 111, and other benefits from the use of a random number in signature.AS 233 are available as well.

In step 308, device 101 can receive the message 308 via the WiFi session 303 and record the data in RAM 101d or storage 101f. In step 308, device 101 can also verify cert.AS 111c using either (i) cert.CA1 115a directly and/or (ii) a commonly shared certificate cert.CA.root 109a shared between device 101 and authentication server 111. In other words, in exemplary embodiments and before a configuration step 102, device 101 records in nonvolatile memory either (i) cert.CA1 115a or (ii) cert.CA.root 109a, where a parent certificate for cert.AS 111c can be checked with cert.CA.root 109a. In the exemplary embodiment depicted in FIG. 1A, cert.AS 111c can be verified with cert.CA1 115a, which could be verified with cert.CA.root 109a. Cert.CA1 115a could be recorded in memory 101f of device 101 during manufacturing or at another time before installation with monitored unit 106 or the start or initiation of a configuration step 102. As described in connection with FIG. 2B above, device 101 could verify the certificate for cert.AS 111c (and parent certificates) using a signature verification step 221. Note that configuration system 114 and authentication server 111 could select cert.AS 111c (and associated parameters 111d) and any parent certificates that can be verified by device 101 using a cert.CA.root 109a based on receiving the values for cert.CA.root 109a from either (i) a mobile handset 108 via a message 218 in FIG. 2A (where mobile handset receives the values for cert.CA.root 109a in parameters 212) or (ii) device owner 122 from a step 219b.

After a step 308, device 101 can conduct a step 221a depicted in FIG. 2B in order to verify signature.AS 223. By conduction a signature verification step 221a for signature.AS 223 using verified certificate cert.AS 111c, device 101 can authenticate the data received and being signed. Including ID.device 101b (and/or a random number described two paragraphs above) in the message to verify for signature.AS 223 can make signature.AS 223 more robust to replay attacks, since signature.AS 223 could not be used with other devices 101 in a system 100, 200, or 300. By verifying signature.AS 223 over URL-CS 112b, device 101 can trust that URL-CS 112b is an authenticate address to connect with in order to receive further configuration data.

Note that in exemplary embodiments, device 101 may not trust mobile phone 108, which could comprise an insecure device or possibly operated by an adversarial configuration user 108a. Thus device 101 would prefer signed configuration data such as the signed URL-CS 112b in a signature.AS 223 in order to avoid attacks that would point device 101 to an incorrect or improper configuration server 112. In exemplary embodiments, signature.AS 223 can also be over authentication parameters 111d, where authentication parameters 111d are received by device 101 in a message 307 above. In another exemplary embodiment, authentication parameters 111d may be optionally omitted from signature 225, such as both (i) not being included in the "message to sign" in signature creation 220 in FIG. 2B and (ii) not being included in the "message to verify" in signature verification 221 in FIG. 2B. However, including authentication parameters 111d in signature.AS 223 may increase security for device 101, since mobile phone 108 would not be able to alter the authentication parameters 111d.

In exemplary embodiments, mobile phone 108 can provide connectivity to IP network 128 to device 101 through WiFi session 303. Device 101 and configuration server 112 can subsequently conduct a secure session setup 309 using certificates from the two sides comprising certificates cert0.device 101t and cert.CS 112c. Secure session setup 309 could comprise establishing a secure communications link using protocols such as TLS, datagram transport layer security (DTLS), IPSec, a virtual private network (VPN), a secure shell (SSH), or similar networking, transport, or application layer technologies in order to establish secure communications between configuration server 112 and device 101. Other techniques for secure session could be utilized as well for secure session 309 without departing from the scope of the present invention. In exemplary embodiments, configuration server 112 and device 101 utilize DTLS as specified in IETF RFC 6347 and subsequent or related standards. The two nodes could transmit their certificate and then use the certificates in order to mutually authenticate and conduct a key exchange in order to encrypt and verify/validate data transferred within the session. In an exemplary embodiment, device 101 may not contain a certificate cert0.device 101t, but configuration system 114 and configuration server 112 can know that device 101 is authenticated based on the successful use of device default credentials 103 in order to establish IP connectivity for device 101 using WiFi session 303 (e.g. via message 306 above). For this embodiment (where a message 306 has been received confirming device 101 is authenticate via the use of credentials 103), secure session 309 could be set up using only the certificate cert.CS 112c, similar to a web browser securing a session with a web server using only the certificate of the web server.

Although secure session 309 passes through mobile handset 108, mobile handset 108 would not normally be able to read plaintext or alter data transferred in secure session 309. Upon successful establishment of secure session 309, device 101 can send message 310 to mobile handset 108 via WiFi session 303 in order to notify mobile handset 108 and configuration user 108a that secure session 309 has been successfully established. In other words, a first display progress indicator could be shown for configuration user 108*a* when WiFi session setup 303 was completed, and a second display progress indictor for configuration user 108*a* could be shown upon successful setup of secure session 309. Although not depicted in FIG. 3, device 101 could conduct an authentication step with authentication server 111 before setup of secure session 309.

As depicted in FIG. 3, mobile phone 108 using configuration application 108*g* can conduct a step 319 to collect an identity list 320, where identity list 320 comprises a list of identities for elements of systems 100, 200, and 300 around or nearby to device 101 and monitored unit 106. Identity list 320 can include a networks available list 322. In order to conduct a step 319, mobile phone 108 may need to temporarily disconnect from an access network 126, such as a mobile phone network, in order to perform a full frequency scan of all available mobile network operators and network access technologies around device 101 in order to collect a networks available list 322. For embodiments where mobile phone 108 temporarily disconnects from an access network 126 or other cases where secure session 309 may be dropped, device 101 and configuration server 112 can pause secure session 309 and then restore the session when connectivity for mobile phone 108 through access network 126 is restored.

The networks available list 322 can be useful for configuration system 114 to select the best or a preferred access network 126 from the networks available list 322 for device 101 operating with monitored unit 106. As depicted in FIG. 3, a networks available list 322 can also include the access technology available from a plurality of access networks 126 around device 101, such as 2G, 3G, 4G LTE, 5G, WiFi, NB-IoT, LoRaWAN, LPWAN, etc. In exemplary embodiments, the networks available list 322 of surrounding wireless networks also includes an associated RF signal strength for each, such as RSSI as well as a frequency band, frequency list in Mhz, or RF channel for each surrounding wireless network. In exemplary embodiments, mobile phone 108 can observe WiFi broadcast packets from Device Owner WiFi Access Point 122*b* using SSID.owner-AP 199*a* and include the value in the networks available list 322.

A step 319 may also comprise mobile phone 108 collecting a list of identities for monitored units 106 and transducers 101*k* that are externally connected to device 101, and include the identities in the identity list 320. In exemplary embodiments, a step 319 in FIG. 3 may comprise mobile phone 108 using a camera 108*r* to scan for a bar code or QR code on each of the monitored units 106 and transducers 101*k* in order to collect an identity for each. Although not depicted in FIG. 3, mobile phone 108 could also scan for a bar code or QR code or similar data for Device Owner WiFi Access Point 122*b*, and include the data in an identity list 320.

Mobile phone 108 could also or alternatively take a picture and record the picture for each monitored unit 106 and transducer 101*k*. The picture for monitored unit 106 and transducer 101*k* could be processed by mobile phone 108 or configuration system 114 in order to identify monitored unit 106 and transducer 101*k*. Pictures could be included in a identity list 320 an subsequently received and stored by configuration server 112 in a configuration database 112*a* for later use after a configuration step 102, such enabling query by device user 101*a* at a later time in order to support the operation of device 101 and/or monitored unit 106. The identity of owner 122, which could comprise a value ID.owner 122*a* for device 101 could be entered by the user in a screen or previously acquired by mobile phone 108, such as with a set of configuration parameters config-provisioning.ID.device 212 or recorded in a tag-value 101*w*.

A step 319 could also comprise mobile phone 108 preferably obtaining (i) geographical coordinates for a valued location.device 325 or (ii) estimated geographical coordinates or similar physical location for the physical location of device 101. In exemplary embodiments, mobile phone 108 can have a GPS or similar receiver for outdoor location, or use WiFi or Bluetooth for approximate indoor locations, and record the location in location.device 325. Although step 319 to collect an identity list 322 for device 101 is depicted as after receiving message 310 (confirming mutual authentication between device 101 and configuration server 112 in session 309), step 319 to collect an identity list 322 could be conducted at other times, such as before FIG. 3 or after a configuration user 108*a* takes mobile phone 108 to the approximate physical location for installation or configuration of device 101, including possibly during a step 202. In exemplary embodiments, a networks available list 322 could be collected by device 101 instead of mobile phone 108, with the reason being the networks available list 322 may be more accurate from the perspective of device 101 if device 101 collects the data. For example, device 101 may have an antenna tuned to different frequencies than mobile phone 108, or support different radio bands or RF frequencies than device 101. Thus, in exemplary embodiments, device 101 performs an RF spectrum scan or sweep in order to obtain the networks available list 322. Device 101 could send the networks available list to either mobile phone 108 in a message 310 or to configuration server 112 in secure session 309.

As depicted in FIG. 3, configuration server 112 and mobile phone 108 could then establish a secure session setup 321 between the two nodes, which could be a secure session similar to secure session 309, 301, and 214 as depicted and described above. In exemplary embodiments, secure session setup can use certificates for the two nodes as depicted in order to mutually authenticate and also derive encryption keys. Note that secure session setup 321 between mobile handset 108 and configuration server 112 could be conducted at an earlier time than after a step 319, such as after mobile phone 108 receives message 221 with an identity or URL for configuration server 112.

After secure session setup 321, mobile phone 108 can send configuration server 112 a message 323, where message 323 can include the identity list 320 collected by mobile handset in a step 319 above, and exemplary data for an exemplary identity list 320 is depicted in FIG. 3. As discussed in step 319 above, the identity list 320 could also include pictures of device 101 and monitored unit 106. In this manner of receiving message 323, a plurality of identifying information regarding device 101 and its operating environment can be securely transferred to configuration server 112. In exemplary embodiments for a step 324, configuration server 112 records the data from identity list 320 for device 101 in a configuration database 112*b* as depicted in FIG. 1A. A configuration server 112 could also send the data received in a message 323 to a device owner 122, including a device owner server 122*d* as depicted and described in connection with FIG. 4 below.

The identity list 320 recorded in a step 324 can be utilized in subsequent steps in order to configure device 101 to use transducers 101*k* with monitored unit 106, such as for the collection of a configuration package 132 in a step 326 depicted in FIG. 3 and described below in FIG. 4. Step 324 may also comprise configuration system 114 notifying device owner 122 that device 101 has been mutually authenticated and identity list 320 has been received. A step 324 could also comprise configuration server 112 or configuration system 114 sending data within identity list to device owner 122. Step 324 could also comprise configuration system 114 (i) processing networks available list 322 in order to select a preferred access network 126 for device 101, and (ii) querying the selected access network 126 for network access credentials 126a for use with the selected access network 126.

FIG. 4

Figure 4:
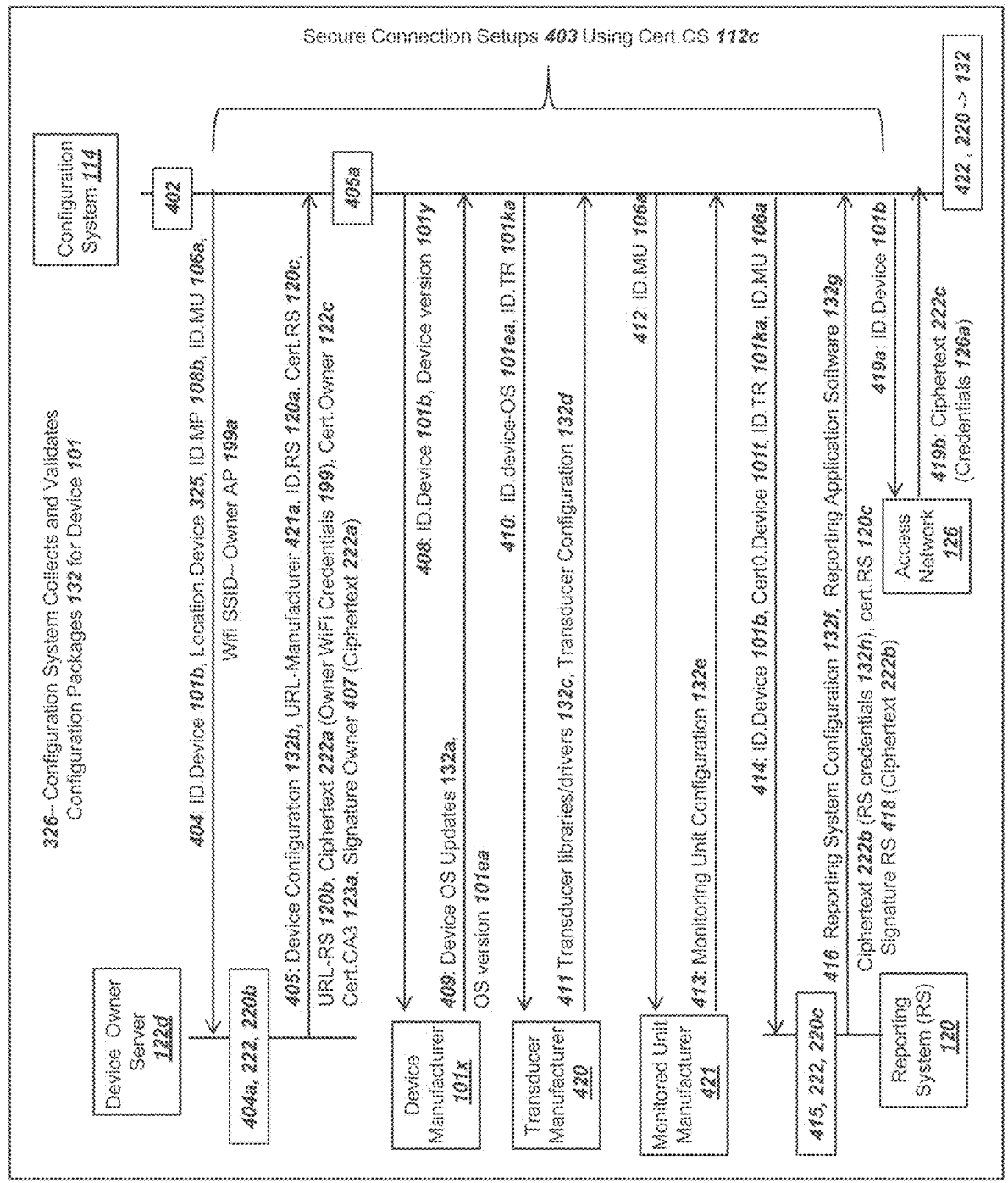
FIG. 4 is a simplified message flow diagram illustrating an exemplary system for a configuration system to receive data for a configuration package, in accordance with in accordance with exemplary embodiments.

FIG. 4 is a simplified message flow diagram illustrating an exemplary system for a configuration system to receive data for a configuration package, in accordance with in accordance with exemplary embodiments. System 400 can comprise a configuration system 114 transmitting data to and receiving files from several elements or nodes depicted in a system 100 in FIG. 1A. As depicted, the other elements could comprise a device owner server 122d, device manufacturer 101x, transducer manufacturer 420, monitored unit manufacturer 421, reporting system 120, and access network 126. In addition, although a configuration system 114 is depicted in system 400, a configuration system 114 could use a configuration server 112 or a plurality of configuration servers 112 in order to communicate and provide the functionality depicted for a configuration system 114. System 400 can use a step 326 for configuration system to collect and validate individual files or subsets of files for configuration package 132 for device 101.

Before initiating steps and message flows depicted in FIG. 4 for a step 326, mobile phone 108, device 101, and the configuration server 112 could previously complete the steps and message flows depicted in FIG. 3 above. A step 402 can comprise configuration system 114 identifying the proper nodes to communicate with in order to collect files for configuration package 132, including using a configuration database 112a. Configuration system 114 may communicate with millions of devices and dozens or more device owners 122, device manufacturers 101x, etc., and a database can be queried using ID.device 101 in order to select nodes such as device owner server 122d, device manufacturer 101x, ID.transducer 326 to select transducer manufacturer 420, etc. In other words, configuration system can use the identity information received in an identities list 320 in FIG. 3 in order to select sources of data or files in a step 402 for a configuration package 132. A step 402 can also comprise configuration system 114 collecting and verifying certificates for each of the other nodes depicted in FIG. 4. Configuration system 114 can then use a series of secure connection setups 403 with each of the nodes using certificate cert.CS 112c and the certificates from the other node. In this manner each secure session could be mutually authenticated by nodes from both sides and subsequently files received through each secure session could also be authenticated. A separate verification step could also be performed on each file, as discussed below.

Although a single cert.CS 112c is depicted in FIG. 4, a system 400 could use a plurality of different certificates cert.CS 112c, where each certificate could be associated with different servers 112 in a configuration system 114. In addition, although the message flows between nodes in FIG. 4 are depicted in an order for a preferred embodiment, other sequences of messages are possible as well, such as contacting a transducer manufacturer 420 before a device manufacturer 101x. In some exemplary embodiments, a device owner server 122d is contacted first, since device owner 122 can select or point to subsequent nodes such as access network 126 (since device owner 122 may pay for services of access network 126).

Configuration system 114 can then send message 404 to device owner server 122d through the secure session 403, where message 404 can include ID.Device 101b, Location.Device 325, ID.mobile phone 108b, ID.monitored unit 106a, and WiFi SSID-Owner AP 199a. Message 404 could also include a certificate for device of cert0.device 101t. Device owner server 122d can receive the data and perform a step 404a in order to lookup values from a device database 122x for use with device 101 and ID.device 101b. For example, device owner 122 could use WiFi SSID-Owner AP 199a in order to select the full set of owner WiFi credentials 199, where WiFi SSID-Owner AP 199a was previously recorded by mobile phone 108 or device 101 in the identities list 320. Device owner 122 with server 122d could use the identity ID.monitored-unit 106a in order to select URL 421a for monitored unit manufacturer 421.

Device owner 122 could use geographical location location.device 325 in order to select a reporting system 120, and in exemplary embodiments a different reporting system 120 could be used for different geographies, such as a first reporting system 120 used with devices 101 in China (possibly due to regulatory requirements), and a second reporting system 120 used with device 101 in Germany (possibly due to different laws regarding protection of personal data), and other possibilities exist as well for a device owner 122 to use the data received in a message 404 in order to select a reporting system 120 for device 101 with ID.device 101b. Device owner 122 and/or server 122d could repeat the queries in a step 404a in order to record the information transmitted in a message 405 sent to configuration system 114 and described below.

Device owner server 122d can then perform an encryption step 222 as depicted and described in connection with FIG. 2C above in order to create a ciphertext 222a. Device owner 122 or server 122d could record the public key for device 101 which could be PK0.device 101ta, where PK0.device 101ta could be recorded in a certificate cert0.device 101t. PK0.device 101ta for device 101 using ID.device 101b can be recorded in a device database 122x. For step 222, (a) server 122d could encrypt the selected owner WiFi credentials 199 (or credentials 199 for wireless networks other than WiFi such 4G LTE or 5G, etc.) using an asymmetric cryptographic algorithm 231a such as (i) RSA or (ii) ECC using ElGamal or (iii) a post-quantum cryptography key exchange mechanism (KEM) and PK0.device 101ta, and (b) device 101 could decrypt the selected owner WiFi credentials 199 using the corresponding asymmetric cryptographic algorithm 231b and SK0.device 101s. Server 122d could then conduct a signature creation step 220b, where server 122d creates a signature 407 over ciphertext 222a using a secret key for server 122d corresponding to a public key recorded in cert.owner 122c. A signature creation step 220b is depicted and described in connection with FIG. 2B above. In exemplary embodiments, including a signature with asymmetric encryption 231a with public key PK0.device 101ta is preferred, since potentially any node on IP network 128 could asymmetrically encrypt values using PK0.device 101ta (since it is by definition publicly shared).

In a different exemplary embodiment, encryption step 222 for server 122d could comprise (i) server 122d deriving a symmetric key and then (ii) using the symmetric key as the plaintext to generate ciphertext 222a with an asymmetric ciphering algorithm. In other words, encryption step 222 for server 122d could comprise (i) encrypting WiFi credentials 199 (or credentials 199 for wireless networks other than WiFi such 4G LTE or 5G, etc.) with the symmetric key instead of (ii) asymmetrically encrypting the full set of owner WiFi credentials 199. In this different exemplary embodiment, the derived symmetric key could then be used with a symmetric ciphering algorithm such as AES in order to encrypt owner WiFi credentials 199 (or credentials 199 for wireless networks other than WiFi such 4G LTE or 5G, etc.) into ciphertext 222a. The asymmetrically encrypted symmetric key could be transmitted along with symmetrically encrypted ciphertext 222a in a message 405 below.

The configuration system 114 could pass the asymmetrically encrypted symmetric key and the symmetrically encrypted ciphertext 222a to the device 101, which could use SK0.device 101s to decrypt the asymmetrically encrypted symmetric key (where the asymmetrically encrypted symmetric key could be a first portion of ciphertext 222a). Device 101 could then use the decrypted symmetric key to symmetrically decrypt the symmetrically encrypted portion ciphertext 222a in order for device 101 to read the plaintext owner WiFi credentials 199 (or credentials 199 for wireless networks other than WiFi such 4G LTE or 5G, etc.). The use of a step 222a in FIG. 2C illustrates a potential asymmetric encryption of a symmetric ciphering key. Ciphertext 222a could comprise two portions, where a first portion comprises an asymmetrically encrypted symmetric key and the second portion comprises as symmetrically encrypted set of owner credentials.

Although FIG. 4 depicts owner server 122d creating ciphertext 222a and signing ciphertext 222a, in exemplary embodiments a WiFi access point or wireless network other than owner WiFi access point 122b could be selected based on a networks available list 322 received by configuration server 112. In an exemplary embodiment, an owner WiFi access point 122b may not be present or available at the physical location 325 of device 101 and/or monitored unit 106, but a different wireless network 329 might be available or detected in a step 319 with an identity list 320, as depicted in FIG. 3. For this embodiment, configuration system 114 could send a message 404 with ID.device 101b and a network identity for wireless network 329, along with a set of Config-default.device 103c or similar WiFi or wireless parameters 103c for device 101, to an owner or operator of wireless network 329. Note that wireless network 329 could also be another WiFi access point.

An owner or operator of wireless network 329 could use the network identity for wireless network 329 (which could be an SSID for a WiFi access point) to select a set of credentials for wireless network 329 and then (i) perform an encryption step 222 for the credentials for wireless network 329 and then also (ii) conduct a signature creation 220 step for the credentials using a private key corresponding to a public key recorded in a certificate, and (iii) send the resulting ciphertext 222a, signature, and certificate to configuration system 114 in a message 405. In other words, although FIG. 4 depicts a device owner 122 providing credentials 199, encrypting credentials 199, and signing the credentials 199, the present invention contemplates the owner of a different wireless network 329 than an owner WiFi access point 122b performing the same or equivalent steps in order to transfer a set of credentials to device 101 for use with a radio such as radio 101i or radio 101h.

Device owner server 122d can then send message 405 to configuration system 114, where message 405 can contain Device Configuration 132b, URL-Manufacturer 421a, ID.RS 120a, Cert.RS 120c, URL-RS 120b Ciphertext 222a (Owner WiFi Credentials 199), Cert.Owner 122c, Cert.CA3 123a, and Signature Owner 407 (Ciphertext 222a). Device Configuration 132b can comprise an operating configuration for device 101, including the specification of operating mode (e.g. debug, release, safe mode, etc.), logging levels for device 101, device certificate renewal or revocation policies, security policies or parameters (e.g. firewall rules), and an identity or URL for device 101 to contact device owner server 122d in the future after a configuration step 102. Device configuration 132b could also include a secondary bundle or configuration for a primary platform or "smart secure platform" operated by device 101. URL-Manufacturer 421a can comprise a URL for configuration system 114 to contact the manufacturer 421 of monitored unit 106 for configuration data such as Monitoring Unit Configuration 132e. ID.RS 120a can comprise an identity for reporting system 120, Cert.RS 120c can comprise a certificate for reporting system 120, URL-RS 120b can comprise a URL for reporting system 120 that configuration system should use when contacting reporting system 120.

Ciphertext 222a (Owner WiFi Credentials 199) can comprise encrypted credentials from owner 122, and ciphertext 222a is depicted and described in connection with FIG. 2C above. Cert.Owner 122c, and Cert.CA3 123a in message 405 can comprise certificates for owner 122 such that device 101 could use the certificates in order to verify signature 407 and the signature in a certificate cert.owner 122c. In exemplary embodiments, Cert.CA3 123a is signed by the root certificate authority 109, and device 101 can be manufactured with cert.CA.root 109a recorded in protected nonvolatile memory as depicted in FIG. 1E above (where device 101 can verify Cert.CA3.123a with cert.CA.root 109a). Signature Owner 407 can be created in a step 220b above and can be sent in message 405.

Configuration system 114 can receive message 405 and record and process the data.

Configuration system 114 can perform a step 405a, which could be to record ciphertext 222a in encrypted format in order to subsequently send to device 101. Note that in exemplary embodiments, configuration system 114 cannot feasibly decrypt ciphertext 222a and read the plaintext since configuration system 114 does not record secret key SK0.device 101s. Also note that ciphertext 222a has been "double encrypted" since ciphertext 222a is transmitted over a secure session 403. Further, signature 407 can be transmitted within secure session 403 as depicted in FIG. 4. Configuration system 114 can then send message 408 to device manufacturer 101x, where message 408 can include ID.Device 101b and device version 101y.

Device manufacturer 101x can use ID.Device 101b and device version 101y in order to lookup operating system 108e updates, which could comprise security patches, firmware updates, device driver updates, etc. Device manufacturer 101x can respond with a message 409, where message 409 could include a set of files for a Device OS Updates 132a and also a value or number for OS version 101ea, which can be a version number for the operating system 101e including updates or patches from device OS updates 132a. Although not depicted in FIG. 4, the Device OS Updates 132a could optionally be signed by device manufacturer 101x. However, in exemplary embodiments configuration system 114 can trust the data received in message 409 and related messages since they are received over a secure session 403. Note that secure session 403 depicted in FIG. 4 comprises separate secure sessions from configuration system 114 to the other nodes depicted.

Configuration system 114 can send transducer manufacturer 420 a message 410 which includes the value for OS version 101*ea* and ID.transducer 101*ka*. Transducer manufacturer 420 can use the values OS version 101*ea* and ID.transducer 101*ka* in order to look up and obtain current versions of transducer libraries/drivers 132*c* and also transducer configuration 132*d*. In other words, transducer libraries/drivers 132*c* could be updated to support or be compatible with OS 101*e* including updates via patches in device OS updates 132*a*. Transducer configuration 132*d* could comprise a transducer electronic data sheet (TEDS) as specified in IEEE standard 1451.5, or similar or subsets of contained within a TEDS.

Configuration system 114 can send the manufacturer 421 of monitored unit 106 a message 412 with the identity. MU 106*a*, which could be recorded by mobile handset 108 in a step 319 above. The manufacturer 421 of monitored unit 106 could respond with a monitoring unit configuration 132*e*, which could specify operating ranges or values for device 101 to operate with monitored unit 106. As one example, if monitored unit 106 comprises an autonomous vehicle then manufacturer 421 could comprise a car manufacturer and configuration 132*e* could specify a maximum speed allowed, a maximum engine temperature before device 101 sends an alarm condition to reporting system 120, and other possibilities exist as well. In other words, device 101 could use monitoring unit configuration 132*e* in order to determine alarm thresholds or conditions in order to notify reporting system 120 regarding a potential alarm state for monitored unit 106. Configuration 132*e* could also specify maximum values or minimum values or a range of values for device 101 to use with a transducer 101*k*, such as a range in voltage, a range in current, or similar values for transducer 101*k* to implement with monitored unit 106 when transducer 101*k* operates as a transducer.

Configuration system 114 can send reporting system a message 414, where message 414 can include ID.Device 101*b*, Cert0.Device 101*t*, ID.TR 101*ka*, and ID.MU 106*a*. ID.TR 101*ka* can comprise the identity for transducer 101*k* and ID.MU 106*a* can comprise an identity for monitored unit 106. At step 415 reporting system 120 can record the data received in message 414 in a reporting database 118 to support the ongoing operation of device 101 upon completion of a configuration step 102. Although not depicted in FIG. 4, in exemplary embodiments a message 414 could also contain Transducer Configuration 132*d* and Monitoring Unit Configuration 132*e*, which could also be recorded in a reporting system database 118. For example, if monitoring unit configuration 132*e* specifies a maximum or minimum value before an alarm condition, then reporting system can use the data in monitoring unit configuration 132*e* to determine if transducer data 125 signals monitored unit 106 has entered an alarm state. ID device 101*b* and cert0.device 101*t* can be used by reporting system 120 in order to authenticate and encrypt data with device 101 using ID.device 101*b*.

A step 415 for reporting system 120 can also comprise reporting system using the data from message 414 in order to determine or select a configuration of device 101 for reporting system 120, such as the use of a first or second reporting server 116 (such as different geographical locations), and other possibilities exist as well. Reporting system 120 could specify values for a reporting system configuration 132*f*, which could identify the first or second reporting server 116 as the primary and the other reporting server 116 as the backup. Reporting system configuration 132*f* could also specify values such as timers for device 101 to use when sending data to a reporting server 116, the name or URL of a reporting server 116, a protocol or port number for device 101 to use when communicating with reporting system 116, and other or similar parameters as well. In exemplary embodiments, a reporting system configuration 132*f* can specify ECC algorithms and parameters for device 101 to use, such as a curve name and key length, which could comprise curve P-256 and key length of 256 bits in an exemplary embodiment.

A step 415 could also comprise reporting system 120 selecting a reporting application software 132*g* file, which could be an application or program for device 101 to operate when communicating with reporting system 120. Although not depicted in FIG. 4, configuration server 112 could send both ID.device-OS 101*ea* and device.version 101*y* in a message 414 and reporting system 120 could use the data to select the reporting application software 132*g* file. Reporting application software 132*g* could be similar to configuration application 108*g* for mobile device. In exemplary embodiments, reporting application software 132*g* could specify the name or URL for device 101 or mobile handset 108 to use in order to download the full application (such as a URL or name to download the file from an "app store"). Or, for a step 415 reporting system 120 could select the entire file or program Reporting application software 132*g* and return the file in the subsequent response 416 below.

In a step 415, reporting system 120 can also select a set of reporting system (RS) credentials 132*h* for device 101 with ID.device 101*b* to use when communicating with reporting system 120. RS credentials 132*h* can include a name or identity for device 101 to use with reporting system 120, a password, preshared secret key (PSK), a certificate associated with reporting system 120, and also parameters for using RS credentials 132*h*. Parameters for using RS credentials 132*h* could be similar or equivalent to authentication parameters 111*d* depicted and described in connection with FIG. 2A above. RS credentials 132*h* could be unique for each device 101 and also recorded in a reporting system database 118. In exemplary embodiments, reporting system 120 can conduct an encryption step 222 in order to encrypt RS credentials 132*h* into a ciphertext 222*b*. For an alternative exemplary embodiment and as discussed above for the creation of ciphertext 222*a* by device owner server 122*d*, a reporting system 120 could (i) asymmetrically encrypt a symmetric key for a ciphertext 222*b* and then also (ii) create a ciphertext of RS credentials 132*h* using the symmetric key and a symmetric ciphering algorithm. Reporting system 120 could then conduct a signature creation step 220*c*, where reporting system 120 creates a signature 418 over ciphertext 222*b* using a secret key for reporting system 120 corresponding to a public key recorded in a certificate for reporting system 120, such as an exemplary cert.RS 120*c* which was also depicted along with message 405 above. A signature creation step 220*c* is also depicted and described in connection with FIG. 2B above.

Reporting system 120 can then send a message 416 to configuration system 114, where message 416 can include Reporting System Configuration 132*f*, Reporting Application Software 132*g*, Ciphertext 222*b* (RS credentials 132*h*), cert.RS 120*c*, and Signature RS 418 (Ciphertext 222*b*). Reporting System Configuration 132*f*, Reporting Application Software 132*g* were described two paragraphs above and Ciphertext 222*b* (RS credentials 132*h*), and Signature RS 418 (Ciphertext 222*b*) were described in the paragraph above. Configuration system 114 can receive message 416 and record the data. Note that in exemplary embodiments, configuration system cannot normally read ciphertext 222*b* since the data is encrypted. The transfer of a ciphertext 222*b* through a secure session 403 could comprise a "double encryption" of ciphertext 222*b*, where configuration system 114 could decrypt a first layer of encryption applied by secure session 403, but configuration system 114 (or any device or node other than device 101) would not normally be able to decrypt the second layer of encryption comprising ciphertext 222b since SK0.device 101s would normally be required to decrypt a ciphertext 222a (and also a ciphertext 222a above).

Configuration system 114 may then select or obtain access network credentials 126a, where network access credentials 126a could be used for a wide area network (WAN) and WAN radio 101h in device 101. In exemplary embodiments and as discussed above in connection with FIG. 1F, a set of access network credentials 126a could be used as a backup or failover if connectivity for device 101 through Device Owner WiFi Access Point 122b is not available or able to route packets through an IP network 128. Configuration server 112 could query configuration database 112a using the networks available list 322 depicted and described in connection with FIG. 3 above, where the networks available list 322 provide information about wireless networks including WAN networks around device 101. A response to a query to configuration database 112a could provide a selected access network 126 that is preferred based on criteria such as (i) bandwidth cost, expected energy or power requirements (i.e. 3G/4G may use more power than LPWAN), (ii) RF signal strength measurements for networks available list 322, (iii) capabilities of a device WAN radio 101h, and (iv) commercial terms such as agreements between device owner 122 and networks in a networks available list 322. Configuration system 114 could also query other servers in a configuration system 114 or a system 100 in order to obtain a selected access network 126 from networks available list 322.

Upon selection of a preferred access network 126, configuration system 114 can send access network 126 a message 419a that includes an identity of device 101 in the form of ID.device 101b. Message 419a could also include a request to provision credentials to configuration system 114 for ID.device 101b and also include cert0.device 101t. Access network 126 could then respond with a set of access network credentials 126a for device 101 in a message or response 419b. Access network credentials 126a could include data for device 101 to use with access network 126, such as an identity, a secret key, cryptographic parameters similar to parameters 111d or parameters 151, a shared key (equivalent to a PSK such as K in 4G and 5G standards), a certificate authority certificate, a root certificate for access network 126, and similar data necessary for device 101 to setup a wireless connection with access network 126.

In exemplary embodiments, access network 126 could encrypt access network credentials 126a into a ciphertext 222c using PK0.device 101ta from cert0.device 101t such that only device 101 could feasible read ciphertext 222c. In this manner, configuration system 114 and any other intermediate servers or computers on the IP network 128 would not be feasibly able to read access network credentials 126a in ciphertext 222c. Further, exemplary embodiments contemplate that message 419a could contain a profile for an embedded universal integrated circuit card (eUICC) in a message 419a, where the profile for the eUICC could comprise the access network credentials 126a.

At step 422, configuration system 114 can assemble or combine all the data received above for a step 326, such that (i) configuration server 114 can create configuration package 132, and (ii) configuration package 132 can be transferred to device 101 via mobile phone 108, where (iii) connectivity to mobile phone 108 for device 101 has been established using the device default credentials 103. The data and/or filed depicted as received in by configuration server 114 in FIG. 4 could be combined into a single file such as via the "tape archive" TAR command, and other possibilities exist as well, where the combined files received in a step 326 comprise configuration package 132. Configuration package 132 can also be compressed using gzip or other compression techniques. Configuration system 114 using a configuration server 112 can also create a full file list 505 (shown below in FIG. 5) for a configuration package 132 in a step 422. File list 505 can comprise a list of all the files or data with file names for configuration package 132. File list 505 could also include metadata for each file in configuration package 132 for device 101 to utilize in order to load or apply data from configuration package 132, such as a full file path directory structure for each file, file permissions for each file (e.g. executable or read-only), and possibly a file owner or permissions for each file (such as owned by device 101, or a secure element ID or eUICC identity in device 101, owned by a reporting system 120 or access network 126, etc.).

For a step 220 by configuration system 114 in FIG. 4, the configuration package 132 can also include a signature 220d from configuration system 114 using a secret key SK.CS, such that device 101 can use a signature verification step 221 with the public key PK.CS from cert.CS 112c. In this manner, device 101 can verify that configuration package 132 is from previously authenticated configuration system 114. In a different exemplary embodiment, a signature 220c for configuration package 132 can be optionally omitted since configuration package 132 could be delivered through an authenticated channel such as secure session 310 between device 101 and configuration server 112, and thus device 101 would know that configuration package 132 is from an authenticated and trusted source.

In preferred exemplary embodiments for a step 422 in FIG. 4, configuration system 114 also conducts a signature verification 221 step on individual files or software components for configuration package 132 that configuration system 114 receives from other nodes in a system 400. For example, before (a) configuration system 114 (possibly using configuration server 112) signs configuration package 132 for device 101 in a step 220, (which could include exemplary files for an updated device OS 101e where the files for the updated device OS 132a were received by a device manufacturer 101x), (b) configuration server 112 could conduct a signature verification 221 step for a signature by device manufacturer 101x on the exemplary files for updated device OS 132a.

In other words, in exemplary embodiments, configuration system 114 verifies signatures on files received in a step 326 before configuration server 112 conducts a signature creation step 220 for the configuration package 132. In this manner, elements for configuration package 132 may be sourced from multiple different parties in a system 400 and system 100 above, and configuration system 114 could (i) verify authenticity for each file source depicted and (ii) provide an overall signature 220d or "stamp of approval" of configuration package 132 for device 101. In this manner, device 101 may not need to check the signatures on individual elements within configuration package 132, which could be difficult if device 101 does not have all the intermediate and root certificates for each of the individual element signatures in a configuration package 132. A step 422 can comprise configuration system also collecting a set of root certificates 109aa for a configuration package 132, where the set of root certificates 109aa was depicted and described above in connection with FIG. 1F.

Note that not all data depicted is required for a step 326 in FIG. 4, and some steps could optionally be omitted or combined in exemplary embodiments. For example, collecting data from a transducer manufacturer 420 or monitored unit manufacturer 421 could be omitted for some embodiments. In another example, access network 126 may not have a business or contractual relationship setup with configuration system 114 and thus configuration system 114 may not be able to directly obtain a set of encrypted credentials 126*a* from an access network 126. However, an owner 122 may have a business or contractual relationship with access network 126, and in this case owner server 122*d* could send the message 419*a* and receive the response 419*b*, and server 122*d* could forward the response 419*b* to configuration system 114. Further, servers depicted in FIG. 4 could be combined, such that configuration system 114 operates as a set of servers within any of (i) owner 122, (ii) device manufacturer 101*x*, or (iii) reporting system 120. Other possibilities exist as well without departing from the scope of the present invention to conduct a step 326 in order for a server or system to collect or assemble files or data for a device 101.

FIG. 5

FIG. 5 is a simplified message flow diagram illustrating an exemplary system with exemplary data sent and received by a configuration server, a mobile handset, and a device, in accordance with exemplary embodiments. Before initiating steps and message flows depicted in FIG. 5, mobile phone 108, device 101, and the other elements depicted for system 500 in FIG. 5 may previously complete exemplary message flows and steps depicted in FIG. 2A, FIG. 3, and FIG. 4 above. System 500 can include a configuration server 112, mobile phone 108, and device 101. In a system 500, (i) mobile phone 108 and configuration server 112 can continue secure session 321 from FIG. 3 above, (ii) mobile phone 108 and device 101 can continue to use WiFi session 303 from FIG. 3 above, and (iii) device 101 and configuration server 122 can continue to use secure session 309 from FIG. 3 above. If any of the above sessions 303, 309, or 321 terminate or are paused, the sessions could resume in order to conduct the data transfers and message flows depicted in FIG. 5.

As depicted in FIG. 5, mobile phone 108' can operate a WiFi access point 108*i* using device default credentials 103. As discussed above, values or data in device default credentials 103 could comprise frequencies or channels to utilize for configuration-default.device 103*c*, a service set identifier (SSID) 103*a*, or network name, user identities and passwords 103*b*, and/or public certificates for client 101*i* and access point 108*i*, etc. In exemplary embodiments, WiFi access point 108*i* does not broadcast the SSID 103*a* such as in a broadcast frame, and the only client knowing SSID 103*a* could feasibly be device 101 using client 101*i* and device default credentials 103. In addition, by (a) using an obfuscated and non-broadcasted SSID (possibly a pseudo random string such as depicted in FIG. 1B) which was recorded in nonvolatile memory of device 101 before distribution of device 101 to device user 101*a*, then (b) only device 101 could reasonably connect with WiFi access point 108*i*. Further, an access list of allowed users for WiFi access point 108*i* in a set of device default credentials 103 can result in only device 101 being able to connect via WiFi connection setup 303 in FIG. 5. In other words, values in config-default.device 103*c* could include a MAC address for device 101 to use with WiFi session 303, which would also be used by device 101 in WiFi session 303, and thus access point 108*i* could restrict devices allowed such that they must match the MAC address included in config-default.device 103*c*. In an exemplary embodiment, WiFi access point 108*i* can operate as an open access point with an SSID 103*a* that is not broadcast, but also with an SSID 103*a* that comprises a pseudo random string or value uniquely or specifically associated to device 101, such that only device 101 that also records SSID 103*a* (and also possibly a MAC for device 101 in config-default.device 103*c*) would connect with the WiFi access point 108*i*.

At step 501, device 101 can prepare for download of configuration package 132 from configuration server 112, and also send data to configuration server 112 in preparation for download of configuration package 132. For step 501, device 101 could determine available storage memory 101*f* and send a report to configuration server 112 in order for configuration server 112 to determine if sufficient memory resources are available in device 101 in order to accept configuration package 132. Other data from device 101 to configuration server 112 could be included in a step 501 as well, such as (i) current mode of operation for device 101 (e.g. debug mode, release/operating mode, safe mode, etc.), (ii) a second identity list 320 determined by device 101 (which configuration server 112 could compare to the first identity list 320 received from mobile phone 108), and (iii) confirmation of a signature verification step 221 for configuration system certificate cert.CS 112*c* and all parent certificates through a root certificate 109*a* recorded in device 101. For example, if (iii) has failed, then configuration server 112 could be notified in a step 501 and subsequently send additional or missing "parent" certificates with a message 503 below, such that cert.CS 112*c* could be verified by a root certificate cert.CA.root 109*a* recorded in device 101. Other possibilities exist as well for a configuration package download preparation step 501 without departing from the scope of the present invention. Data from a step 501 could be sent in a message (not shown in FIG. 5) from device 101 to configuration server 112 through secure session 309 before receipt of a message 503 with configuration package 132.

Configuration server 112 can then use connection 309 to send a message 503 to device 101, where message 503 includes ID.Transaction1 504, Ciphertext 222*a* (Owner WiFi Credentials 199), a certificate Cert.Owner 122*c*, Signature Owner 407 over (Ciphertext 222*a*), file list 505, Configuration Package 132, Signature 220*c* (Configuration Package 132), and Cert.Config-System 114*c*. ID.transaction1 504 can comprise a unique identifier for message 503, such that configuration server 112 and device 101 can reference ID.transaction1 in subsequent messages, such as if retransmissions or acknowledgements are required with a transaction ID. Ciphertext 222*a* containing an encrypted set of owner WiFi credentials 199 was depicted and described in connection with FIG. 2C and step 222 for server 122*d* in FIG. 4. Note that although a secure session 309 may be utilized for transfer of message 503, a separate ciphertext 222*a* can be included inside the encrypted session 309 since configuration server 112 may not normally be able to read the plaintext credentials 199 in exemplary embodiments.

For other exemplary embodiments where configuration server 112 is either (a) operated by owner 122 or (b) under a sufficient level of control by owner 122, then use of a separate ciphertext 222*a* could be omitted and credentials 199 could be sent as plaintext inside secure session 309 (e.g. credentials 199 could be encrypted by session 309 but not "double encrypted" through the use of an additional layer of encryption in the form of ciphertext 222*a*). For exemplary embodiments where ciphertext 222*a* is included inside secure session 503, ciphertext 222a could either comprise (i) an asymmetric encryption of owner WiFi credentials 199 such as via Elgamal asymmetric encryption or RSA asymmetric encryption or a PQC KEM, or (ii) ciphertext 222a could comprise two separate portions of ciphertext where the first portion of ciphertext could comprise an asymmetric encryption of a symmetric key and the second portion of ciphertext could comprise a symmetric encryption of credentials 199 using the asymmetrically encrypted symmetric key.

The certificate cert.owner 122c in message 503 can be signed by a public key recorded in device 101, such as cert.CA1 115a or cert.CA0 107a or cert.CA.root 109a. For exemplary embodiments where ciphertext 222a comprises asymmetric encryption, then signature 407 over ciphertext 222a can comprise a signature using the owner 122 private key for the public key in certificate 122c, such that device 101 can verify that encrypted credentials 199 are authoritatively sent from owner 122. In other words, since (i) asymmetric encryption can be used for ciphertext 222a, and (ii) the asymmetric encryption can use public key PK0.device 101ta which may be publicly available, then without a signature 407 potentially any node with access to public key PK0.device 101a on IP network 128 could create a an unsigned ciphertext 222a. However, the use of a signature 407 over ciphertext 222a can confirm that ciphertext 222a was authoritatively originated by owner 122. Message 503 through secure session 309 can also include the file list 505 and configuration package 132 as depicted in FIG. 5. File list 505 and configuration package 132 was described above in connection with step 422 of FIG. 4, and both file list 505 and configuration package 132 can be received by device 101 in message 503. Note that message 503 could be sent in multiple parts, such that the collection of parts could comprise message 503.

In some embodiments, configuration package 132 may optionally not be sent with a separate signature 220d (described above in connection with step 422 of FIG. 4) because the configuration package 132 is received through an encrypted, authenticated, and integrity checked secure session 309. For these embodiments, configuration server 112 could perform the steps depicted for configuration system 114 in FIG. 4 above. However, for embodiments where configuration system 114 uses multiple servers and configuration server 112 may be a different server than a server conducting a step 422, then a signature 220d for configuration package 132 may also be sent with message 503 (as shown in FIG. 5). For these embodiments where (a) multiple servers are used by configuration system 114 and (b) a separate server than configuration server 112 conducts a step 422, then (c) a certificate cert.configuration-system 114c can be sent in a message 503 as well. The corresponding private key used to create signature 220d in a signature creation step 220 in FIG. 4 can have the public key included in cert.configuration-system 114c. Device 101 can subsequently verify (a) signature 220d for configuration package 132 from a step 422 from a configuration server in configuration system 114 other than configuration server 112 using (b) the public key from a certificate cert.configuration-system 114c, which is included in a message 503. For these embodiments, the parent certificate chain for cert.configuration-system 114c can include a public key that is already recorded in device 101, such as within cert.CA.root 109a.

Device 101 can receive message 503 over secure connection 309, where secure connection 309 could use or be transferred via WiFi connection 303, as depicted in FIG. 5. In step 507, device 101 can (i) receive the message 503 via secure connection 309 and the WiFi session 303 and (ii) record the data in RAM 101d or storage 101f. In step 507, device 101 can also verify cert.owner 122c using either (i) cert.CA3 123a directly and previously recorded or received by device 101 and/or (ii) a commonly shared certificate cert.CA.root 109a shared between device 101 and device owner 122. In other words, in exemplary embodiments and before a configuration step 102, device 101 records in nonvolatile memory either (i) cert.CA3 123a or (ii) cert.CA.root 109a, where a parent certificate for cert.owner 122c can be checked with cert.CA.root 109. Other possibilities exist as well for cert.owner 122c and/or parent certificates for cert.owner 122c to be verified by a device 101 using a previously recorded public key in a certificate recorded in device 101, without departing from the scope of the present invention. In the exemplary embodiment depicted in FIG. 5, cert.owner 122c can be verified with cert.CA3 123a, which could be verified with cert.CA.root 109a. Although not depicted for message 503 in FIG. 5, cert.CA3 123a could be included in a message 503. As described in connection with FIG. 2B above, device 101 could verify the certificate for cert.owner 122c (and parent certificates) using a signature verification step 221.

In other words, in a step 507, device 101 could verify the public key for cert.owner 122c using cert.CA3 123a and a signature verification step 221, and then the public key for cert.CA3 123a could be verified by device 101 using a cert.CA.root 109a. For a step 507, if device 101 does not record the full certificate chain linking cert.owner 122c with a recorded cert.CA.root 109a, then device 101 could send a query to configuration server 112 requesting for an alternative certificate chain that would link cert.owner 122c with a recorded cert.CA.root 109a in device 101. For exemplary embodiments where (i) a different wireless network 329 is used than owner WiFi access point 122b and (ii) the credentials 199 received in message 503 are from the owner of wireless network 329, then both (a) message 503 can include a signature for the credentials 199 from the owner of the selected wireless network 329, and (b) a certificate for the owner of the selected wireless network 329, and (c) a chain of certificates linking the certificate for the owner of the selected wireless network 329 to a recorded root certificate cert.CA.root 109a.

In exemplary embodiments, device 101 can record a plurality of root certificates cert.CA.root 109a before a configuration step 102, such that a first cert.CA.root 109a comprises the "top-level" or root certificate for Certificate Authority (Configuration System) 115, a second cert.CA.root 109a comprises the "top-level" or root certificate for Certificate Authority (Reporting System) 120, a third cert.CA.root 109a comprises the "top-level" or root certificate for Certificate Authority (owner) 123, and a fourth cert.CA.root 109a comprises the "top-level" or root certificate for Certificate Authority (device) 107. Further, a device 101 or a device manufacturer may now "know" which configuration system 114 or device owner 122 may be used with a device 101 before a configuration step 102 (where different systems or owners may use different certificate authorities), and consequently device 101 could record multiple root certificates before a configuration step 102 (such as the exemplary 4 root certificates described in this paragraph). In exemplary embodiments, a device 101 from a manufacturer 101x can record root certificates 109a or root certificates 109aa from the list of included root certificates from the Mozilla Foundation with Mozilla projects, where the aggregate list of community approved root certificates and associated parameters is in the widely distributed file certdata.txt from the Mozilla web site.

Some of the certificate authorities in a FIG. 1A could also share the same root certificate. For example, if Certificate Authority (Configuration System) 115 and Certificate Authority (Device) 107 share the same parent Certificate Authority Root 109, the first and second cert.CA.root 109a described above in this paragraph could comprise the same, single cert.CA.root 109a. For embodiments where cert.CA3 123a could be included in a message 503 and cert.CA3 123a can comprise the parent certificate for cert.owner 122c, then device 101 can verify cert.CA3 123a using the third recorded cert.CA.root 109a described above in the previous paragraph.

Device 101 can conduct a decryption step 233 for ciphertext 222a, where decryption 233 is depicted and described in connection with FIG. 2C above. After decryption step 233, device 101 can read the plaintext values for owner WiFi credentials 199 (or credentials 199 for wireless networks other than WiFi such 4G LTE or 5G, etc.). If an asymmetric decryption algorithm 231b is used with ciphertext 222a, then device 101 can decrypt ciphertext 222a using SK0.device 101s. As described above for the initial encryption of ciphertext 222a by owner server 122d and also depicted in FIG. 2C, decryption of ciphertext 222a by device 101 could comprise two parts, where (i) the first part comprises asymmetrically decrypting with asymmetric decryption algorithm 231b a symmetric key, and then (ii) using the plaintext symmetric key to decrypt the second part of ciphertext 222a (such as using the AES symmetric ciphering algorithm) in order to read the plaintext owner WiFi credentials 199 (or credentials 199 for wireless networks other than WiFi such 4G LTE or 5G, etc.). For embodiments where device 101 also receives ciphertext 222b for reporting system 120 and ciphertext 222c for access network 126, the decryption step 233 in FIG. 5 can also comprise device 101 converting the ciphertext into plaintext. Note that ciphertext 222b and ciphertext 222c could be included in a configuration package 132 and thus are not separately depicted in a message 503. Further, ciphertext 222a could be included in a configuration package 132 as well, but ciphertext 222a is separately depicted in order to illustrate the secure transfer of credentials 199 to device 101 in order to use access point 122b.

Device 101 can then conduct a step 221b in order to verify signature 407, where (i) step 221b comprises using a signature verification step 221 with the public key for device owner server 122d received in cert.owner 122c in message 503, and (ii) signature 407 can be over ciphertext 222a. Or, in exemplary embodiments signature 407 could alternatively be over the plaintext data in ciphertext 222a, which could be owner WiFi credentials 199 (or credentials 199 for wireless networks other than WiFi such 4G LTE or 5G, etc.). A step 221b for device 101 can be used to verify that the owner WiFi credentials 199 received in a message 503 are authoritatively from device owner 122. As discussed above, the previous step 507 can confirm the public key for device owner 122 in cert.owner 122c is also authenticated using parent certificates that link to a recorded root certificate cert.CA.root 109a.

Device 101 can then conduct a step 221c in order to verify signature 220d, where (i) step 221c comprises using a signature verification step 221 with the public key for configuration system 114 received in cert.configuration-system 114c in message 503, and (ii) signature 220c can be over the configuration package 132. A step 221c for device 101 can be used to verify that the configuration package 132 received in a message 503 are authoritatively from configuration system 114. As discussed above, the previous step 507 can confirm the public key for configuration system 114 in cert.configuration-system 114c is also authenticated using parent certificates that link to a recorded root certificate cert.CA.root 109a.

Device 101 can then conduct a step 508, where step 508 can include both (i) device 101 decompressing configuration package 132 using an exemplary library such as gzip. Device 101 can (A) report an error or (B) refuse to process configuration package 132 or elements within configuration package 132 if (C) a signature verification step 221c fails. Step 508 can also comprise device 101 verifying that configuration package 132 contains all the data and files listed in a file list 505, processing metadata in file list 505 for configuration package 132. Device 101 in step 508 can also verify the individual files in file list 505 all properly load and can be read. At step 508 in FIG. 5, device 101 can record the data within configuration package 132 in device storage memory 101f or RAM 101d. In exemplary embodiments, Device OS Updates 132a files for device OS 101e can be recorded in device storage memory 101f, and other possibilities exist as well. A step 508 can also comprise device 101 backing up or recording the running configuration before loading data in a configuration package 132, and in this manner the system can be restored if applying the updated files for configuration package 132 fails. After internally recording or loading the files for configuration package 132, device 101 can perform a reboot, so that device 101 restart with the new files from configuration package 132.

Upon a reboot in a step 508, connections 303 and 309 may temporarily terminate with the reboot, but device 101 can re-establish connections after reboot. A step 508 can then also comprise device 101 creating a report 508a, where report 508a includes a status code with success or errors for each file in file list 505 for configuration package 132. In other words, report 508a can record the success or errors of applying each of the files in configuration package 132, which may be useful for configuration server 112 or other authorized elements in system 100 to know the state of device 101. Device 101 can then send configuration server 112 a message 509 over connection 309, where message 509 includes the transaction identity ID.transaction1 and the report 508a.

Upon reading the plaintext report 508a, configuration server 112 can conduct a step 511 as depicted in FIG. 5. Configuration server 112 could record in a configuration server database 112a each of the files in a file list 505 for configuration package 132 that were successfully installed, or possibly only record exceptions or error codes reported for the files in file list 505. For embodiments where some non-fatal errors or warnings were recorded in report 508a, then codes or logs of errors in a report 508a could also be recorded in a configuration server database 112a. A step 511 can also comprise configuration server 112 sending messages to other elements in system 100 in FIG. 1A regarding the status of device 101, such as sending (i) device owner 122 a notice of successful read of device owner credentials 199 from configuration package 132 (but credentials 199 may not necessarily be applied yet at a step 511), (ii) reporting system 120 a notice that device 101 should begin reporting with Reporting System Credentials 132h, and (iii) access network 126 that device 101 may begin connecting with Backup WAN Credentials 126a, and other possibilities exist as well for configuration server 112 to use or process data received in a report 508a from device 101. If error codes are for the installation of software are received in a report 508a, such as some software in configuration package 132 not being successfully installed, then configuration server 112 could use a step 511 with a configuration database 112a to determine next steps, such as potentially re-sending message 503 or resending a portion of the configuration package 132 to correct error codes or conditions identified in a report 508a.

In exemplary embodiments, network access credentials 126a in a configuration package 132 could comprise a profile for an embedded universal integrated circuit card (eUICC). Network access credentials 126a could also comprise values for a "smart secure platform" (SSP) such as an integrated SSP (iSSP) operated by device 101, where device 101 uses the network access credentials 126a and the iSSP in order to authenticate and connect with an access network 126. In addition, network access credentials 126a could comprise a pointer, URL, or another identifier of an eUICC profile or secondary bundle for device 101 to load. The transfer of network access credentials 126a from a message 419a in FIG. 4 above could comprise a transfer of the pointer, URL, or another identifier for the eUICC profile or bundle or package for an iSSP.

After processing step 511, configuration server 112 could perform a step 512, which can comprise a series of steps to close communications for mobile phone 108 and device 101. Configuration server 112 could generate and send a message 513a with command 512a for mobile phone 108, where command 512a instructs mobile phone 108 to close connection 321. Configuration server 112 could generate and send a message 513b with command 512b for device 101, where command 512b instructs device 101 to close connections 309 and 303 and also begin reporting through reporting system 120 using device owner WiFi access point 122b with device owner credentials 199 in FIG. 1A. Configuration server 112 could generate a configuration user report 512c, where report 512c could be for the configuration user 108a operating mobile phone 108. Report 512c could provide a human readable status for display on mobile phone 108 regarding the status of device 101 and a configuration step 102. Report 512c can also provide manual instructions for any modifications of transducers 101k or manual changes for configuration user 108a to perform for device 101, monitored unit 106, or connected equipment in order to complete the configuration step 102. In an exemplary embodiment, a report 512c could request that configuration user 108a attach an external antenna to device 101 in order to improve RF signal strength with access network 126. In another exemplary embodiment, report 512c could instruct configuration user 108a to perform a manual power cycle of device 101 or monitored unit 106. Other possibilities exist as well regarding instructions for a configuration user 108a in a report 512c to complete a configuration step 102 without departing from the scope of the present invention.

Mobile phone 108 can receive the message 513a with command 512a and report 512c, and mobile phone 108 then conduct a step 514a to close connection 321 with configuration server 112. Mobile phone 108 can then conduct a step 515, where the configuration user report 512c is displayed to configuration user 108a, and a step 515 can also comprise configuration user 108a entering information in a display for mobile phone 108 confirming any manual changes for device 101 or monitored unit 106. In some embodiments, a step 515 can take place before closing connection 321, such that mobile phone 108 can send information back to configuration server 112 and a configuration database 112a regarding any manual changes performed as requested in the configuration user report 512c.

At step 129, mobile handset 108 can then restore the previous user WiFi access point user credentials 105 for WiFi access point 108i recorded in a step 127 above in FIG. 1C. As depicted and described above in connection with FIG. 1C, in a restoration step 129 the mobile phone 108 can be restored to an operating state for configuration user 108a that existed before the configuration step 127 of mobile phone 108. In this manner, a configuration user 108a can continue using the mobile phone 108 as the mobile phone functioned before step 127. For example, configuration user 108a could have a personal laptop or tablet that periodically connects with mobile handset 108 using a WiFi access point 108i and credentials 105 that were recorded or backed up in memory 108f during a step 127. If those credentials from step 127 were not restored for mobile handset 108 in a step 129, then credentials 199 for WiFi access point 108i would continue to be used and the exemplary personal laptop or tablet for configuration user 108a would not normally be able to connect with mobile handset 108. In exemplary embodiments, the instruction for mobile phone 108 to conduct a step 129 could be included in command 512a in message 513a in FIG. 5.

Device 101 can receive the message 513b via session 309, where message 513b contains command 512b. Command 512b can instruct device 101 to close connection 303 and 309 and begin reporting through reporting system 120 using device owner WiFi access point 122b and credentials 199. Both mobile phone 108 and device 101 could then perform a step 516 and close connection 303. In exemplary embodiments, device 101 conducts a step 517 to load device owner WiFi credentials 199 for connecting with device owner WiFi access point 122b. Device 101 then conducts a connection setup 518 with device owner WiFi access point 122b (or wireless network 122b) using the device owner WiFi credentials 199 (or credentials 199 for wireless networks other than WiFi such 4G LTE or 5G, etc.). In exemplary embodiments, connection setup 518 could comprise using any of WPA2-PSK, WPA3-PSK, WPA2-Enterprise, WPA3-Enterprise, EAP-TLS, 5G authentication, and subsequent or related versions of these standards. The credentials necessary to connect with WiFi access point 122b (or wireless network 122b) could be from the received owner WiFi credentials 199 (or credentials 199 for wireless networks other than WiFi such 4G LTE or 5G, etc.).

Although connection 518 using device owner WiFi credentials 199 and device owner WiFi access point 122b, in other exemplary alternative embodiments a device 101 could connect with an access network 126 that is different than device owner WiFi access point 122b. For this exemplary alternative embodiment, then device 101 could use a set of WAN credentials 126a from a configuration package 132 and also as depicted in FIG. 4. Connection 518 would be through a wireless WAN such as any of a 3G, 4G, or 5G wireless network, including a low power wide area network over non-licensed spectrum such as in the 900 MHz ISM band (e.g. using SigFox or LoRA or Random Phase Multiple Access (RPMA)). Device 101 could use a smart secure platform (SSP) and the data securely received in a message 503 for connection 518.

At step 519, device 101 can process data in order to connect with reporting server 116, where reporting server 116 can be a server or set of servers in a reporting system 120. Data processed in a step 519 can include collecting data from transducers 101k using Reporting Application Software 132g, and a step 519 can comprise recording a set of startup or initialization data for transducers 101k from transducer configuration 132d. In exemplary embodiments, a step 519 also includes a calibration of transducers 101k with assistance of configuration user 108a and mobile phone 108. Mobile phone 108 could display to configuration user 108a instructions or steps related to calibration, such as providing a known reference signal to a transducer 101k. An example of providing a known reference signal for transducer 101k could be putting a temperature probe for a transducer 101k such as a thermocouple or thermistor in an ice water bath, and other examples exist as well. In other exemplary embodiments, a calibration of transducers within a step 519 can be omitted.

Device 101 for a step 519 could also read and operate on values for connecting with reporting server 116, such as reading a DNS name for reporting server 116, a TCP or UDP port number to connect with at reporting server 116. Additional or other steps or data for device 101 to perform in a step 519 could be in the Reporting System Configuration 132f received in a configuration package 132. A certificate for reporting system 120 or reporting server 116 such as a cert.RS 116c could be included in a set of reporting system credentials 132h in configuration package 132. In exemplary embodiments, Reporting System Configuration 132f within configuration package 132 contains a list of cryptographic parameters to utilize when communicating with reporting system 120 and reporting server 116 (such as a subset or superset of parameters 111d). Further, device 101 can used credentials in reporting system credentials 132h from configuration package 132 in order to authenticate with reporting system 120 and/or reporting server 116.

Device 101 can then conduct a series of steps in order to establish a secure communications link with reporting server 116, and conduct a secure session setup 520. FIG. 5 depicts an overview of the connection between device 101 and both (i) device owner WiFi access point 122b and (ii) reporting server 116. Device 101 can use the connection setup 518 to obtain access to IP network 128, and consequently device 101 can communicate with reporting server 116 in order to establish secure session 520. In exemplary embodiments, the connection between device 101 and reporting server 116 comprises a "datagram TLS" (DTLS) connection as specified in IETF RFC 6347 and subsequent versions, although other protocols could be used as well such as TLS. In exemplary embodiments, device 101 can use TLS or DTLS with a an extended resume function as specified in IETF RFC 5077 (or the equivalent for DTLS) such that secure session 520 can span periodic messages sent from device 101 over a period of days or longer, and thus secure session 520 does not need to be restarted each time device 101 sends transducer data 125 after an extended sleep period. Only an overview of the message flows between the nodes for a secure session setup 520 are depicted in FIG. 5. In exemplary embodiments, device 101 sends reporting server 116 the certificate cert0.device 101t in secure session 520.

In another exemplary embodiment, device 101 uses reporting system credentials 132h to establish secure session 520, and reporting system credentials 132h could include a new, different private key SK1.device 101s' for device 101 to use with reporting server 116. Reporting system credentials 132h could also include an identity for device 101 to use with reporting system 120 or reporting server 116, as well as a new, different certificate cert1.device 101t'. In other words, reporting system 120 can use different PKI keys for device 101 than those recorded for a manufactured device 101, and the credentials or keys could be received by device 101 in a set of reporting system credentials 132h. A set of reporting system credentials 132h could also include a shared secret key for device 101 to use with reporting system 120 or reporting server 116. Also, reporting server 116 could send device 101 a certificate for reporting server that may comprise a cert.RS 116c. Any certificates sent or received in a secure session 520 could be verified with a signature verification step 221 from FIG. 2B, and also any parent certificates sent and received in a secure session 520 could be verified all the way up to a root certificate cert.CA.root 109a or a set of root certificated 109aa. For exemplary embodiments where both sides of secure session 520 use verified certificates, then secure session 520 can also provide a mutually authenticated session in addition to encryption and checking for data integrity. Further, in some exemplary embodiments, session 520 comprises device 101 sending an identity of device 101 such as ID.device 101b to reporting server 116 (or a different identity for device 101 to use with reporting system 120).

Step 521 could also comprise reporting server 116 and reporting system 120 verifying that device 101 is authorized to use reporting system 120, after device 101 with device identity 101b (or a different identity for device 101 to use with reporting system 120 from reporting system credentials 132h) has be authenticated in setup of secure session 520. In other words, setup of secure session 520 can authenticate an identity for device 101 and reporting server 116, but an authenticated identity for device 101 may not be authorized to use reporting system 120. Step 521 could also comprise reporting system 120 or reporting server 116 fetching or querying a reporting database 118 using ID.device 101b (or a different identity for device 101 to use with reporting system 120 from reporting system credentials 132h) for reporting configuration 132f data pertaining to device 101. In exemplary embodiments, ID.device 101b could comprise the use of different values, such as a first value with an access network 126 and a second value with a reporting system 120.

A reporting configuration 132f recorded by a reporting system 120 can include data such as an identity list 320, files list 505, authentication parameters 111d, and reporting system credentials 132h. Reporting system credentials 132h could include a pre-shared secret key (PSK) for use by device 101 with reporting system 120. The use of a PSK between device 101 and reporting system 120 or reporting server 116 can be used in embodiments where both reporting server 116 and device 101 don't both use certificates in secure session 520 (since use of certificates by both sides may normally provide authentication and a means for mutual key derivation). With data from a step 521, reporting server 116 can select subsequent steps or procedures in order to communicate with device 101 and transducer 101k for a device 101.

Device 101 can then conduct at step 525, which can comprise device 101 collecting or sending transducer data 125 with transducers 101k. A step 525 could also comprise device 101 running through a set of configuration test vectors 102a and generating a configuration report 525a. Configuration test vectors 102a could comprise device 101 testing dynamic range of transducers 101k, having configuration user 108a provide test data for transducers 101k, or also having transducers 101k collect initial, "production" data regarding monitored unit 106. In an exemplary embodiment, where device 101 includes a camera, for a configuration test vector 102a in a step 525, (a) mobile phone 108 could present a picture, QR code, bar code, or similar image on the screen 108k of mobile phone 108, and then (b) device 101 could read the picture, QR code, or bar code. Configuration report 525a can also comprise a set of data for a report 525a generated by device 101 using transducers 101k with monitored unit 106, as specified or instructed for device 101 in configuration test vector 102a. In other exemplary embodiments, a configuration test vector 102a could be omitted and transducers 101k and device 101 could simply begin operation with monitored unit and data could be recorded in a configuration report 525a. Device 101 can then send reporting server 116 a message 526 within secure session 520, where message 526 can include transducer data 125 and report 525a.

At step 527, device 101 can deprecate the used set of default credentials 103, and increase a sequence number 103d such that a second or different set of default credentials 103 could be utilized if a future configuration step 102 is conducted. In other words, if (a) device 101 becomes reset or device 101 loses connectivity to AP 122b and access network 126 (such as a physical move to a different geographical location, or memory 101f in device 101 getting corrupted) then (b) a mobile handset 108 could be used to conduct a second configuration step 102 at a later date. Other possibilities exist as well for reasons why device 101 could prefer to use a different set of default credentials 103 after a configuration step 102. For a step 527 both device 101 and configuration system 114 could increment a sequence number 103d in order to obtain a different, second set of default credentials 103 for device 101 at a subsequent time. The use of a second set of default credentials 103 with a sequence number 103d is depicted and described in connection with FIG. 1B above. A manufactured device 101 could record a plurality of device default credentials 103, each with a different sequence number 103d. Device 101 could send a message to configuration system 114 in a step 527 to notify configuration system 114 of the increase or change in a sequence number 103d for default credentials 103 used by device 101.

At step 528, reporting server 116 can record plaintext data from message 526 in a reporting database 118 or also send data to device owner 122. If expected values for transducer data 125 are received and report 525a meets acceptance criteria, then at step 528 (i) reporting server 116 and reporting system 120 can record that configuration step 102 has been successfully completed, and (ii) reporting system 120 could inform device owner 122 and/or configuration system 114 in FIG. 1A that a configuration step 102 of device 101 has been successfully completed. In exemplary embodiments, upon successful completion of a configuration step 102 of device 101 then device 101 may be described as a configured device 101', as depicted in FIG. 1F. If error conditions are noted for transducer data 125 or report 525a, then configuration user 108a, device owner 122, and configuration system 114 could be notified by reporting server 116. Upon conclusion of step 528 in FIG. 5, both device 101 and reporting server 116 can proceed with regular operation of device 101 with monitored unit 106 since the configuration step 102 has been completed in exemplary embodiments.

Mobile phone 108 can conduct a step 529, where step 529 can comprise the configuration application 108g sending a query 530 to reporting server 116 in order to confirm successful completing of configuration step 102. As described in the paragraph above, reporting server 116 could determine that configuration step 102 is complete based on the successful receipt of transducer data 125 and a configuration report 525a. Receipt of a repot 525a can confirm any of: (i) network access credentials 126a for access network 126 function (such as a backup or if a device owner WiFi access point 122b is not available), (ii) device 101 has wireless or wired connectivity properly established, (iii) transducers 101k are connected to device 101 and functioning, (iv) that transducers 101k are collecting transducer data 125 for monitored unit 106, (v) device owner credentials 199 have been loaded and activated for a device WiFi client 101i, (vi) configuration package 132 has been downloaded and applied for device 101, (vii) a complete set for an identity list 320 has been received, including physical location of device 101 such as geographical coordinates 325, (viii) reporting system 116 can communicate with device 101 in a secure manner via a secure session 520, (ix) a configuration step 102 for device 101 properly functions, such that a configuration step 102 could be conducted a second time in the future if required potentially with a different set of device default credentials 103 using a different sequence number 103d, and/or (x) device 101 records root such as a cert.CA-.root 109a and intermediate certificates in order to verify a certificate for reporting server 116, configuration server 112, and/or authentication server 111.

As depicted in FIG. 5, reporting server 116 can reply to query 530 with a message 531 of "device OK", if configuration step 102 has been confirmed by reporting system 116 as completed, such as through any of (i) through (x) in the paragraph above. Again, individual components within (i) through (x) in the paragraph above could be recorded or confirmed in a configuration report 525a. Not all of (i) through (x) are required for some embodiments. In exemplary embodiments, upon successful receipt of a message 531 with a status of "device OK" for device 101 or an equivalent message 531, then mobile phone 108 can display to configuration user 108a that a configuration step 102 for device 101 has been completed and device 101 can be left in operation, potentially without additional steps or manual changes to be performed by configuration user 108a. For embodiments where message 531 provides a status of "device not OK", then mobile phone 108 could display to configuration user 108a an error status and configuration user 108a could work with device 101 and configuration system 114 in order to diagnose and rectify the error code in order to receive a subsequent message 531 "device OK".

CONCLUSION

Various exemplary embodiments have been described above. Those skilled in the art will understand, however, that changes and modifications may be made to those examples without departing from the scope of the claims.

The invention claimed is:

1. A method for configuring a device to securely communicate with a configuration system, the method performed by the device, the method comprising:
   a) storing, in a nonvolatile memory, (i) a tag value comprising networking parameters and a first device identity for the device, (ii) a root certificate, and (iii) default credentials comprising a passphrase for the device, wherein the device enables a mobile phone to read with a camera a tag comprising the tag value;
   b) establishing, by a Wi-Fi radio and with the mobile phone, a first connection using the networking parameters, wherein a service set identifier (SSID) comprises the first device identity, and wherein the networking parameters specify the first connection is for an open Wi-Fi network;
   c) receiving, from the mobile phone via the first connection for the open Wi-Fi network, a first certificate for a configuration system, authentication parameters, a second device identity for the device, and a first digital signature by the configuration system over at least the second device identity;

d) verifying (i) the first digital signature with the first certificate, and (ii) the first certificate using the root certificate;

e) scanning, by the Wi-Fi radio, a radio-frequency spectrum for a list of available Wi-Fi networks for the device;

f) transmitting, by the Wi-Fi radio to the mobile phone via the open Wi-Fi network, a first ciphertext comprising the list of available Wi-Fi networks;

g) receiving, by the Wi-Fi radio from the mobile phone via the open Wi-Fi network, a ciphertext of second credentials for a new Wi-Fi network, wherein the list of available Wi-Fi networks includes the new Wi-Fi network, and wherein the ciphertext is decrypted by the device using a device private key and an elliptic curve cryptography algorithm;

h) connecting to the new Wi-Fi network using the received, decrypted second credentials of the new Wi-Fi network; and i) establishing, by the Wi-Fi radio via the new Wi-Fi network, a second connection with the configuration system using (i) the second device identity and (ii) the first certificate for the configuration system, wherein the device transmits a report to the configuration system through the second connection.

2. The method of claim 1, wherein the elliptic curve cryptography algorithm comprises a curve P-256.

3. The method of claim 1, wherein the second credentials for the new Wi-Fi network comprise a second SSID and password.

4. The method of claim 1, wherein the passphrase is unique for the device.

5. The method of claim 1, wherein the first device identity comprises a random number.

6. The method of claim 1, further comprising in step d), verifying the first digital signature with the first certificate and an elliptic curve digital signature algorithm (ECDSA).

7. The method of claim 1, wherein the radio-frequency spectrum comprises channels 1 through 11 for 2.4 Ghz and channels 40 through 62 for 5 Ghz.

8. The method of claim 1, wherein the tag comprises a QR code.

9. The method of claim 1, wherein packets transmitted through the open Wi-Fi network are not encrypted by the Wi-Fi radio.

10. The method of claim 1, further comprising before step f), generating, by a processor in the device, the first ciphertext using the device private key and the elliptic curve cryptography algorithm.

* * * * *